(12) United States Patent
Kishimoto et al.

(10) Patent No.: US 6,515,718 B1
(45) Date of Patent: Feb. 4, 2003

(54) LIQUID CRYSTAL DISPLAY DEVICE

(75) Inventors: Katsuhiko Kishimoto, Nara (JP); Nobuhiro Kondoh, Gifu (JP)

(73) Assignee: Sharp Kabushiki Kaisha, Osaka (JP)

( * ) Notice: Subject to any disclaimer, the term of this patent is extended or adjusted under 35 U.S.C. 154(b) by 191 days.

(21) Appl. No.: 09/712,125

(22) Filed: Nov. 15, 2000

(30) Foreign Application Priority Data

Nov. 15, 1999 (JP) .......................................... 11-324101
Nov. 15, 1999 (JP) .......................................... 11-324115
Jul. 28, 2000 (JP) ...................................... 2000-229147

(51) Int. Cl.$^7$ .......................................... G02F 1/1335
(52) U.S. Cl. ...................................................... 349/32
(58) Field of Search ........................................... 349/32

(56) References Cited

U.S. PATENT DOCUMENTS

| | | | |
|---|---|---|---|
| 4,896,149 A | | 1/1990 | Buzak et al. |
| 5,473,450 A | | 12/1995 | Yamada et al. |
| 5,706,109 A | | 1/1998 | Yamada et al. |
| 6,014,188 A | * | 1/2000 | Yamada et al. ............... 345/37 |
| 6,052,161 A | * | 4/2000 | Yamada et al. ............. 349/145 |
| 6,344,883 B2 | * | 2/2002 | Yamada et al. ............. 349/178 |
| 6,445,438 B1 | * | 9/2002 | Horie et al. ................. 349/187 |

FOREIGN PATENT DOCUMENTS

| | | |
|---|---|---|
| EP | 0 854 377 A2 | 7/1998 |
| JP | 1-217396 A | 8/1989 |
| JP | 6-222341 A | 8/1994 |
| JP | 6-301015 A | 10/1994 |
| JP | 7-120728 A | 5/1995 |
| JP | 11-167099 A | 6/1996 |
| JP | 10-186330 A | 7/1998 |

* cited by examiner

*Primary Examiner*—James Dudek
(74) *Attorney, Agent, or Firm*—Nixon & Vanderhye, P.C.

(57) ABSTRACT

The liquid crystal display device of this invention includes a substrate; a dielectric layer; a liquid crystal layer interposed between the substrate and the dielectric layer; a plurality of stripe electrodes formed on a surface of the substrate facing the liquid crystal layer, the electrodes running in a first direction; and a plurality of stripe plasma channels formed to face the plurality of electrodes via the liquid crystal layer and the dielectric layer, the plasma channels running in a second direction different from the first direction. A plurality of pixel regions are formed in respective crossings of the plurality of electrodes and the plurality of plasma channels. Portions of the liquid crystal layer included in the plurality of pixel regions change their orientation states depending on a voltage applied between the electrodes and the plasma channels, to realize display with light having passed the plurality of pixel regions. The liquid crystal display device further includes dielectric structures formed between the electrodes and the liquid crystal layer in periphery zones that include sides of the plurality of pixel regions orthogonal to the second direction. A voltage applied to each of the portions of the liquid crystal layer included in the plurality of pixel regions is smaller in the periphery zone than in the other portion of the pixel region.

25 Claims, 41 Drawing Sheets

LIQUID CRYSTAL DISPLAY DEVICE

BACKGROUND OF THE INVENTION

The present invention relates to a liquid crystal display device, in particular, to a plasma addressed liquid crystal display device of a flat panel structure including a liquid crystal cell and a plasma cell arranged in layers.

Development of plasma addressed liquid crystal display devices (hereinafter, abbreviated as PALCD devices) is in progress for realization of large and thin flat displays. For example, a PALCD device is disclosed in Japanese Laid-Open Patent Publication No. 1-217396.

FIG. 20 schematically illustrates a conventional PALCD device 200. The PALCD device 200 has a layered structure composed of a liquid crystal cell 201 and a plasma cell 202 with a dielectric sheet 203 interposed therebetween. A pair of polarizing plates 213 and 214 sandwich the liquid crystal cell 201 and the plasma cell 202. Typically, a backlight (not shown) is disposed on the back of the plasma cell 202.

The plasma cell 202 includes: an insulating substrate 204 having a plurality of parallel stripe grooves 205 formed therein; and the dielectric sheet 203 that serves as part of the liquid crystal cell 201 as will be described later. Each of the plurality of grooves 205 formed in the substrate 204 is sealed with the dielectric sheet 203. The sealed space of the groove is filled with gas ionizable with discharge, forming a plasma channel 205 (denoted by the same reference numeral as the groove). A pair of plasma electrodes 206 and 207 are placed on the bottom of each groove 205. A voltage is applied to the confined gas through the plasma electrodes that serve as an anode A and a cathode K, to ionize the gas and thus generate plasma discharge. The ionization of the gas in the plasma channel 205 under the plasma discharge is also called "activation" of the plasma channel 205 in some cases.

The liquid crystal cell 201 includes a substrate 208, the dielectric sheet 203, and a liquid crystal layer 209 interposed between the substrate 208 and the dielectric sheet 203. A plurality of parallel stripe electrodes (column electrodes) 210 are formed on the surface of the substrate 208 facing the liquid crystal layer 209. The electrodes 210 extend to cross the plasma channels 205. Also formed on the surface of the substrate 208 facing the liquid crystal layer 209 are colored layers (not shown) formed at positions corresponding to the respective electrodes 210 and a black matrix 212 filling spaces between the colored layers. The colored layers typically include red, green, and blue layers (see FIG. 22A).

Pixel regions are formed in the respective crossings of the electrodes 210 and the plasma channels 205. The portion of the liquid crystal layer 209 located in each of the pixel regions changes its orientation state depending on the voltage applied between the electrode 210 and the plasma channel 205, thereby changing the amount of light passing through the pixel region. By applying video signals to the portions of the liquid crystal layer 209 located in the respective pixel regions arranged in a matrix as a whole, the amounts of light passing through the respective pixel regions are controlled, whereby an image is displayed. As used herein, the minimum display unit is referred to as a "pixel", and the region of an LCD device that corresponds to each "pixel" is referred to as a "pixel region". Each pixel region exists in each crossing of the plasma channel 205 and the electrode 210. In a typical conventional LCD device having a black matrix, each pixel region exists in each opening of the black matrix. In other words, the opening of the black matrix defines the outline of the pixel region. In principle, pixel regions as well as pixels do not overlap each other. However, as will be described later in detail, if a crosstalk phenomenon occurs in a PALCD device, a "pixel" and a "pixel region" as defined in actual display operation overlap at least part of the adjacent "pixel" and "pixel region", respectively. That is, the "pixel region" in actual display operation does not match the "pixel region" in design (structure). Herein, the "pixel region in display" and the "pixel region in design" are often used to distinguish one from the other.

In the conventional PALCD device 200, the plasma channels 205 serve as row scanning units while the electrodes 210 serve as column scanning units, for example. Linear sequential scanning is carried out by activating the plasma channels 205 selectively in succession. In synchronization with this scanning, a video signal is applied to the electrodes 210 constituting the column drive units. The selectively activated plasma channel 205, which is filled with ionized gas, is entirely turned to an anode potential (also called a "reference potential"). In this state, when a drive voltage (corresponding to a video signal voltage) is applied between the plasma channel 205 and the electrode 210 facing each other via the dielectric sheet 203 and the liquid crystal layer 209, charges of the amount corresponding to the potential difference between the anode potential and the drive potential are induced to and accumulated on the bottom surface 203S of the dielectric sheet 203 (the surface facing the plasma channel 205, which is hereinafter called a "dielectric bottom surface 203S"). Next, when this plasma channel 205 is made non-selected (plasma discharge is stopped), the plasma channel 205 is put in an insulated state. Thus, the charges are kept accumulated on the dielectric bottom surface 203S until the plasma channel 205 is selected and activated next time. As a result, the potential difference (voltage) between the dielectric bottom surface 203S and the electrode 210 is maintained. In other words, the voltage corresponding to the drive voltage that had been applied to the corresponding electrode 210 when the plasma channel 205 was selected (the drive voltage itself if the anode voltage was the ground voltage) is sample-held by the existence of capacitances formed by the dielectric bottom surface 203S/dielectric sheet 203/liquid crystal layer 209/electrode 210. In this way, the plasma channel 205 functions as a switching element that controls electrical connection/disconnection between the dielectric bottom surface 203S and the anode electrode 207. The dielectric bottom surface 203S serves as a virtual electrode. The rows and the columns may be reversed so that the drive voltage is applied to the anode electrodes 207 of the plasma channels 205 while the scanning voltage is applied to the electrodes 210.

The pixel region of the PALCD device 200 can be represented by an equivalent circuit shown in FIG. 21. Referring to FIG. 21, one pixel region of the PALCD device 200 is essentially composed of: a capacitance $C_G$ (dielectric sheet capacitance) including the dielectric bottom surface 203S and the dielectric sheet 203; a capacitance $C_{LC}$ (liquid crystal capacitance) including the liquid crystal layer 209 serially connected to the capacitance $C_G$; and the anode electrode 207 connected to the dielectric bottom surface 203S via a switch S (plasma channel 205). A drive voltage $V_D$ is externally applied to the electrode 210. When the switch S is turned ON, the drive voltage $V_D$ (AC voltage; $V_D$ is absolute) is applied between the dielectric bottom surface 203S and the electrode 210. At this time, it is a voltage $V_{LC}$ applied to the liquid crystal capacitance $C_{LC}$ that directly influences the display state of the pixel region (the orientation state of liquid crystal molecules in the liquid crystal layer 209). The voltage $V_{LC}$ is given by expression (1) below.

$$V_{LC} = V_D \times \{C_G/(C_{LC}+C_G)\} \quad (1)$$

In other words, the drive voltage is divided between the serially connected capacitance $C_{LC}$ and capacitance $C_G$.

Assuming that the thickness of the liquid crystal layer 209 is $d_{LC}$, that of the dielectric sheet 203 is $d_G$, and the relative dielectric constants of the liquid crystal layer 209 and the dielectric sheet 203 (typically, glass) are equal to each other, $V_{LC}$ is given by expression (2) below.

$$V_{LC}=V_D \times \{d_{LC}/(d_{LC}+d_G)\} \tag{2}$$

Typically in the PALCD device 200, the thickness $d_{LC}$ of the liquid crystal layer 209 is about 5 µm, and the thickness $d_G$ of the dielectric sheet 203 (glass sheet) is about 50 µm. From expression (2), therefore, it is found that in order to apply a voltage of 4 V to the liquid crystal layer 209 ($V_{LC}$=4 V), for example, a voltage of about 40 V needs to be applied as the drive voltage $V_D$.

The PALCD device 200 is especially an expected candidate of a large-size LCD device for the reason that it can be fabricated in a simple process compared with LCD devices using thin film transistors, among others.

Meanwhile, for improvement of the viewing angle characteristics of twisted nematic (TN) mode LCD devices, the present inventors disclosed axially symmetrically aligned microcell (ASM) mode LCD devices in Japanese Laid-Open Patent Publication Nos. 6-301015 and 7-120728, for example. The liquid crystal layer of an ASM mode LCD device is divided into a plurality of liquid crystal regions by polymer walls. Liquid crystal molecules in each of the liquid crystal regions are aligned axially symmetrically with respect to an axis (a symmetry axis) vertical to the display plane (the surface of a substrate constituting the LCD device). The liquid crystal regions are typically formed every pixel region. With the axially symmetrically aligned liquid crystal molecules, the ASM mode LCD device exhibits display that is small in contrast change whichever direction the display is viewed. That is, the ASM mode LCD device has wide viewing angle characteristics.

The polymer walls for aligning liquid crystal molecules axially symmetrically are formed by polymerization-inducing phase separation of a mixture of a polymerizable material and a liquid crystal material (see the above publications). Alternatively, polymer walls may be formed on a substrate in advance by a photolithography process using a photosensitive resin (see Japanese Laid-Open Patent Publication No. 10-186330, for example).

The present inventors further disclosed a PALCD device adopting the ASM mode in Japanese Laid-Open Patent Publication No. 11-167099, for example. Such an ASM mode PALCD device is expected to be a very promising large screen display having wide viewing angle characteristics.

The above conventional devices have problems as follows. The PALCD device 200 has a problem of easily generating a crosstalk phenomenon. To suppress/prevent the crosstalk phenomenon, the present inventors investigated the cause of occurrence of the crosstalk phenomenon in detail and found the following.

In the PALCD device, a crosstalk phenomenon presumably occurs because a large drive voltage is applied to the dielectric sheet and the liquid crystal layer as described above. Referring to FIGS. 22A and 22B, the crosstalk phenomenon in the PALCD device 200 will be described.

FIGS. 22A and 22B are a schematic cross-sectional view and a top view, respectively, of the PALCD device 200, specifically illustrating three continuous pixel regions P along one plasma channel 205. The pixel regions P herein indicate pixel regions in design. A PALCD has periodic structures in the row and column directions. Accordingly, illustration of structures, which have functionally nothing to do with the pixel region shown at the center, may be omitted, as in FIGS. 22A and 22B.

The liquid crystal layer 209 of the PALCD device 200 includes liquid crystal molecules 209a having negative dielectric anisotropy. The pair of polarizing plates 213 and 214 are disposed in the crossed-Nicols state. The PALCD device 200 performs display in the normally black mode. Red, green, and blue layers are used as the colored layers (not shown) formed on the surface of the substrate 208 facing the liquid crystal layer 209, and the three pixel regions P correspond to red (R), green (G), and blue (B).

The pixel region P (in design) of the PALCD device 200 is defined by the following. The width of the pixel region P along the length of the plasma channel 205 (orthogonal to the length of the electrode 210) is defined by the opening of the black matrix 212, which is equal to the width WEL of the electrode 210 in the illustrated example. The width of the pixel region P along the length of the electrode 210 (orthogonal to the length of the plasma channel 205) is defined by the width WPC of the plasma channel 205 (distance between the side ribs or between the electrodes for plasma generation).

FIGS. 22A and 22B illustrate the state where, after a drive voltage (a voltage equal to or more than a threshold voltage of the liquid crystal layer; 40 V, for example) was applied to an electrode 210G corresponding to the center pixel electrode P while the plasma channel 205 was being activated, the applied voltage is retained in the center pixel electrode P (in this state, the plasma channel 205 is already in the insulated state). That is, the center pixel electrode P (green) is on the ON state, while the two adjacent pixel electrodes P (red and blue) are on the OFF state.

If a crosstalk phenomenon occurs, the PALCD display device 200 is observed as shown in FIG. 22B. That is, the hatched black matrix 212 portions and cross-hatched areas in FIG. 22B are observed black (dark). Originally, only the center pixel region p (green) should be in the ON (bright) state, and the adjacent pixel regions P (red and blue) should be in the OFF (dark) state. Actually, however, part of the pixel regions P corresponding to red and blue colors adjacent to the ON-state pixel region P (green) are observed as the ON state. To state differently, the width of the portion of the liquid crystal layer 209 turned ON along the length of the plasma channel 205 (that is, the width of the pixel region in display) is larger than the width of the pixel region P. In other words, the pixel region in display overlaps part of the adjacent pixel regions. Thus, if a crosstalk phenomenon occurs, color purity degrades (color becomes whitish) in color display because green to be originally displayed is mixed with red and blue. In monochrome display, the contour is blurred.

FIGS. 23A and 23B are a schematic cross-sectional view and a top view, respectively, of a PALCD device 1700, specifically illustrating three continuous pixel regions P along one plasma channel 1705. The pixel regions P herein indicate pixel regions in design.

The PALCD device 1700 includes a liquid crystal layer 1709 divided into a plurality of liquid crystal regions 1709a by dielectric structures (polymer walls) 1720a, 1720b, 1720c, and 1720d. A pair of polarizing plates 1713 and 1714 are disposed in the crossed-Nicols state. The liquid crystal layer 1709 includes liquid crystal molecules 1709b having negative dielectric anisotropy. Vertical alignment films (not shown) are formed in contact with the top and bottom surfaces of the liquid crystal layer 1709. The liquid crystal molecules 1709b in the respective liquid crystal regions 1709a are aligned axially symmetrically with respect to an axis SA vertical to the surface of a substrate 1708. The PALCD device 1700 performs display in the normally black mode. Red, green, and blue colored layers (not shown) are formed on the surface of the substrate 1708 facing the liquid crystal layer 1709, and the three pixel regions P correspond to red (R), green (G), and blue (B). A black matrix 1712 formed between the colored layers generally has a width larger than the width of the dielectric structures 1720a formed between the adjacent electrodes 1710. This is for the reason of keeping the display quality from degrading even if the dielectric structures 1720a are displaced due to misalignment during the formation of the dielectric structures 1720a.

Each of the pixel regions P (in design) of the PALCD device 1700 is defined by the following. The width of the pixel region P along the length of the plasma channel 1705 (orthogonal to the length of the electrode 1710) is defined by the opening of the black matrix 1712, which is equal to the width WEL of the electrode 1710 in the illustrated example. The width of the pixel region P along the length of the electrode 1710 (orthogonal to the length of the plasma channel 1705) is defined by the width WPC of the plasma channel 1705 (distance between the side ribs or between the electrodes for plasma generation). As described above, the width of the dielectric structures 1720a formed between the adjacent electrodes 1710 is smaller than the width of the black matrix 1712. Therefore, the dielectric structures 1720a will not exist in portions of the pixel region P including the sides (periphery sides) thereof orthogonal to the length of the plasma channel 1705.

FIGS. 23A and 23B illustrate the state where, after a drive voltage (a voltage equal to or more than a threshold voltage of the liquid crystal layer; 40 V, for example) was applied to an electrode 1710G corresponding to the center pixel electrode P while the plasma channel 1705 was being activated, the applied voltage is retained in the center pixel electrode P (in this state, the plasma channel 1705 is already in the insulated state). That is, the center pixel electrode P (green) is on the ON state, while the two adjacent pixel electrodes P (red and blue) are on the OFF state.

If a crosstalk phenomenon occurs, the PALCD display device 1700 is displayed as shown in FIG. 23B. That is, the hatched black matrix 1712 portions and cross-hatched areas in FIG. 23B are observed black (dark). Originally, only the center pixel region p (green) should be in the ON (bright) state, and the adjacent pixel regions P (red and blue) should be in the OFF (dark) state. Actually, however, part of the pixel regions P corresponding to red and blue colors adjacent to the ON-state pixel region P (green) are observed as the ON state. To state differently, the width of the portion of the liquid crystal layer 1709 turned ON along the length of the plasma channel 1705 (that is, the width of the pixel region in display) is larger than the width of the pixel region P. In other words, the pixel region in display overlaps part of the adjacent pixel regions. Thus, if a crosstalk phenomenon occurs, color purity degrades (color becomes whitish) in color display because green to be originally displayed is mixed with red and blue. In monochrome display, the contour is blurred.

The state of the PALCD device 200 during occurrence of a crosstalk phenomenon will be described in detail with reference to FIG. 22A.

When a drive voltage (40 V, for example) is applied to the center electrode 210G while the plasma channel 205 is being activated (meanwhile, 0 V is applied to adjacent electrodes 210R and 210B), charges are induced to and accumulated on the portion of the bottom surface 203S of the dielectric sheet 203 facing the electrode 210G. The amount of charges is determined depending on the magnitude of the drive voltage and the value of capacitance (value of serially connected $C_G$ and $C_{LC}$). An electric field (electric lines of power) generated by the drive voltage applied to the electrode 210G has been widened to some extent when it reaches the dielectric bottom surface 203S. Accordingly, the width WG of the portion of the dielectric bottom surface 203S on which charges are accumulated is larger than the width WEL of the electrode 210G. An electric field (electric lines of power) E returned by the accumulated charges toward the electrode 210G is further wider than the width WG of the charge-accumulated portion. As a result, in the adjacent off-state pixel regions, that is, the pixel regions including the electrodes 210R and 210B to which 0 V had been applied when the plasma channel 205 was activated, orientation of the liquid crystal molecules 209a in the liquid crystal layer 209 located near the electrode 210G are influenced by the electric field (voltage) generated by the accumulated charges. Thus, as shown in FIG. 22A, the portion of the liquid crystal layer 209 where the liquid crystal molecules 209a having negative dielectric anisotropy are oriented vertically to the direction of the electric field expands into the adjacent pixel regions.

The crosstalk phenomenon due to a leak electric field (voltage) generated by charges accumulated on the dielectric bottom surface 203S is herein called data diffusion crosstalk (DDC). The leak electric field (voltage) as used herein refers to an electric field (voltage) leaking beyond the ON-state pixel region P. The influence of DDC on the PALCD device 200 was quantitatively evaluated by simulation. The results are shown in FIG. 24.

The x-axis of the graph in FIG. 24 represents the position with respect to the electrodes 210, and the y-axis thereof represents the relative value of the charge distribution on the dielectric bottom surface 203S (solid line) and the electric field distribution in the liquid crystal layer 209 (broken line). In the simulation, a 42-inch VGA-compatible PALCD device was assumed. That is, the width of the electrodes 210 was 324 μm, the distance between the electrodes 210 was 40 μm, the thickness of the liquid crystal layer 209 was 6 μm, and the thickness of the dielectric sheet 203 was 50 μm. The relative dielectric constants of the liquid crystal layer 209 and the dielectric sheet 203 were assumed to be the same. As in the state shown in FIGS. 22A and 22B, a drive voltage (maximum gray scale voltage, specifically 80 V) was applied only to the center electrode 210G.

As is observed from the solid line in FIG. 24, the width of the portion of the dielectric bottom surface 203S on which charges are accumulated (WG in FIGS. 22A and 22B) is larger than the width of the electrode 210G (WEL in FIGS. 22A and 22B). As is observed from the broken line in FIG. 24, the electric field distribution formed in the liquid crystal layer 209 is wider than the charge distribution on the dielectric bottom surface 203S, spreading to as far as almost the centers of the adjacent electrodes 210R and 210B (adjacent pixel regions). It is found that an electric field of roughly 10% of the maximum electric field is generated in the periphery portions of the electrodes 210R and 210B near the electrode 210G.

The above results indicate that the DDC described above is one of major causes of the crosstalk phenomenon in the conventional PALCD device 200. Presumably, this also applies to the crosstalk phenomenon in the PALCD device 1700 shown in FIGS. 23A and 23B.

Another major cause of the crosstalk phenomenon is due to the potential difference between adjacent electrodes. This crosstalk is herein called side to side crosstalk (SSC). Since SSC is caused by the potential difference between adjacent electrodes (that has many variations), it is difficult to quantitatively evaluate how largely SSC influences actual display. However, it is presumed that SSC is also a major cause of the crosstalk phenomenon in the PALCD device in addition to DDC.

Referring to FIG. 25, if a potential difference exists between the adjacent electrodes 210G and 210B of the conventional PALCD device 200 (or 1700), a lateral electric field (electric lines of power) E from the electrode 210G to the electrode 210B is generated. Due to this lateral electric field E, the liquid crystal molecules 209a existing near the electrode 210B that should originally be oriented in the OFF state is turned to the ON state. If SSC is generated as illustrated in the normally black mode LCD device using liquid crystal molecules 209a having negative dielectric anisotropy, the liquid crystal molecules 209a attempt to orient vertically to the lateral electric field. As a result, part (periphery zone) of the adjacent pixel region that should originally be in the black display (OFF) state is turned to the white display (ON) state (the resultant appearance is substantially the same as that shown in FIG. 22B). Since the periphery zones of the adjacent pixel regions that should originally be in the black display state are turned to the white display state, color purity degrades and thus display quality noticeably degrades in color display. In monochrome display, the contour is blurred.

SUMMARY OF THE INVENTION

The liquid crystal display device of the first aspect of the present invention includes a substrate; a dielectric layer; a liquid crystal layer interposed between the substrate and the dielectric layer; a plurality of stripe electrodes formed on a surface of the substrate facing the liquid crystal layer, the electrodes running in a first direction; and a plurality of stripe plasma channels formed to face the plurality of electrodes via the liquid crystal layer and the dielectric layer, the plasma channels running in a second direction different from the first direction. A plurality of pixel regions are formed in respective crossings of the plurality of electrodes and the plurality of plasma channels. Portions of the liquid crystal layer included in the plurality of pixel regions change their orientation states depending on a voltage applied between the electrodes and the plasma channels, to realize display with light having passed the plurality of pixel regions. The liquid crystal display device further includes dielectric structures formed between the electrodes and the liquid crystal layer in periphery zones that include sides of the plurality of pixel regions orthogonal to the second direction. A voltage applied to each of the portions of the liquid crystal layer included in the plurality of pixel regions is smaller in the periphery zone than in the other portion of the pixel region.

The dielectric structures are preferably formed of a transparent polymer material.

Each of the dielectric structures is preferably formed to cover a gap between two adjacent electrodes among the plurality of stripe electrodes and sides of the two electrodes facing each other.

The dielectric structures are preferably formed so that in the periphery zone, the thickness of each of the portions of the liquid crystal layer included in the plurality of pixel regions is nine-tenths or less of the thickness in the other portion of the pixel region.

The dielectric structures are preferably formed so that in the periphery zone, the thickness of each of the portions of the liquid crystal layer included in the plurality of pixel regions is two-thirds or more of the thickness in the other portion of the pixel region.

The device may further include a black matrix formed on the substrate between the plurality of electrodes.

The dielectric structures may be formed of a material having a relative dielectric constant greater than the absolute of relative dielectric constant anisotropy ($\Delta\epsilon$) of a liquid crystal material included in the liquid crystal layer.

The device may further includes a high dielectric layer formed between the plurality of electrodes including spaces between the plurality of electrodes and the liquid crystal layer, and the high dielectric layer may be formed of a material having a relative dielectric constant greater than the absolute of relative dielectric constant anisotropy ($\Delta\epsilon$) of a liquid crystal material included in the liquid crystal layer.

The dielectric structures may be formed of a material having a relative dielectric constant smaller than the absolute of relative dielectric constant anisotropy ($\Delta\epsilon$) of a liquid crystal material included in the liquid crystal layer.

The liquid crystal layer may include a liquid crystal material having negative dielectric anisotropy.

According to the first aspect of the present invention, there is provided a PALCD device capable of suppressing/preventing degradation in display quality due to a crosstalk phenomenon.

In the PALCD device of the present invention, with the existence of the dielectric structures in the periphery zones of the pixel regions, the voltage applied to the periphery zones is smaller than that applied to the other portions of the pixel regions. This suppresses/prevents a crosstalk phenomenon. If the dielectric structures are made of a transparent material, light passing through the periphery zones are usable for display. Decrease in aperture ratio is therefore prevented.

Disorder in orientation of liquid crystal molecules due to a lateral electric field can be prevented by setting the relative dielectric constant of the dielectric structures at a value larger than the absolute of relative dielectric constant anisotropy ($\Delta\epsilon$) of a liquid crystal material. This suppresses/prevents an SSC-induced crosstalk phenomenon further effectively.

Disorder in orientation of liquid crystal molecules due to a leak electric field can be prevented even when the relative dielectric constant of the dielectric structures is smaller than the relative dielectric constants of the liquid crystal material (larger one of $\epsilon//$ and $\epsilon\perp$, more preferably, the absolute of relative dielectric constant anisotropy ($\Delta\epsilon$)). This suppresses/prevents a crosstalk phenomenon further effectively.

The crosstalk suppressing effect of the present invention is prominent in normally black mode PALCD devices. Among the devices, the effect is especially prominent in a PALCD device using a liquid crystal material having negative dielectric anisotropy.

The present invention is applicable to display devices other than the plasma addressed liquid crystal display devices, where a crosstalk phenomenon occurs in substantially the same mechanism as DDC and SSC described above.

The liquid crystal display device of the second aspect of the present invention includes: a substrate; a dielectric layer; a liquid crystal layer interposed between the substrate and the dielectric layer; a plurality of stripe electrodes formed on a surface of the substrate facing the liquid crystal layer, the electrodes running in a first direction; and a plurality of stripe plasma channels formed to face the plurality of electrodes via the liquid crystal layer and the dielectric layer, the plasma channels running in a second direction different from the first direction. A plurality of pixel regions are formed in respective crossings of the plurality of electrodes and the plurality of plasma channels, and the device further includes a plurality of first dielectric structures running in the first direction and a plurality of second dielectric structures running in the second direction, formed on the surface of the substrate facing the liquid crystal layer. The liquid crystal layer is divided into a plurality of liquid crystal regions by the plurality of first and second dielectric structures,. Liquid crystal molecules in the plurality of liquid crystal regions are aligned axially symmetrically with respect to an axis vertical to the surface of the substrate. Each of the plurality of pixel regions includes at least one of the plurality of liquid crystal regions. Portions of the liquid crystal layer included in the plurality of pixel regions change their orientation states depending on a voltage applied between the electrodes and the plasma channels, to realize display with light having passed the plurality of pixel regions. In this liquid crystal display device, part of the plurality of first dielectric structures are formed in periphery zones, the periphery zones including sides of the plurality of pixel regions orthogonal to the second direction. A voltage applied to each of the portions of the liquid crystal layer included in the plurality of pixel regions is smaller in the periphery zone than in the other portion of the pixel region.

The first and second dielectric structures are preferably formed of a transparent polymer material.

Each of the first dielectric structures formed in the periphery zones is preferably formed to cover a gap between two adjacent electrodes among the plurality of stripe electrodes and sides of the two electrodes facing each other.

Each of the plurality of pixel regions preferably includes at least two liquid crystal regions adjacent in the second direction, and the width of the first dielectric structure formed between the at least two liquid crystal regions among the plurality of first dielectric structures is preferably smaller than the width of the first dielectric structure formed in the periphery zone. In the case where each of the plurality of pixel regions includes at least two liquid crystal regions adjacent in the first direction, the width of the second dielectric structure formed between the at least two liquid crystal regions is preferably smaller than the width of the first dielectric structure formed in the periphery zone. Each of the plurality of pixel regions may include one liquid crystal region.

The first dielectric structures formed in the periphery zones are preferably formed so that in the periphery zones, the thickness of each of the portions of the liquid crystal layer included in the plurality of pixel regions is nine-tenths or less of the thickness in the other portion of the pixel region.

The first dielectric structures formed in the periphery zones are preferably formed so that in the periphery zone, the thickness of each of the portions of the liquid crystal layer included in the plurality of pixel regions is two-thirds or more of the thickness in the other portion of the pixel region.

The device may further include a black matrix formed on the substrate between the plurality of electrodes.

The width of the first dielectric structure located between the two electrodes is preferably larger than the width of the first dielectric structures located on the two electrodes, and liquid crystal regions where liquid crystal molecules in the liquid crystal layer are aligned axially symmetrically with respect to an axis vertical to the surface of the substrate are preferably formed below the first dielectric structures.

The third dielectric structures may further be formed on the first dielectric structures, and the liquid crystal molecules in the liquid crystal layer located below the first dielectric structures may be aligned axially symmetrically by the existence of the third dielectric structures.

The device may further include a black matrix formed on the substrate between the plurality of electrodes, and the width of the black matrix may be smaller than the width of the first dielectric structure located between the two electrodes.

The device may further include a black matrix formed on the substrate between the plurality of electrodes, and the plurality of first dielectric structures and the plurality of second dielectric structures may define a plurality of apertures on the black matrix.

The first dielectric structures may be formed of a material having a relative dielectric constant greater than the absolute of relative dielectric constant anisotropy ($\Delta\epsilon$) of a liquid crystal material included in the liquid crystal layer.

The device may further include a high dielectric layer formed between the plurality of electrodes including spaces between the plurality of electrodes and the liquid crystal layer, and the high dielectric layer may be formed of a material having a relative dielectric constant greater than the absolute of relative dielectric constant anisotropy ($\Delta\epsilon$) of a liquid crystal material included in the liquid crystal layer.

The first dielectric structures may be formed of a material having a relative dielectric constant smaller than the absolute of relative dielectric constant anisotropy ($\Delta\epsilon$) of a liquid crystal material included in the liquid crystal layer.

The liquid crystal layer may include a liquid crystal material having negative dielectric anisotropy.

According to the second aspect of the present invention, there is provided a PALCD device that can suppress/prevent degradation in display quality due to a crosstalk phenomenon and has high viewing angle characteristics.

In the PALCD device of the present invention, with the existence of the dielectric structures in the periphery zones of the pixel regions, the voltage applied to the periphery zones is smaller than that applied to the other portions of the pixel regions. This suppresses/prevents a crosstalk phenomenon. If the dielectric structures are made of a transparent material, light passing through the periphery zones are usable for display. Decrease in aperture ratio is therefore prevented. Such dielectric structures can be formed of the same material as that used for other dielectric structures for dividing the liquid crystal layer. Increase in fabrication step is therefore prevented.

Disorder in orientation of liquid crystal molecules due to a lateral electric field can be prevented by setting the relative dielectric constant of the dielectric structures at a value larger than the absolute of relative dielectric constant anisotropy ($\Delta\epsilon$) of a liquid crystal material. This suppresses/prevents an SSC-induced crosstalk phenomenon further effectively.

Disorder in orientation of liquid crystal molecules due to a leak electric field can be prevented even when the relative dielectric constant of the dielectric structures is smaller than the relative dielectric constants of the liquid crystal material (larger one of $\epsilon//$ and $\epsilon\perp$, more preferably, the absolute of relative dielectric constant anisotropy ($\Delta\epsilon$)). This suppresses/prevents a crosstalk phenomenon further effectively.

The crosstalk suppressing effect of the present invention is prominent in normally black mode PALCD devices. Among the devices, the effect is especially prominent in a PALCD device using a liquid crystal material having negative dielectric anisotropy.

As described above, the present inventors examined in detail the causes of the crosstalk phenomenon occurring in PALCD devices. The present invention was only attained from the knowledge obtained from the examination. To state more specifically, the present invention is based on the idea that a major cause of the crosstalk phenomenon is a leak electric field (voltage) to adjacent pixel regions due to DDC and/or SSC, and that in order to suppress/prevent the crosstalk phenomenon, the magnitude of such a leak electric field (voltage) applied to the liquid crystal layer in the adjacent pixel regions should be sufficiently reduced.

The crosstalk phenomenon occurs between adjacent pixel regions along the length of the plasma channel, that is, between adjacent pixel regions including adjacent different electrodes. In view of this, the crosstalk phenomenon can be suppressed/prevented in the following manner. That is, the voltage applied to portions of each pixel region including its sides orthogonal to the length of the plasma channel (sides parallel to the length of the stripe electrode) (hereinafter, such a portion is called a "periphery zone") is made smaller than the voltage applied to the other portion of the pixel region (other area). For this purpose, a dielectric structure is formed in the periphery zone.

For convenience of the description on the crosstalk phenomenon occurring between adjacent pixel regions along the length of the plasma channel, the following terms are defined as follows unless otherwise specified. The sides among all the sides of the electrodes, the dielectric structures, and the pixel regions that are orthogonal to the length of the plasma channel are called "periphery sides". The electrodes and the dielectric structures, each of which is typically rectangular, are arranged in a stripe pattern. The first and second dielectric structures for axially symmetrical alignment (these structures may also be called "dielectric walls") are formed to cross each other, forming a lattice as a whole. The first and second dielectric structures are wall-like structures running in parallel with the length of the electrodes and the length of the plasma channels, respectively. The pixel regions, each of which is rectangular, are arranged in a matrix. The distance between a pair of periphery sides is called a "width". The portion of each pixel region that includes a periphery side is called a "periphery zone". Typically, at least part of the dielectric structure is selectively formed in the periphery zone. The width of each of the dielectric structures (including the first and second dielectric structures) refers to the width thereof orthogonal to the length of the dielectric structure.

The PALCD device of the present invention includes a dielectric structure formed between the electrode and the liquid crystal layer in each periphery zone for reducing the voltage applied to the periphery zone compared with the voltage applied to the other area. Therefore, the thickness of the liquid crystal layer in the periphery zone including the dielectric structure is smaller than that in the other area. As a result, the voltage applied to the liquid crystal layer in the periphery zone is smaller than the voltage applied to the liquid crystal layer in the other area. By this reduction in the thickness of the liquid crystal layer in the periphery zone as well as the reduction in the voltage applied to the liquid crystal layer in the periphery zone, the crosstalk phenomenon can be effectively suppressed/prevented. This is due to the following two factors.

The first factor will be described with reference to FIG. 26. FIG. 26 is a graph showing typical voltage-transmittance curves L1, L2, and L3 of LCD devices having liquid crystal layers different in thickness. As shown in FIG. 26, in general, as the thickness of the liquid crystal layer is smaller (d1>d2>d3), the transmittance of the LCD device decreases (T1>T2>T3) when the same voltage is applied (directly to the liquid crystal layer). This is the first factor. Further, as the second factor, in the case of a PALCD device, as the thickness of the liquid crystal layer is smaller, the voltage applied to the liquid crystal layer decreases when the same voltage is applied (to the dielectric sheet and the liquid crystal layer). Due to the above two factors, as is apparent from the voltage-transmittance curves L1', L2', and L3' shown in FIG. 27, as the thickness of the liquid crystal layer is smaller (d1'>d2'>d3'), the transmittance of the LCD device decreases (T1'>T2'>T3'). The x-axis of the graph in FIG. 27 represents the voltage applied to the liquid crystal layer.

Thus, in the PALCD device where the second factor described above functions, the crosstalk phenomenon can be effectively suppressed/prevented by providing the dielectric structures in the periphery zones. More specifically, the voltage applied between the electrode and the dielectric bottom sheet is divided according to capacitances formed by the dielectric bottom surface (virtual electrode)/dielectric sheet/liquid crystal layer/dielectric structure/electrode. Assuming that the relative dielectric constant of the dielectric structure is equal to those of the liquid crystal layer and the dielectric sheet, the voltage applied to the liquid crystal layer in the periphery zone is divided in proportion to the thicknesses of the dielectric sheet, the liquid crystal layer, and the dielectric structure (see expression (2) above). Accordingly, by adjusting the thickness of the dielectric structure, the thickness of the liquid crystal layer in the periphery zone is controlled and thus the magnitude of the voltage applied to the liquid crystal layer in the periphery zone is adjusted. By this adjustment, the crosstalk phenomenon can be suppressed/prevented. Strictly, the voltage is divided according to the capacitances formed between the electrode and the dielectric bottom surface as described above. Therefore, the thickness of the dielectric structure should be determined in consideration of the relative dielectric constants of the respective components.

The voltage applied to the periphery zone is reduced by forming the dielectric structure, as described above. This means that the threshold voltage (voltage required to change the transmittance) of the liquid crystal layer in the periphery zone is apparently increased compared with that in the other area. Thus, by adjusting the thickness of the dielectric structure to adjust the apparent threshold voltage of the liquid crystal layer in the periphery zone, the crosstalk phenomenon is suppressed/prevented.

If the dielectric structure formed in the periphery zone is made of a transparent polymer material, light passing through the periphery zone can be utilized for display. Therefore, the aperture ratio is prevented from decreasing.

In the construction having two or more liquid crystal regions in one pixel region, a dielectric structure (first and/or second dielectric structure) running across the pixel region is preferably made of a transparent polymer material in view of the aperture ratio. By using the same transparent polymer material for both the dielectric structures formed in the periphery zones and the dielectric structures running across the pixel regions, all the dielectric structures can be formed in one process. If the width of the dielectric structures running across the pixel regions is made smaller than that of the dielectric structures formed in the periphery zones, uniformity of display characteristics in each pixel region is enhanced.

The dielectric structure may be formed so that at least part thereof serves to reduce a leak electric field (voltage) from the adjacent pixel region. The dielectric structure may be formed at least in the periphery zone of the pixel region, so that the effect of suppressing the crosstalk phenomenon is obtained. In other words, the width of the pixel region in display can be changed by controlling the position and the thickness of the dielectric structure. Therefore, the dielectric structure may be formed so that it is located in the periphery zone of the resultantly-obtained pixel region in display (that is, so that the periphery of the pixel region in display is located within the width of the dielectric structure, or so that the dielectric structure is located near the periphery side of the pixel region in display inside the pixel region). In this way, the crosstalk phenomenon can be suppressed. The relationship between the position of the dielectric structure and the pixel region in display will be described in detail in the preferred embodiments of the present invention.

Typically, the dielectric structure may be formed so as to cover the gap between the two adjacent stripe electrodes and the sides of the electrodes facing each other. This simplifies the structure and the fabrication process.

In order to sufficiently lower the leak electric field (voltage) that is a cause of the crosstalk phenomenon, the dielectric structure is preferably formed so that the thickness of the liquid crystal layer in the periphery zone is nine-tenths or less of the thickness of the liquid crystal layer in the other area. In other words, the thickness of the dielectric structure is preferably one-tenth or more of the thickness of the liquid crystal layer in the portion of the pixel region having no dielectric structure. Also, the thickness of the dielectric structure is preferably one-third or less of the thickness of the liquid crystal layer in the portion of the pixel region having no dielectric structure. If the dielectric structure is thicker than the above value, the voltage decreases excessively, failing to apply a sufficient voltage to the portion of the liquid crystal layer located below the dielectric structure. As a result, display brightness or the aperture ratio may be reduced. Moreover, if the dielectric structure itself has a low transmittance for visible light, this is observed as reduction in display brightness. The transmittance of the dielectric structure is therefore preferably 95% or more. If the thickness of the dielectric structure is 2 μm or less, transmittance of 95% or more can be attained using any of a variety of types of transparent polymer materials. It should be noted, however, that the orientation state of the portions of the liquid crystal layer located below the dielectric structures is not necessarily the same as that of the portions of the liquid crystal layer in the areas sandwiched by the dielectric structures. Therefore, the display brightness may be varied with the difference in the orientation state of the liquid crystal layer. As a result, there is a case that difference in display brightness is not visually recognized even if the transmittance of the dielectric structures is below 95%. Accordingly, the transmittance of the dielectric structures themselves may be determined appropriately as long as no difference in display brightness is visually recognized between the portions of the pixel region having the dielectric structures and the portions thereof having no dielectric structures.

In addition, SSC can be effectively suppressed/prevented in the following manner. The relative dielectric constant of the dielectric structures formed to cover at least the sides of the electrodes and/or the spaces between the electrodes is set at a value larger than the absolute of the relative dielectric constant anisotropy ($\Delta\epsilon$) of the liquid crystal material. By this setting, it is possible to induce a larger number of electric lines of power generated between the adjacent electrodes into the dielectric structures than into the liquid crystal layer. That is, it is possible to selectively induce lateral electric lines of power generated between the adjacent electrodes having a potential difference into the dielectric structures, so as to reduce the number of electric lines of power (the intensity of the electric field) generated in the liquid crystal layer. The relative dielectric constant of the dielectric structures is preferably larger than the larger one of the relative dielectric constants ($\Delta//$ and $\epsilon\perp$) of the liquid crystal material. Instead of increasing the relative dielectric constant of the dielectric structures, it is possible to additionally form a high dielectric layer (layer having a relative dielectric constant larger than the absolute of the relative dielectric constant the anisotropy ($\Delta\epsilon$) of the liquid crystal material). The relative dielectric constant of the high-dielectric layer is preferably larger than the larger one of the relative dielectric constants ($\epsilon//$ and $\epsilon\perp$) of the liquid crystal material. It is naturally possible to combine the dielectric structures having a high relative dielectric constant with the high dielectric layer. The high dielectric layer may be formed on the top or bottom of the dielectric structures.

Alternatively, the crosstalk phenomenon due to a leak electric field (including SSC) can be effectively suppressed even with the dielectric structures made of a material having a relative dielectric constant smaller than the absolute of the relative dielectric constant the anisotropy ($\Delta\epsilon$) of the liquid crystal material. Electric lines of power output from the portion of the electrode located in the periphery zone where the dielectric structure is formed are weakened during the passing of the lines through the dielectric structure. As a result, the intensity of the electric lines of power generated between the adjacent electrodes (pixel regions) is lowered, thereby weakening the electric field (voltage) applied to the portion of the liquid crystal layer located below the dielectric structure. The above effect is presumably obtained if the relative dielectric constant of the dielectric structure formed in the periphery zone is smaller than the larger one of the relative dielectric constants ($\epsilon//$ and $\epsilon\perp$) of the liquid crystal material. It is however preferable to have a relative dielectric constant smaller than the absolute of the relative dielectric constant the anisotropy ($\Delta\epsilon$) of the liquid crystal material.

The SSC-induced crosstalk phenomenon greatly reduces display quality of the PALCD device using a liquid crystal material having negative dielectric anisotropy. The present invention is therefore significantly effective for this type of device.

The crosstalk phenomenon depends on the basic structure of the PALCD device (the widths of the electrodes and the plasma channels, the distance between the electrodes, presence or absence of a black matrix, the drive voltage, and the like). Accordingly, the position and the size of the dielectric structures may be appropriately set depending on the structure of the PALCD device.

DESCRIPTION OF THE PREFERRED EMBODIMENTS

Hereinafter, preferred embodiments of the present invention will be described with reference to the accompanying drawings.

EMBODIMENT 1

Figure 1A:
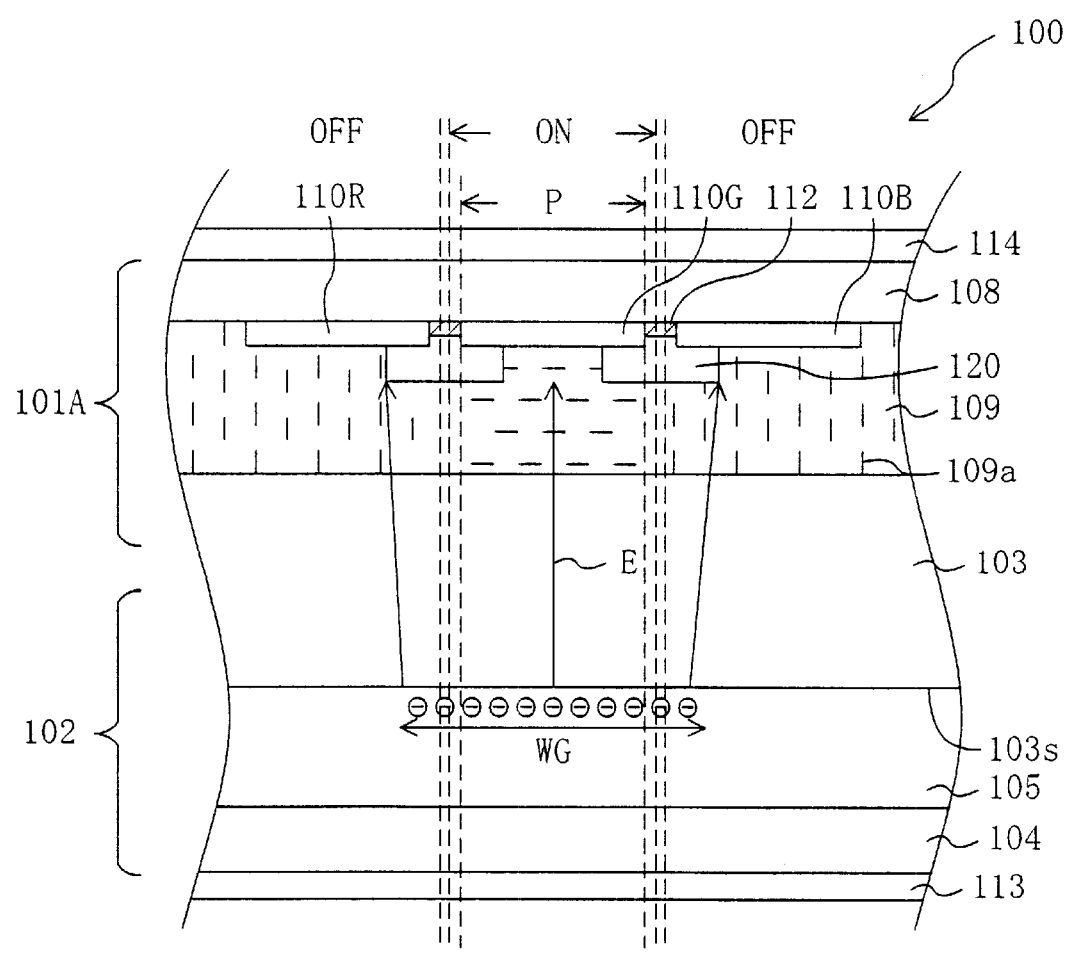
FIGS. 1A and 1B are a schematic cross-sectional view and a schematic top view, respectively, of a PALCD device of EMBODIMENT 1 of the present invention.
Figure 1B:
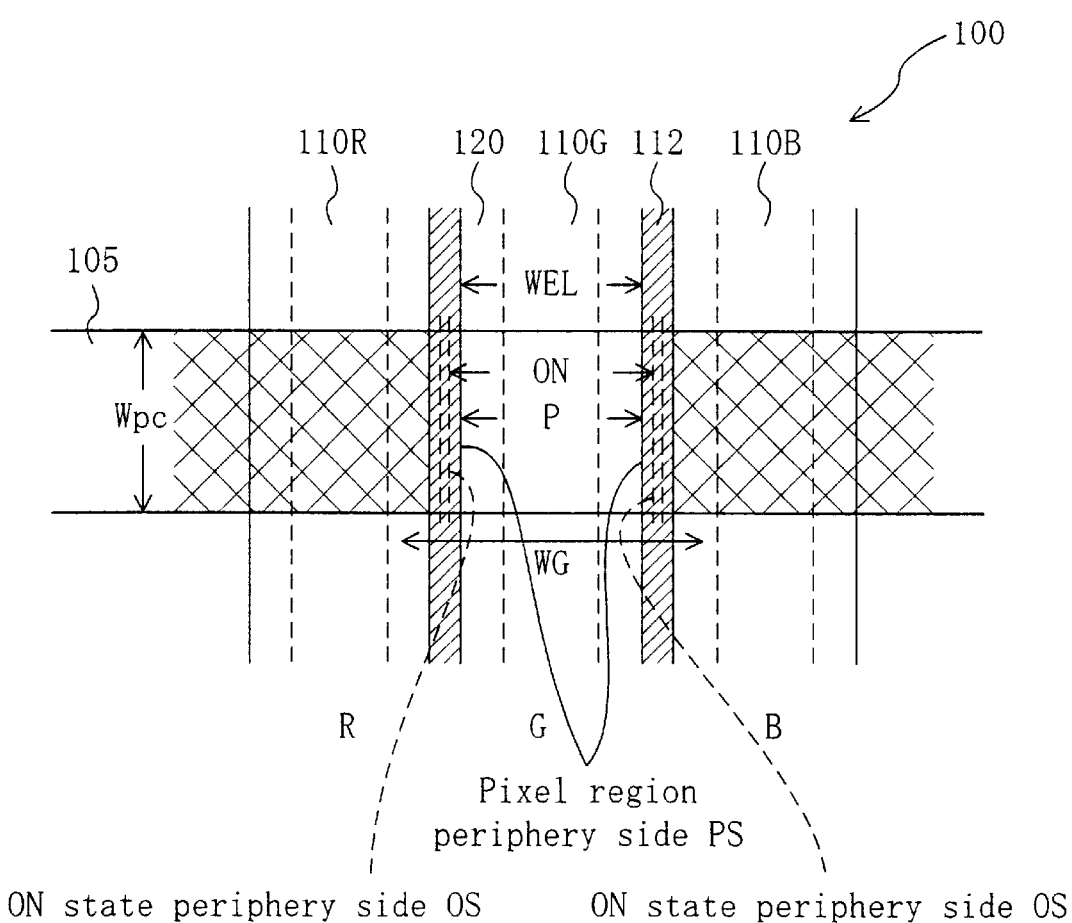

FIGS. 1A and 1B illustrate a PALCD device 100 of EMBODIMENT 1. The PALCD device 100 is a normally black mode LCD device using a liquid crystal material having negative dielectric anisotropy where liquid crystal molecules are vertically oriented. FIGS. 1A and 1B are views corresponding to FIGS. 22A and 22B, respectively. The present invention is broadly applicable to known PALCD devices irrespective of the display mode, the type of the liquid crystal material, and the structure of the plasma cells.

The PALCD device 100 has a layered structure composed of a liquid crystal cell 101 and a plasma cell 102 with a dielectric sheet 103 interposed therebetween. A pair of polarizing plates 113 and 114 sandwich the liquid crystal cell 101 and the plasma cell 102. As the polarizing plates, NPF-G1220G manufactured by Nitto Denko Corp., for example, may be used. Typically, a backlight (not shown) is disposed on the back of the plasma cell 102.

The plasma cell 102 includes: an insulating substrate 104 having a plurality of parallel stripe grooves 105 formed therein; and the dielectric sheet 103. Each of the plurality of grooves 105 formed in the substrate 104 is sealed with the dielectric sheet 103. The sealed space of the groove is filled with gas ionizable with discharge (for example, helium, neon, argon, xenon, a mixture of two or more of these gases, or any of these gases with oxygen added thereto), forming a plasma channel 105 (denoted by the same reference numeral as the groove). A pair of plasma electrodes (not shown) are placed on the bottom of each groove 105.

The liquid crystal cell 101 includes a substrate 108, the dielectric sheet 103, and a liquid crystal layer 109 interposed between the substrate 108 and the dielectric sheet 103. The thickness of the liquid crystal layer 109 is 6 $\mu$m, for example (hereinafter, the "thickness of the liquid crystal layer" indicates the thickness of the liquid crystal layer located in the portion of the pixel region where no dielectric structure or the like is formed, unless otherwise specified). As a liquid crystal material, used is a material having $\Delta\epsilon=-4.0$ ($\epsilon_{//}=3.5$ and ε⊥=7.5), Δn=0.08 adjusted to twist by 90° in the thickness of 6 μm by adding a chiral agent. As alignment films (not shown) for vertically aligning liquid crystal molecules, used is JALS-204 manufactured by Japan Synthetic Rubber Co., Ltd. (JSR), for example. The alignment films are formed in contact with the top and bottom surfaces of the liquid crystal layer 109.

A plurality of parallel stripe electrodes (column electrodes) 110 are formed on the surface of the substrate 108 facing the liquid crystal layer 109. The electrodes 110 are arranged to cross the plasma channels 105. Pixel regions P are formed in the respective crossings of the electrodes 110 and the plasma channels 105. The electrodes 110 are formed of indium tin oxide (ITO), for example, by a normal method. The width of the electrodes is 324 μm, for example, and the distance between the electrodes is 40 μm. A black matrix 112 is formed to fill the spaces between the electrodes. The black matrix 112 is made of a metal material having a light shading property such as chromium. The electrodes 110 and the black matrix 112 are electrically isolated from each other (via a silicon oxide film not shown, for example). The substrate 108 further includes colored layers (not shown) at positions corresponding to the electrodes 110. The colored layers, which are typically red, green, and blue layers, may be formed on the surface of the electrodes 110 facing the substrate 108 or the surface thereof facing the liquid crystal layer 109.

The pixel region P in design of the PALCD device 100 is defined as described above in relation with the conventional PALCD device 200. That is, the width of the pixel region P along the length of the plasma channel 105 is defined by the opening of the black matrix 112, which is equal to the width WEL of the electrode 110 in the illustrated example. The width of the pixel region P along the length of the electrode 110 is defined by the width WPC of the plasma channel 105 (see FIG. 1B). In the illustrated example, periphery sides PS running in parallel with the length of the stripe electrode 110 (orthogonal to the length of the plasma channel 105) are defined by the sides of the black matrix (in the illustrated example, identical to the sides of the electrodes 110). As will be described later, since the PALCD device 100 is provided with dielectric structures 120, substantially no crosstalk phenomenon occurs, and thus the pixel region in actual display is identical to the pixel region P in design. That is, adjacent pixel regions in actual display do not overlap each other.

The PALCD device 100 further includes the dielectric structures 120 on the surface of the substrate 108 facing the liquid crystal layer 109. The dielectric structures 120 are selectively formed between the electrodes 110 and the liquid crystal layer 109 in periphery zones including the periphery sides PS of the pixel regions P. Each of the dielectric structures 120 is formed to cover the sides of the electrodes 110 and the black matrix 112 that define the periphery sides PS of the pixel regions P. The dielectric structure 120 is also formed to cover the space between the adjacent two electrodes 110 (for example, between electrodes 110R and 110G), that is, the black matrix 112, as well as the sides of the two electrodes facing each other. For example, the dielectric structure 120 is a stripe structure having a width of 180 μm and a height (thickness) of 1 μm, of which the section along the width is rectangular. Both side portions (70 μm wide each) of the dielectric structure 120 along the width thereof are located on the electrodes 110. The dielectric structures 120 may be formed of a transparent polymer material (for example, an acrylic resin having a relative dielectric constant of 3.5) by a known photolithography process.

In the periphery zone having the dielectric structure 120, the voltage applied between the electrode 110 and a dielectric bottom surface 103S is divided according to capacitances formed by the dielectric bottom surface (virtual electrode) 103S/dielectric sheet 103/liquid crystal layer 109/dielectric structure 120/electrode 110. Assuming that the relative dielectric constant of the dielectric structure 120 is equal to those of the liquid crystal layer 109 and the dielectric sheet 103, the voltage applied to the liquid crystal layer 109 in the periphery zone is divided in proportion to the thicknesses of the dielectric sheet 103, the liquid crystal layer 109, and the dielectric structure 120. Accordingly, by adjusting the thickness of the dielectric structure 120, the thickness of the liquid crystal layer 109 in the periphery zone is controlled and thus the magnitude of the voltage applied to the liquid crystal layer 109 in the periphery zone is adjusted. By this adjustment, the crosstalk phenomenon can be suppressed/prevented. Strictly, the voltage is divided according to the capacitances formed between the electrode 110 and the dielectric bottom surface 103S as described above. Therefore, the thickness of the dielectric structure 120 should be determined in consideration of the relative dielectric constants of the respective components.

Hereinafter, the operation of the PALCD device 100 will be described with reference to FIG. 1B in comparison with FIG. 22B.

As described above with reference to FIG. 22B, in the conventional PALCD device 200, when the center pixel region P is selectively turned ON, a crosstalk phenomenon occurs. That is, portions of the adjacent pixel regions P beyond the width of the center pixel region P in design are also turned ON. In other words, the pixel region in display overlaps at least part of the adjacent pixel regions. On the contrary, in the PALCD device 200 of EMBODIMENT 1, when the center pixel region P is turned ON, the width of the region actually turned ON does not expand to the adjacent pixel regions P as shown in FIG. 1B. This is due to the fact that the voltage applied to the periphery zones of the pixel region P is smaller than the voltage applied to the other area due to the existence of the dielectric structures 120.

The black matrix 112 exists between the electrodes 110 as shown in FIG. 1B. Therefore, by arranging the dielectric structures 120 so that periphery sides OS of the region actually turned ON are located below the black matrix 112, it is possible to match the pixel region in display with the pixel region P in design. This makes it possible to not only prevent occurrence of a crosstalk phenomenon, but also utilize the entire region between the adjacent stripes of the black matrix 112 for display.

The function and effect of the dielectric structures 120 will be described in more detail.

Figure 24:
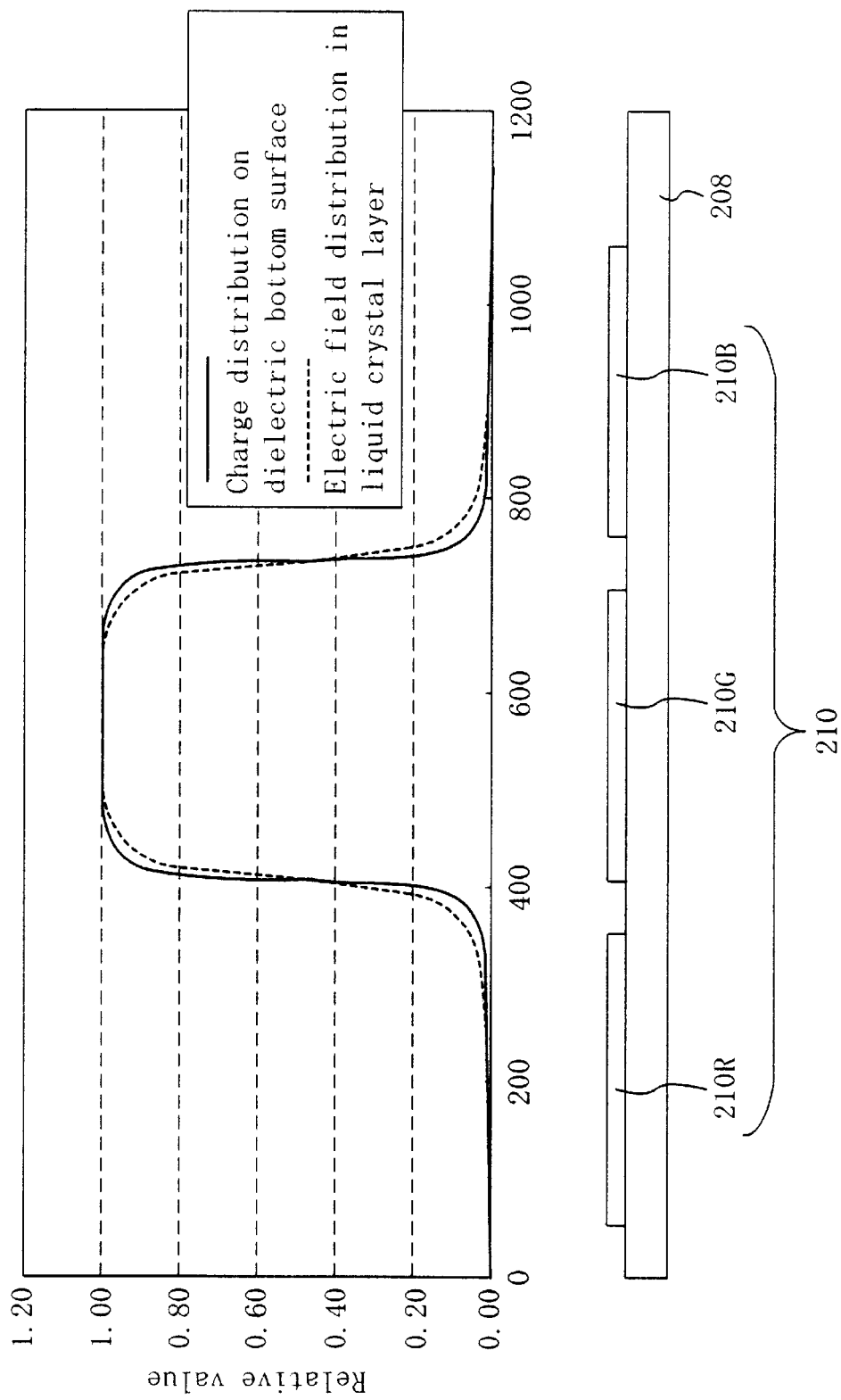
FIG. 24 is a graph showing simulation results for description of data diffusion crosstalk (DDC) in the conventional PALCD device.
Figure 25:
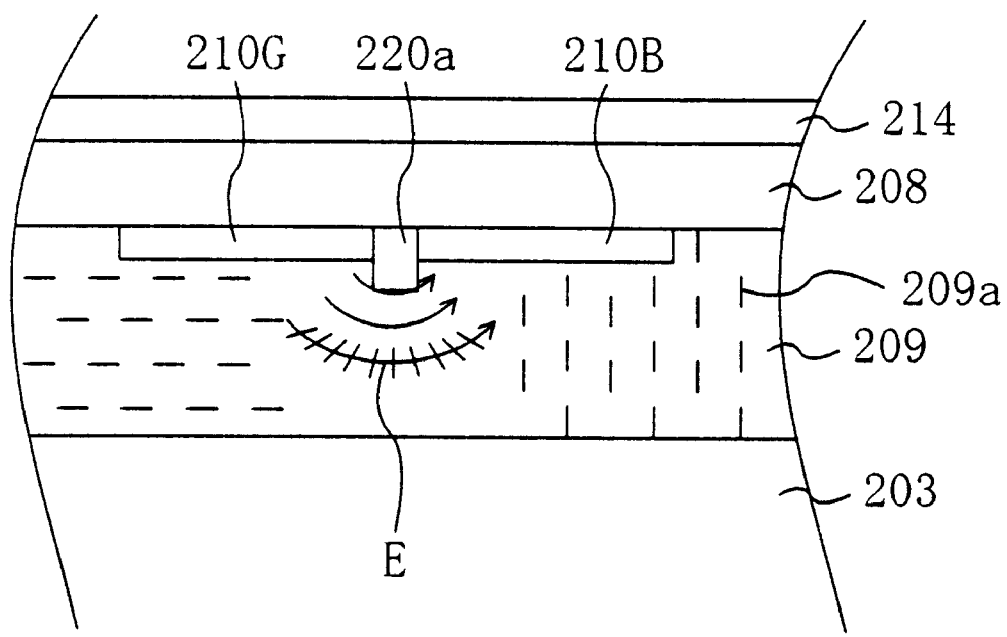
FIG. 25 is a schematic view for description of side to side crosstalk (SSC) in the conventional PALCD device.
Figure 26:
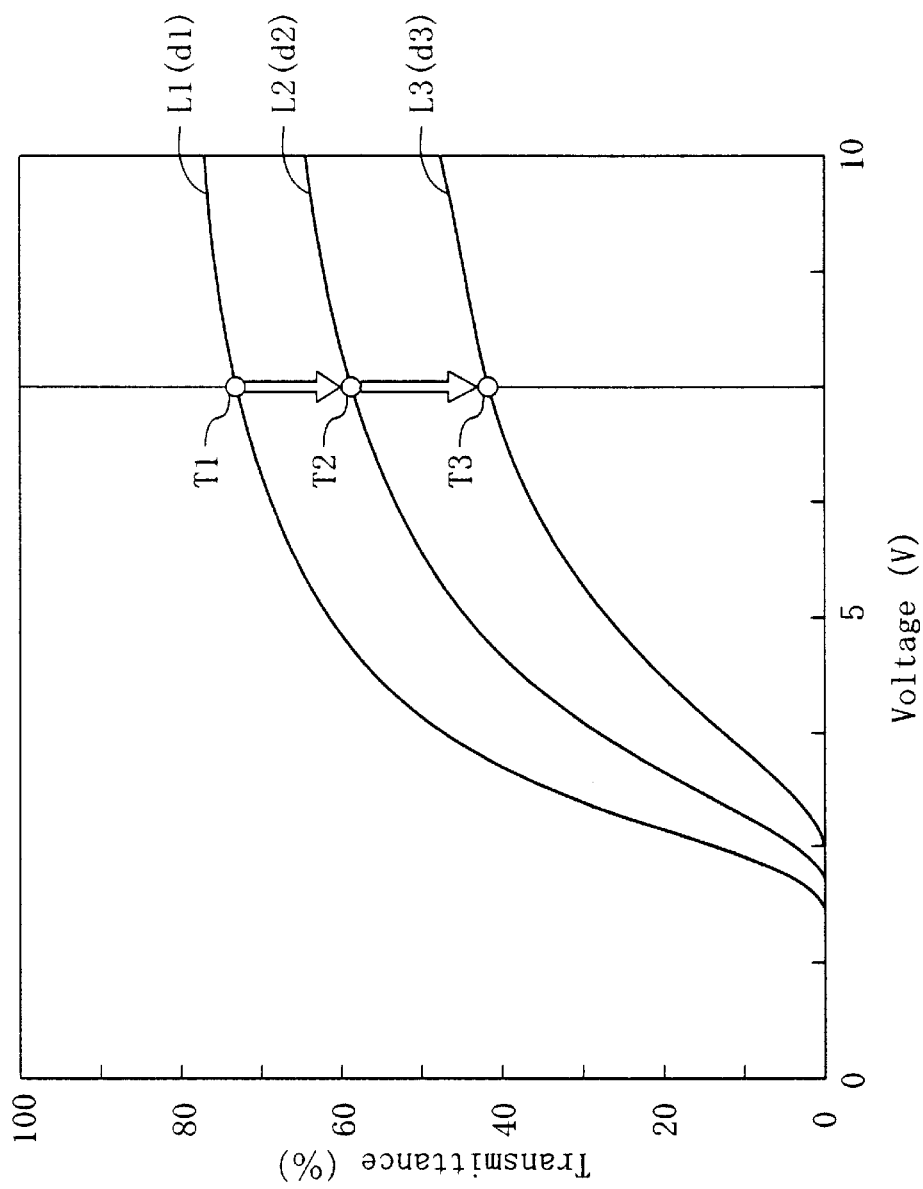
FIG. 26 is a graph showing typical voltage-transmittance curves of LCD devices having liquid crystal layers different in thickness.
Figure 27:
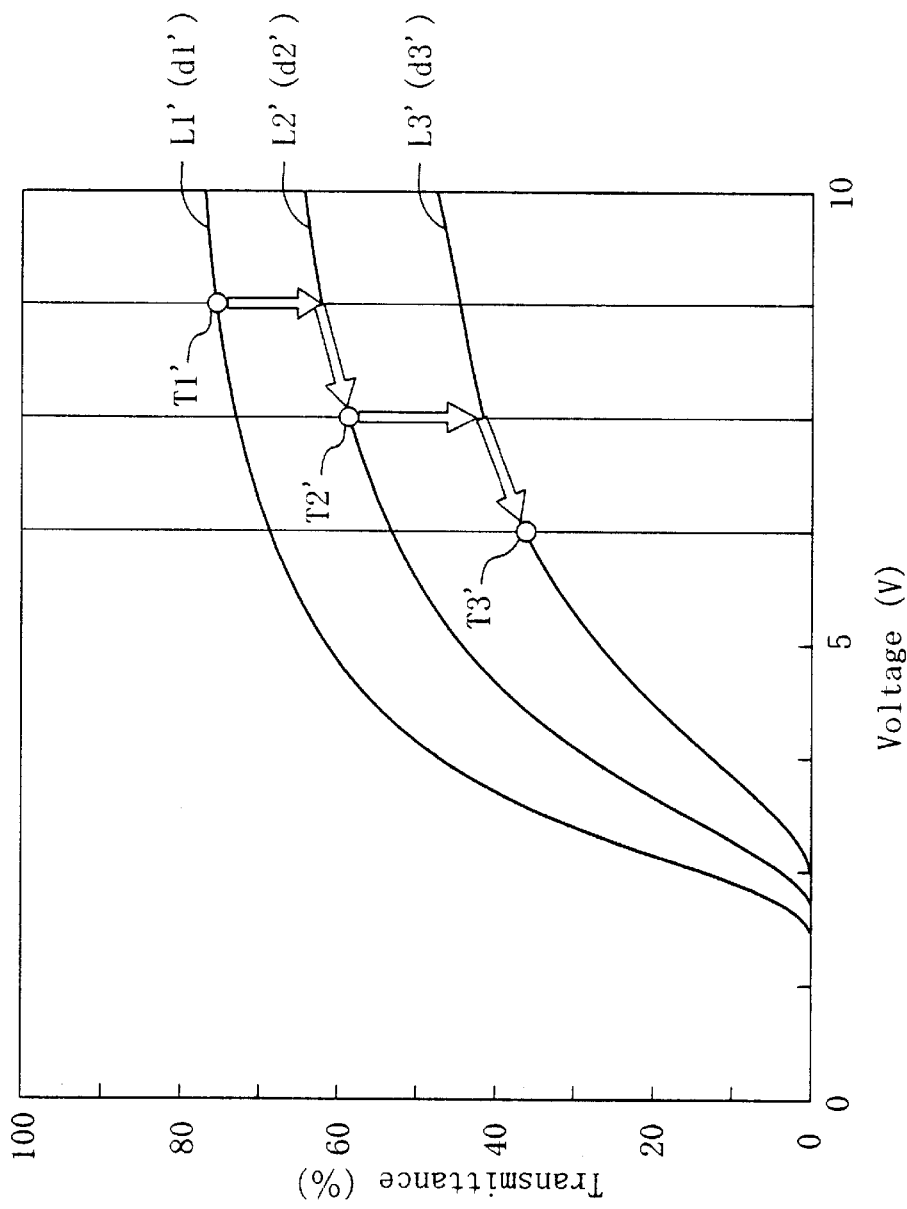
FIG. 27 is a graph showing typical voltage-transmittance curves of PALCD devices having liquid crystal layers different in thickness.

The PALCD device 100 has substantially the same construction as the conventional PALCD device 200 except that the former is additionally provided with the dielectric structures 120. Accordingly, it is revealed from simulation that if the PALCD device 100 does not include the dielectric structures 120, the maximum drive voltage (voltage giving the maximum transmittance; specifically, 80 V) provides an electric field intensity distribution as shown in FIG. 24. That is, the leak electric field (voltage) influences over the distance of about 110 μm from the periphery sides toward the centers of the adjacent electrodes 110.

In the plasma address LCD device 100, each dielectric structure 120, which has a thickness of 1 μm, overlaps, by a width of 70 μm each, the adjacent electrodes 110 that have a width of 324 μm each and are apart from each other with a gap of 40 μm. In other words, the dielectric structure 120 having a width of 180 μm (gap between the electrodes 40 μm+overlap 70 μm×2) is formed so as to cover the entire distance of 110 μm up to which the electric field from the adjacent electrode 110 influences. Accordingly, the applied voltage is smaller for the liquid crystal layer 109 in the periphery zone having the 1 μm-thick dielectric structure 120 than for the liquid crystal layer 109 in the other area. Specifically, the thickness of the liquid crystal layer 109 in the periphery zone is 5 μm, while that in the other area is 6 μm. If it is assumed that the thickness of the dielectric sheet 103 is 50 μm and that all the components have the same relative dielectric constant, the drive voltage applied to the liquid crystal layer 109 in the periphery zone is about 85% ($[\{5/(50+5)\}/\{6/(50+6)\}] \times 100$) of the drive voltage $V_D$ applied to the liquid crystal layer 109 in the other area. This reduction in the drive voltage applied to the liquid crystal layer 109 in the periphery zone allows for suppression/prevention of a crosstalk phenomenon in the PALCD device 100. Simulation was performed based on the relationship between the thickness of the liquid crystal layer and the voltage-transmittance characteristics, and the following were found. In the case of the illustrated construction, the crosstalk phenomenon can be substantially prevented when the voltage applied to the periphery zone is 90% or less of the voltage applied to the other area. In the case of a general construction, the crosstalk phenomenon can be substantially prevented when the voltage applied to the periphery zone is 85% or less of the voltage applied to the other area. It should be noted that the transmittance is influenced by the decrease in applied voltage (that is, increase in apparent threshold voltage (that can be represented by a voltage causing a change of 10% in relative transmittance)) due to the existence of the dielectric structure depending on the voltage-transmittance characteristics (V-T curve) of the liquid crystal layer. Therefore, the crosstalk suppression effect may be obtained even when the applied voltage is outside the above range.

The dielectric structure 120 made of the transparent polymer material described above has a transmittance of 95% or more for visible light. Accordingly, no reduction in brightness is recognized due to light absorption of the dielectric structure 120, ensuring high-quality display. If the thickness of the dielectric structure is about 2 μm or less, it is possible to obtain the dielectric structure having its transmittance of 95% or more for visible light using any of a variety of transparent polymer materials.

As described above, the PALCD device 100 of EMBODIMENT 1 the present invention realizes high-quality display without occurrence of a crosstalk phenomenon nor decrease in display brightness. In this relation, the effect of the first dielectric structures 120 of confining a lateral leak electric field therein may possibly contribute to some extent to the prevention of occurrence of a crosstalk phenomenon in the PALCD device 100. This effect will be described later.
(Modifications)

Figure 2A:
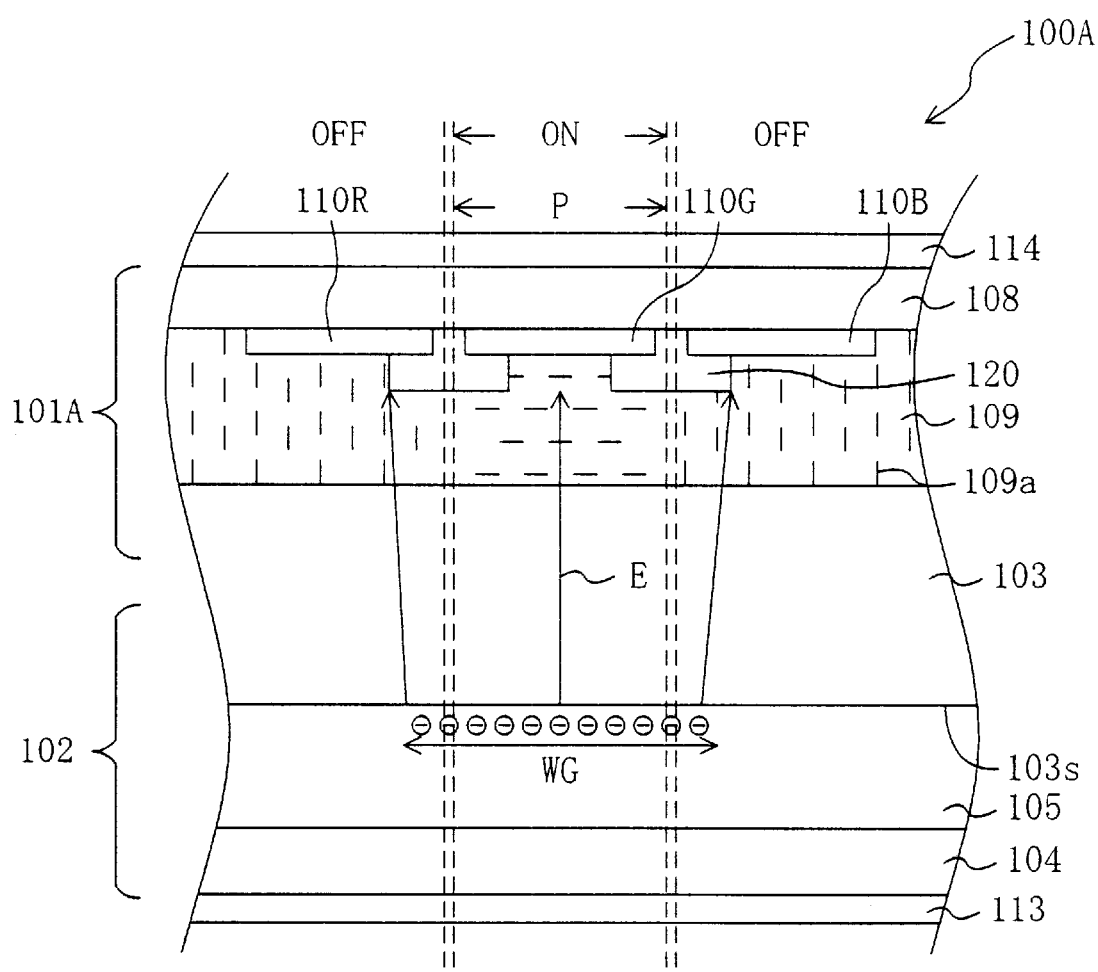
FIGS. 2A and 2B are a schematic cross-sectional view and a schematic top view, respectively, of a modified PALCD device of EMBODIMENT 1 of the present invention.
Figure 2B:
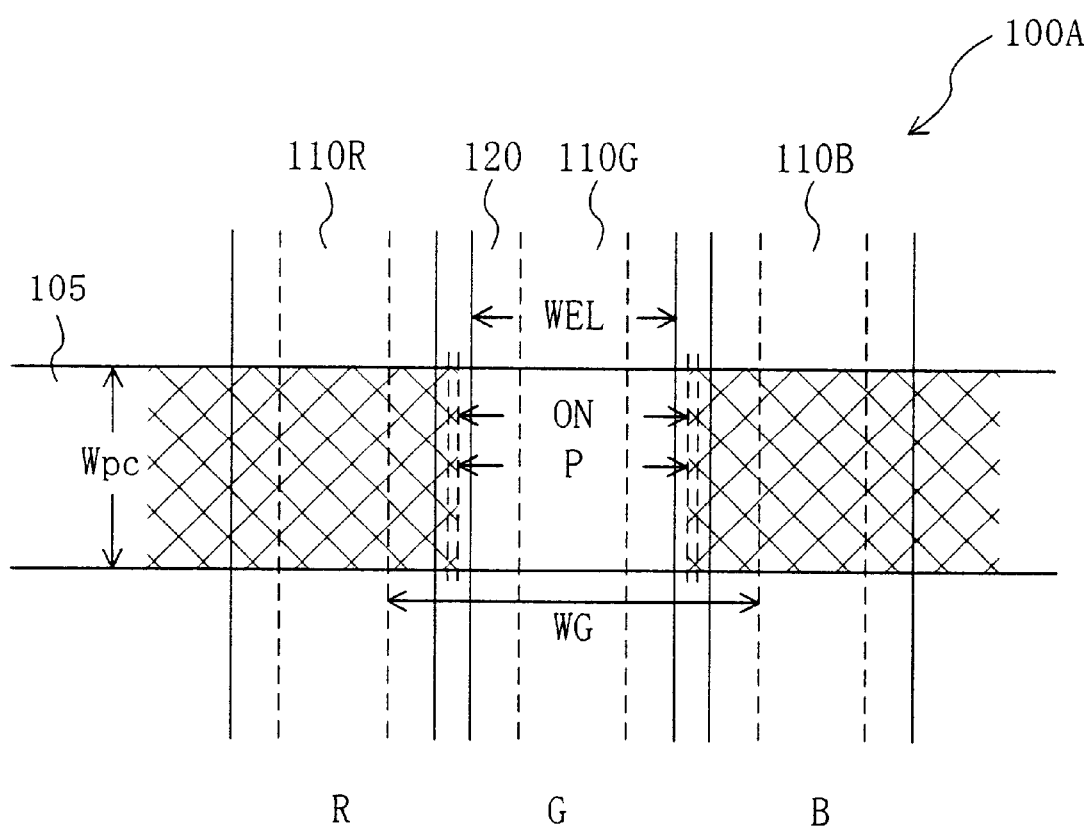

The black matrix may be omitted as a PALCD device 100A shown in FIGS. 2A and 2B, which are views corresponding to FIGS. 1A and 1B. In FIGS. 2A and 2B and other relevant drawings to follow, components having substantially the same functions as those of PALCD device 100 shown in FIGS. 1A and 1B are denoted by the same reference numerals, and the description thereof is omitted.

The PALCD device 100A has the same construction as the PALCD device 100 except that no black matrix is formed. In a normally black mode LCD device, black is displayed in the regions with no voltage applied (in the OFF state).

Therefore, the black matrix can be omitted by forming the dielectric structures 120 constructed (in the thickness and the like) so that the portions of the liquid crystal layer 109 located between the adjacent pixel regions P are always in the OFF state (that is, a voltage equal to or more than the threshold voltage is never applied).

As shown in FIG. 2B, the pixel region P of the PALCD device 100A having no black matrix is somewhat larger than the pixel region P of the PALCD device 100 (see FIG. 1B).

The construction having no black matrix lacks a structure uniquely defining the pixel regions in design (like the black matrix). Therefore, the width of the pixel regions in display may vary depending on the voltage actually applied. The pixel region P shown in FIG. 2B is a pixel region in display. In this construction, design may be made so that the periphery side of the pixel region P in display is located within the width over which the black matrix would otherwise be formed, and that the pixel region P in display has a width equal to or larger than the electrode 110 and does not overlap the adjacent pixel region. In this construction, also, the dielectric structures 120 are formed in the periphery zones including the periphery sides of the pixel region P.

Figure 3:
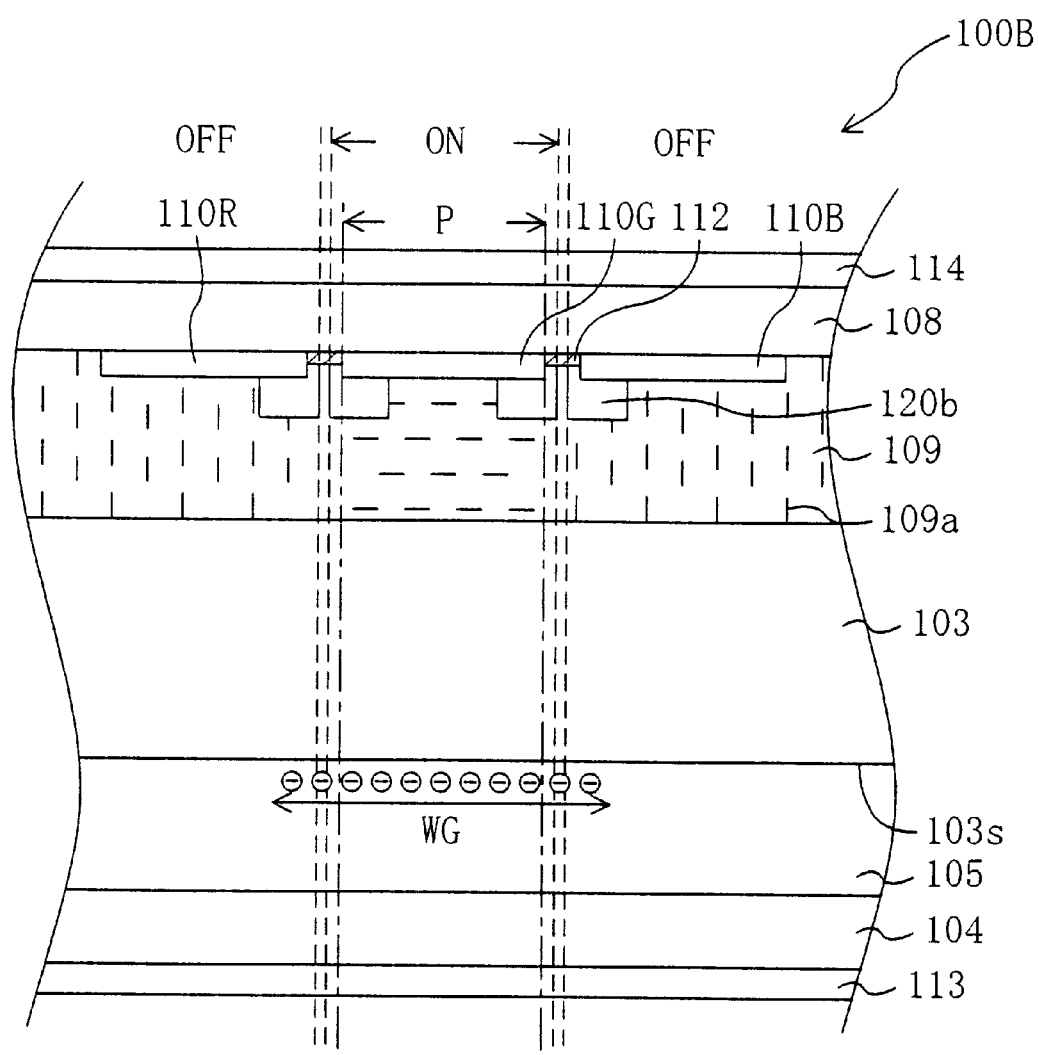
FIG. 3 is a schematic cross-sectional view of another modified PALCD device of EMBODIMENT 1 of the present invention.

Alternatively, as a PALCD device 100B shown in FIG. 3, each dielectric structure 120 in the PALCD device 100 shown in FIG. 1A may be divided into two. FIG. 3 is a view corresponding to FIG. 1A, and the top view of the PALCD device 100B is the same as FIG. 1B, which is therefore omitted here.

Dielectric structures 120b of the PALCD device 100B are individually provided for the adjacent electrodes (for example, the electrodes 110G and 110B) so as to cover the periphery sides of the electrodes facing each other. The gap between the adjacent dielectric structures 120b is located to correspond to the gap between the adjacent pixel regions P (typically to be positioned in the center of the gap). The PALCD device 100B includes the black matrix 112 between the electrodes 110 and thus the resultant display is the same as that of the PALCD device 100. If the black matrix 112 is omitted, the resultant display is the same as that of the PALCD device 100A.

Figure 4A:
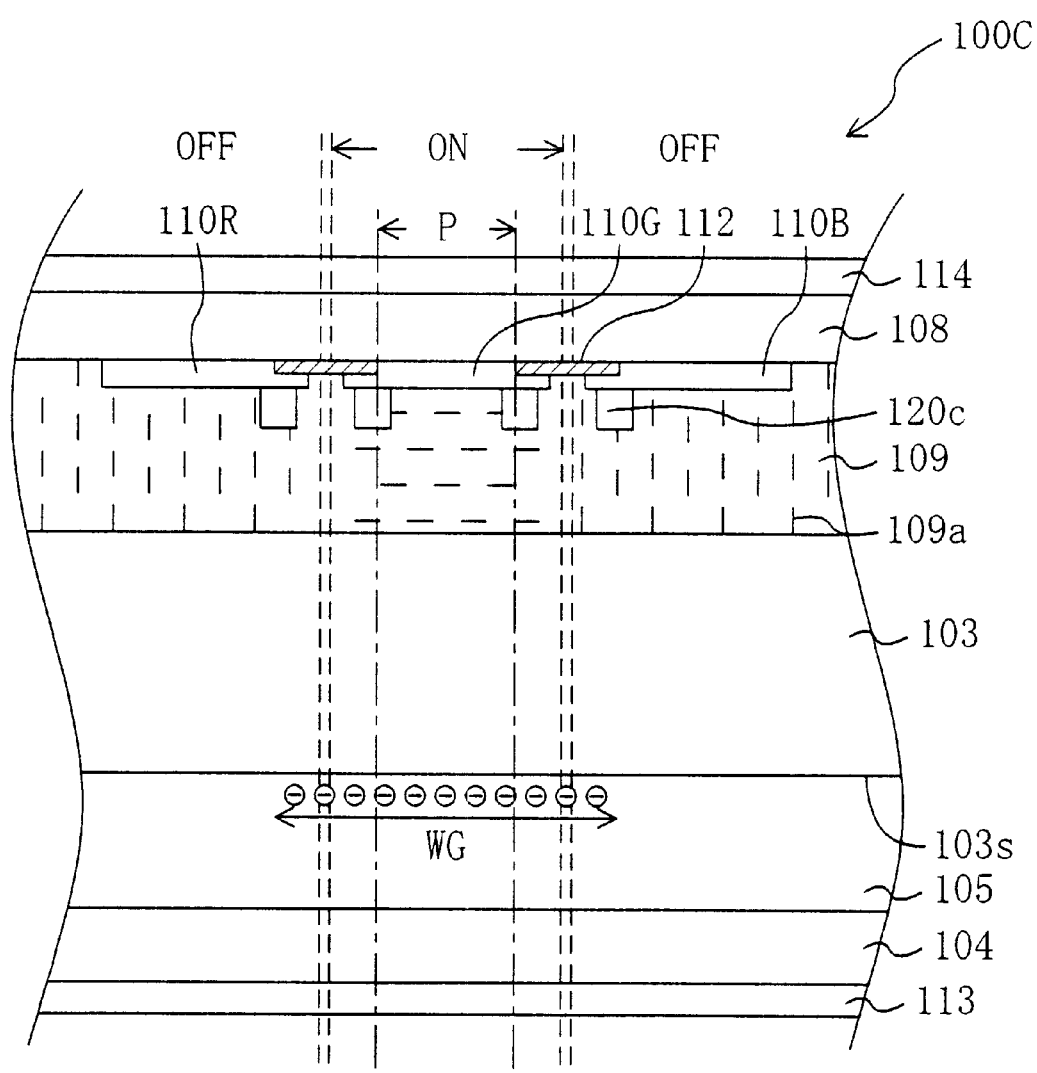
FIGS. 4A and 4B are a schematic cross-sectional view and a schematic top view, respectively, of yet another modified PALCD device of EMBODIMENT 1 of the present invention.
Figure 4B:
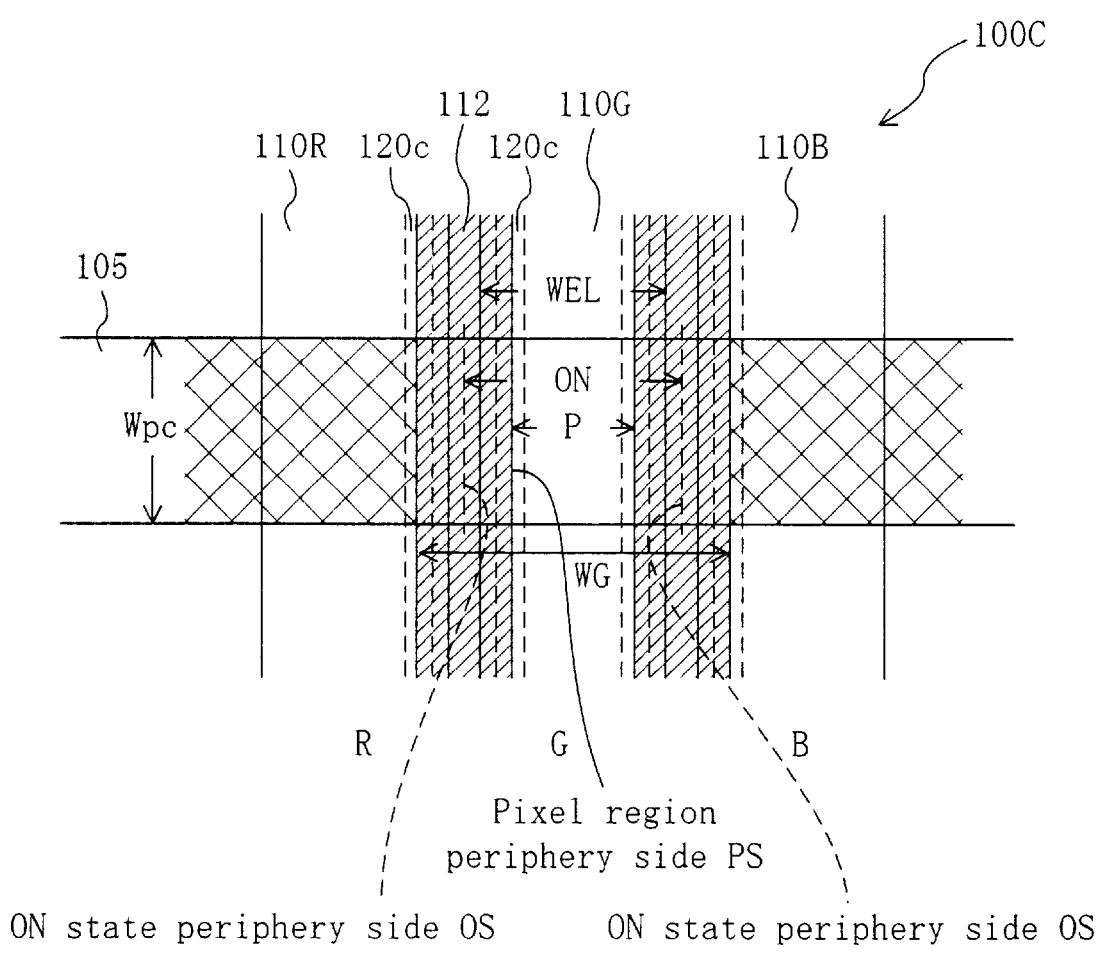

Further, as a PALCD device 100C shown in FIGS. 4A and 4B, the width of the dielectric structures 120b of the PALCD device 100B shown in FIG. 3 may be made smaller. FIGS. 4A and 4B are views corresponding to FIGS. 1A and 1B, respectively.

Dielectric structures 120c of the PALCD device 100C are formed near the sides of the adjacent electrodes (for example, the electrodes 110G and 110B) facing each other, but do not cover the sides. The black matrix 112 has a width larger than the distance between the adjacent electrodes 110, and the dielectric structures 120c are located below the sides of the black matrix 112. In other words, the dielectric structures 112C are formed in the periphery zones including the periphery sides of the pixel region P in design that is defined by the opening of the black matrix 112.

The thus-formed dielectric structures 120c do not necessarily sufficiently reduce a leak electric field (voltage) occurring in the space between the pixel regions P. The region actually turned ON when one pixel region is turned ON is wider in this case compared with the cases of the PALCD devices 100, 100A, and 100B described above. However, since the black matrix 112 is formed in the region turned ON due to the leak electric field (voltage), this does not influence actual display (see FIG. 4B). The existence of the dielectric structures 120c can at least reduce the leak electric field (voltage) compared with the conventional construction. Therefore, by providing the black matrix 112 with an appropriate width, the crosstalk phenomenon can be suppressed/prevented. In the illustrated example, the adjacent regions actually turned ON do not overlap (they are in contact with each other at the center of the space between the electrodes). In the case where such adjacent ON-state regions overlap each other, the dielectric structures 120c may be formed so that the overlap portion is located in an area shaded by the black matrix 112. By doing this, the same effect as that obtained by the PALCD device 100C is obtained.

Figure 5A:
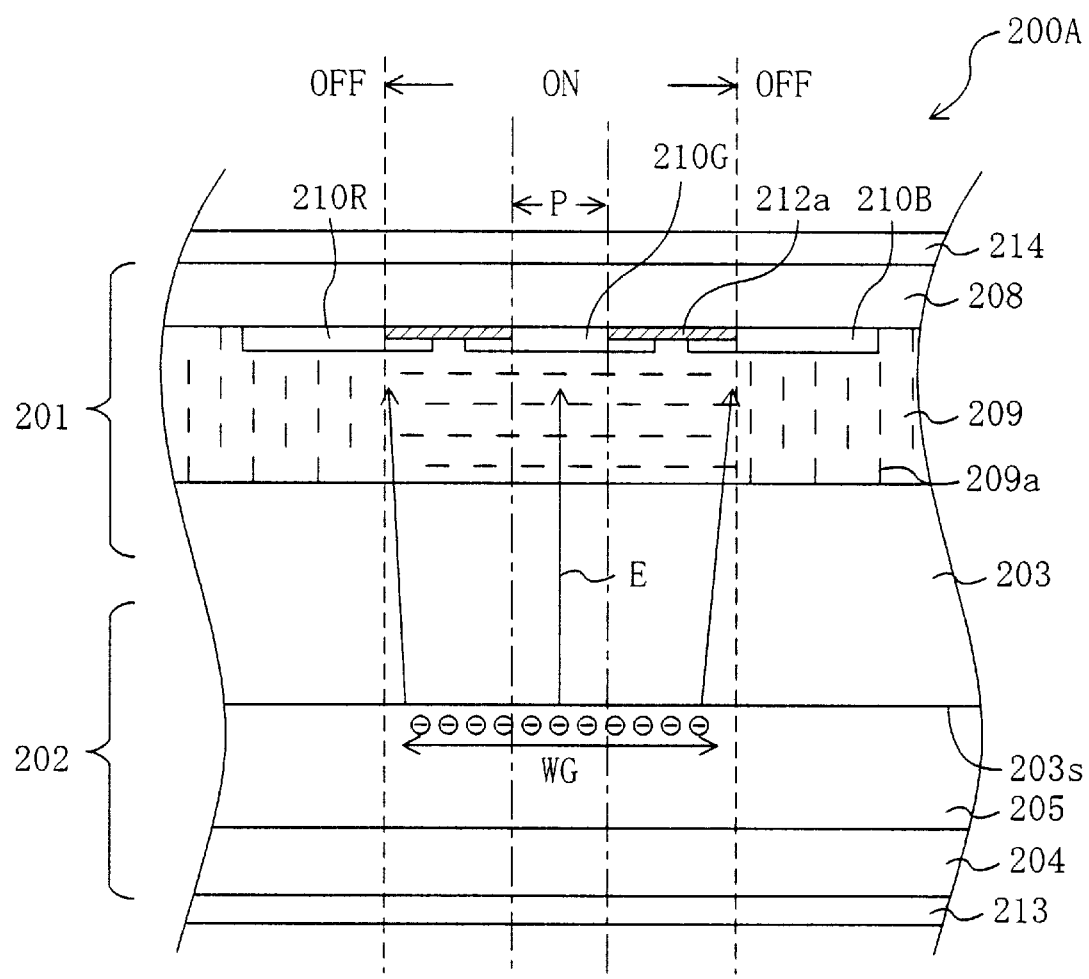
FIGS. 5A and 5B are a schematic cross-sectional view and a schematic top view, respectively, of a PALCD device as a comparative example.
Figure 5B:
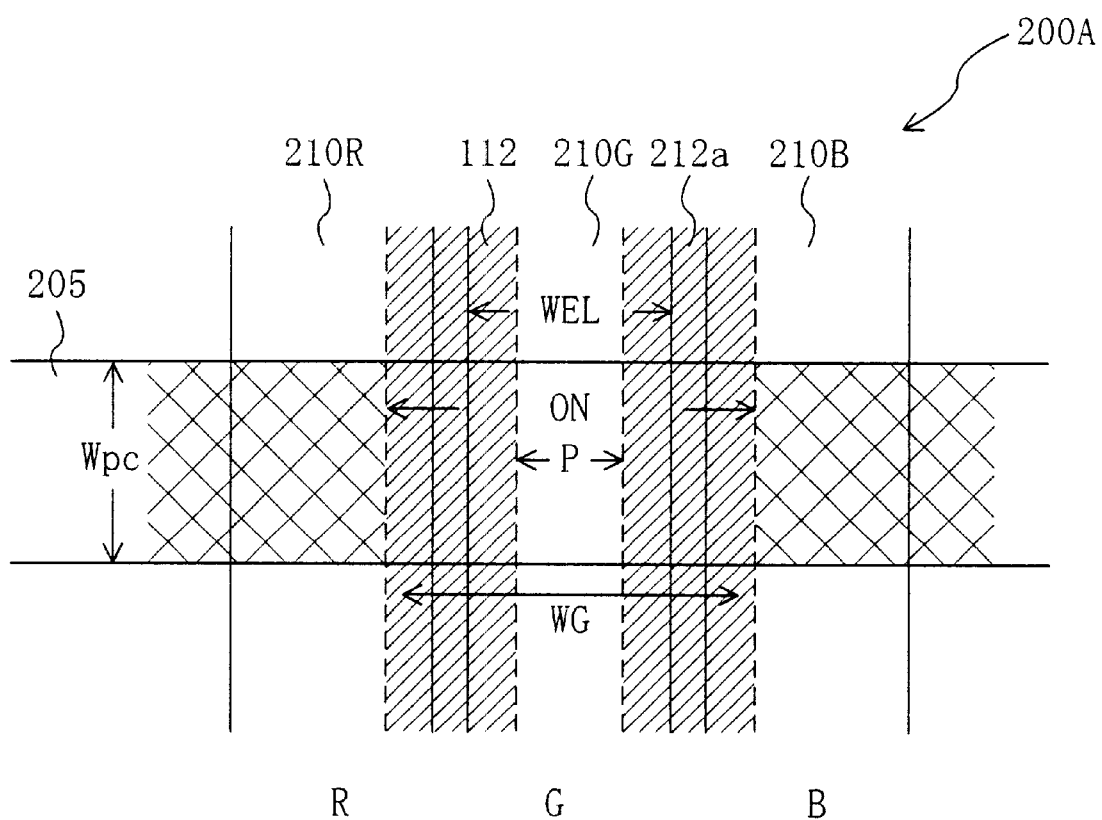

For comparison, FIGS. 5A and 5B illustrate a PALCD device 200A attempting to suppress/prevent a crosstalk phenomenon by enlarging the width of the black matrix in the conventional PALCD device. FIGS. 5A and 5B are views corresponding to FIGS. 22A and 22B, respectively.

Figure 22A:
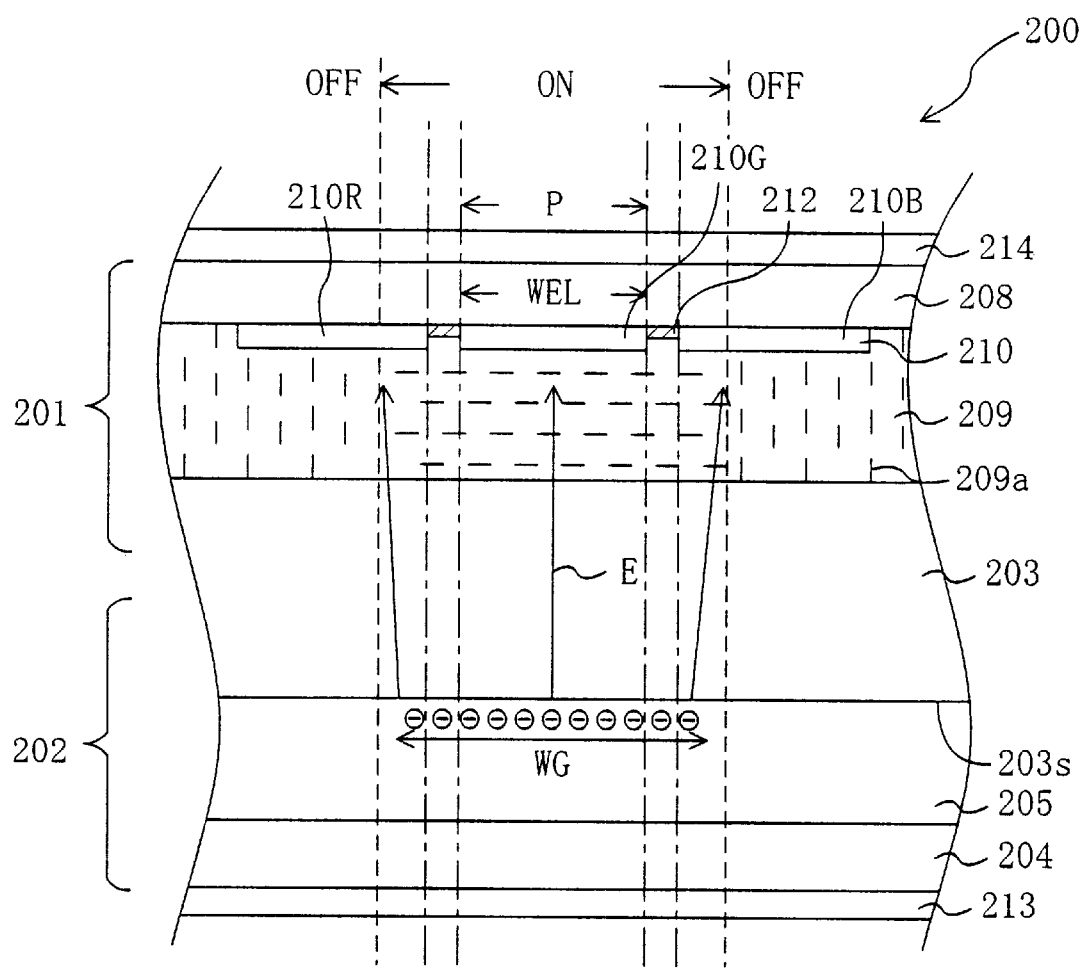
FIGS. 22A and 22B are a schematic cross-sectional view and a schematic top view, respectively, of the conventional PALCD device.
Figure 22B:
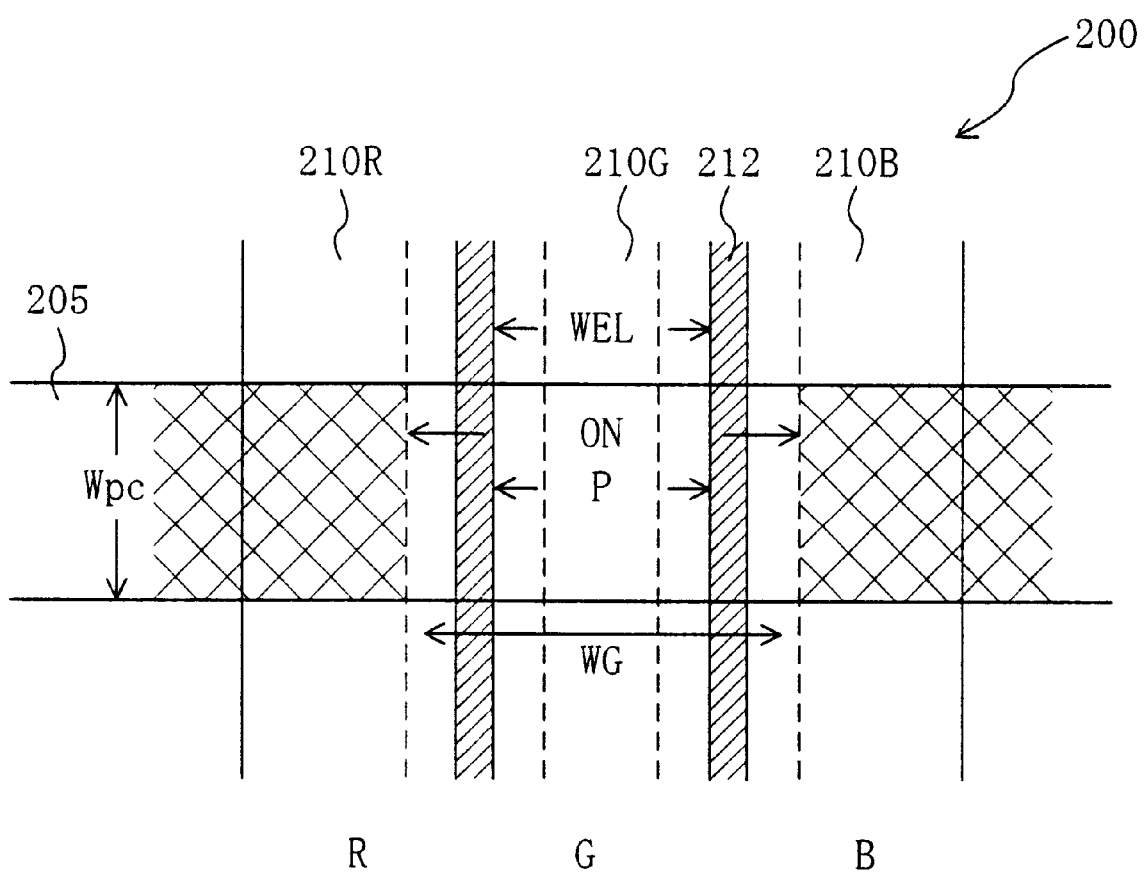

The width of a black matrix 212a of the PALCD device 200A is larger than the width of the black matrix 212 of the conventional PALCD 200 shown in FIGS. 22A and 22B. The components other than the black matrix 212a are the same as those of the PALCD device 200, and therefore denoted by the same reference numerals. The description thereof is omitted here.

The black matrix 212a is formed so as to cover the entire region turned ON due to a leak electric field (voltage). The PALCD device 200A is therefore free from occurrence of a crosstalk phenomenon. However, the pixel region P is extremely narrow and thus only dark display is available the contrary, the PALCD device 100C (see FIGS. 4A and 4B) has the dielectric structures 120c selectively formed near the sides of the electrodes 110. Therefore, the black matrix 112 provided for suppression/prevention of occurrence of a crosstalk phenomenon can be made narrower than the black matrix 212a of the PALCD device 200A. This allows for a higher aperture ratio and brighter display than those obtained by the PALCD device 200A.

As described above, by providing the dielectric structures, the crosstalk phenomenon mainly caused by a leak electric field (voltage) to adjacent pixel regions can be suppressed/prevented, and in addition, decrease in aperture ratio can be suppressed. The construction of the dielectric structures may be optimized depending on the construction of the PALCD device (such as the structure of the electrodes, the pitch of pixels, and the voltage-transmittance characteristics of the liquid crystal layer). By this optimization, the effect of suppressing/preventing a crosstalk phenomenon and the effect of suppressing decrease in aperture ratio can be maximized.

Described so far is that the crosstalk phenomenon due to a leak electric field (voltage) to adjacent pixel regions can be suppressed/prevented by providing the dielectric structures in the periphery zones, in relation to DDC. However, in consideration of the fact that the suppression/prevention effect of a crosstalk phenomenon has been experimentally confirmed for the PALC devices of the illustrated constructions, the dielectric structures formed in the periphery zones in this embodiment are presumably effective not only in suppression/prevention of DDC, but also in suppression/prevention of SSC. SSC can be suppressed/prevented further effectively in the following manner.

Figure 6:
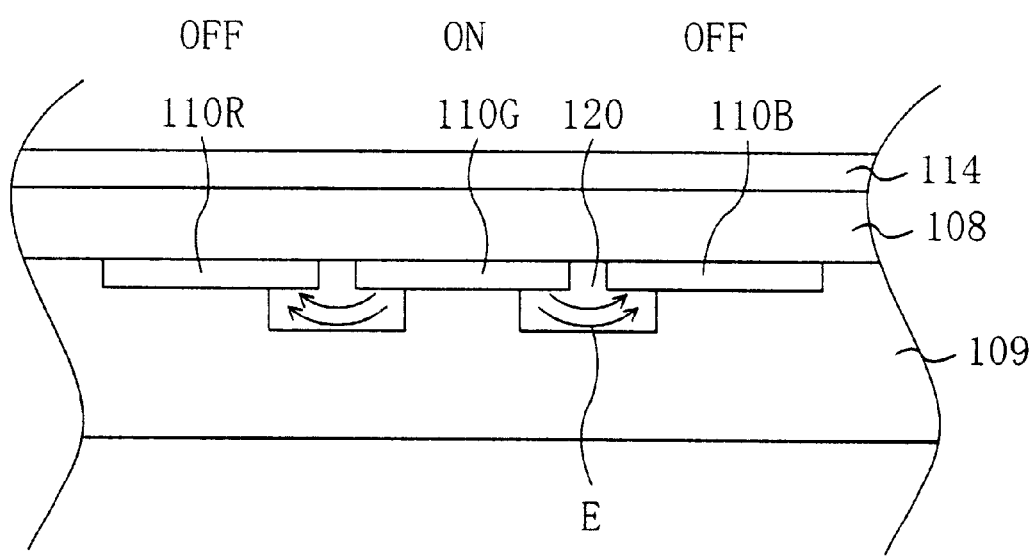
FIG. 6 is a schematic cross-sectional view of a liquid crystal cell of the PALCD device of EMBODIMENT 1 shown in FIGS. 2A and 2B.

FIG. 6 is a partial cross-sectional view of a liquid crystal cell of the PALCD device 100A. If the dielectric structures 120 are made of a material having a relative dielectric constant $\epsilon$ greater than the absolute of relative dielectric constant anisotropy ($\Delta\epsilon$) of liquid crystal molecules 109a, a larger number of electric lines of power generated due to the potential difference between the electrode 110G (ON state) and the electrodes 110R and 110B (OFF state) can be induced into the dielectric structures 120 than into the liquid crystal layer 109. In other words, lateral electric lines of power generated between the adjacent electrodes 110 can be selectively induced into the dielectric structures 120, to reduce the number of electric lines of power (intensity of the electric field) generated in the liquid crystal layer 109. As a result, disorder in orientation of the liquid crystal molecules 109a due to a lateral electric field can be prevented. In particular, in a normally black mode PALCD device using a liquid crystal material having negative dielectric anisotropy, SSC will be recognized as white display in adjacent pixel regions and thus greatly degrade display quality. Therefore, the SSC suppressing/preventing effect is significant in this type of devices.

Figure 7A:
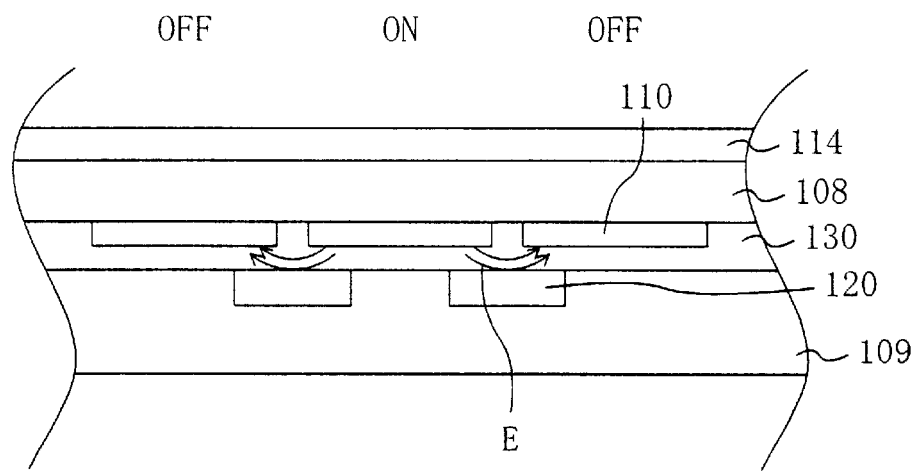
FIGS. 7A and 7B are schematic cross-sectional views of other liquid crystal cells usable for the PALCD device of EMBODIMENT 1 of the present invention.
Figure 7B:
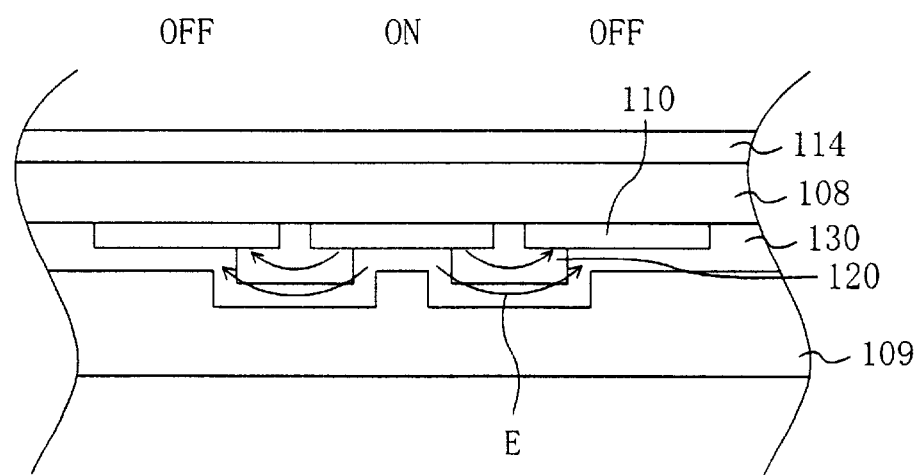

FIGS. 7A and 7B illustrate alterations of the construction shown in FIG. 6. Instead of increasing the relative dielectric constant of the dielectric structures 120, there may additionally be formed a high dielectric layer 130 having a relative dielectric constant greater than the absolute of the relative dielectric constant anisotropy ($\Delta\epsilon$) of the liquid crystal material. The thickness of the high dielectric layer 130 is preferably in the range of 0.5 to 5 $\mu$m. The high dielectric layer 130 may be formed between the dielectric structures 120 and the electrodes 110 as shown in FIG. 7A, or between the dielectric structures 120 and the liquid crystal layer 109 as shown in FIG. 7B. It is also possible to form the dielectric structures 120 using a material having a relative dielectric constant $\epsilon$ greater than the relative dielectric constant (absolute of the relative dielectric constant anisotropy ($\Delta\epsilon$)) of the liquid crystal molecules 109b and additionally form the high dielectric constant layer 130.

The dielectric structures 120 having a high relative dielectric constant and the high dielectric constant layer 130 can be formed of an inorganic thin film such as RTZ-1 ($\epsilon\approx10$) manufactured by CATALYSTS & CHEMICALS IND. CO., LTD. Such a thin film can be patterned into a desired shape by a known photolithography process using a resist, for example. If the liquid crystal layer is made of a liquid crystal material having dielectric anisotropy $\Delta\epsilon=2.7$, $\epsilon//=6.7$, $\epsilon\perp=4.0$ (for example, ZLI-4792 and ZLI-3089 manufactured by Merck & Co., Inc.), it is possible to form the dielectric structures 120 and the high dielectric layer 130 using an acrylic resin having a relative dielectric constant $\epsilon=3.5$, for example.

SSC (possibly including DDC) can also be effectively suppressed with the dielectric structures 120 made of a material having a relative dielectric constant smaller than that of the liquid crystal material. The electric lines of power generated from the portion of the electrode 110 located in the periphery zone where the dielectric structure 120 is formed are weakened during the passing through the dielectric structure 120 made of a material having a low relative dielectric constant. As a result, the intensity of the electric lines of power generated between the adjacent electrodes 110 is lowered, thereby weakening the electric field (voltage) applied to the portion of the liquid crystal layer 109 located below the dielectric structure 120. In this case, the dielectric structure 120 preferably has a relative dielectric constant smaller than the larger one of the relative dielectric constants ($\epsilon//$ and $\epsilon\perp$) of the liquid crystal material. More preferably, the dielectric structure 120 has a relative dielectric constant smaller than the absolute of the relative dielectric constant anisotropy ($\Delta\epsilon$) of the liquid crystal material. Such a dielectric structure 120 having a low dielectric constant can be formed of an acrylic resin and an epoxy resin, for example. Instead of forming the dielectric structure 120 using a low relative dielectric constant material, a low dielectric layer having a thickness of 0.5 to 5 μm may additionally be formed selectively on the portion of the electrode 110 in the periphery zone. The low dielectric layer reduces the intensity of the electric field passing therethrough. Therefore, it is not preferable to cover the entire electrode 110 with the low dielectric layer since the voltage applied to the liquid crystal layer 109 is disadvantageously lowered (the apparent threshold voltage increases).

EMBODIMENT 2

Figure 8A:
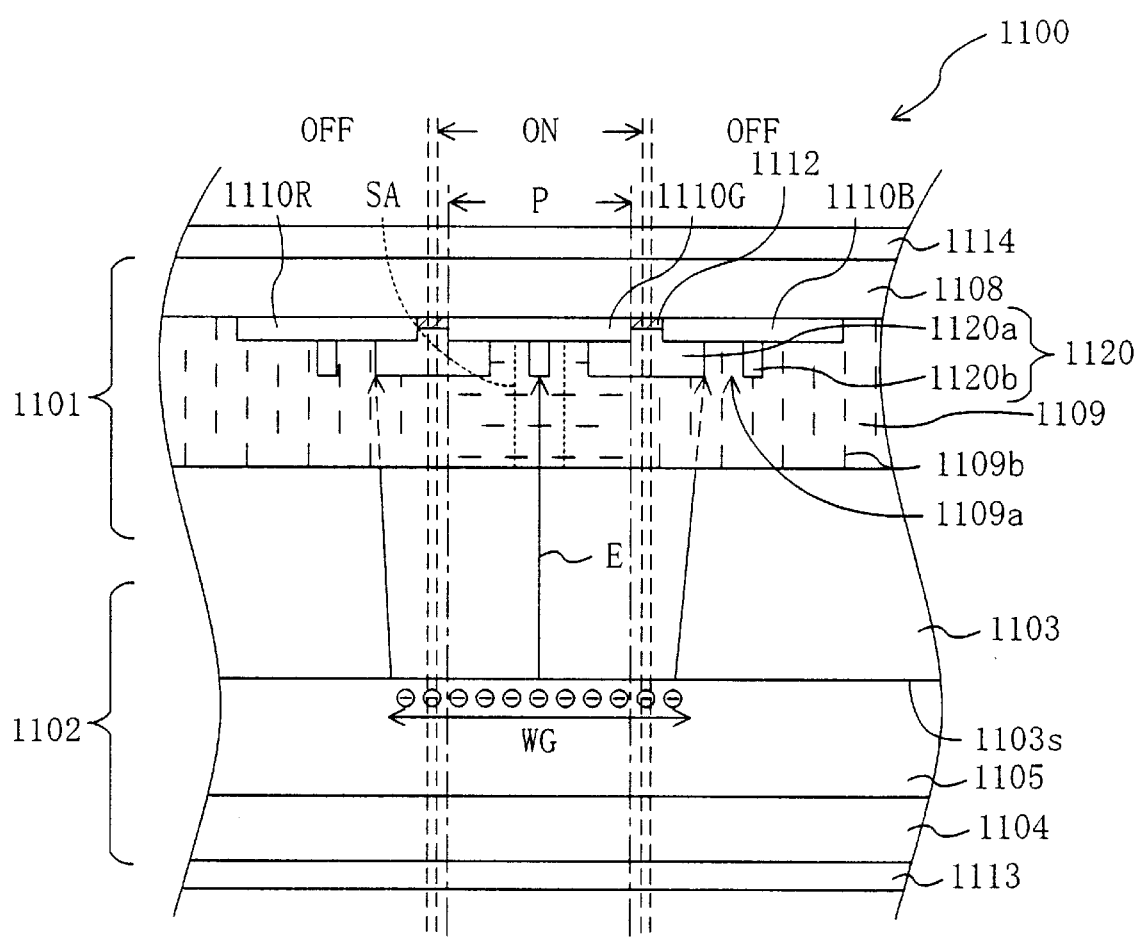
FIGS. 8A and 8B are schematic cross-sectional views of a PALCD device of EMBODIMENT 2 of the present invention, taken parallel to and orthogonally to the length of a plasma channel, respectively.
Figure 8B:
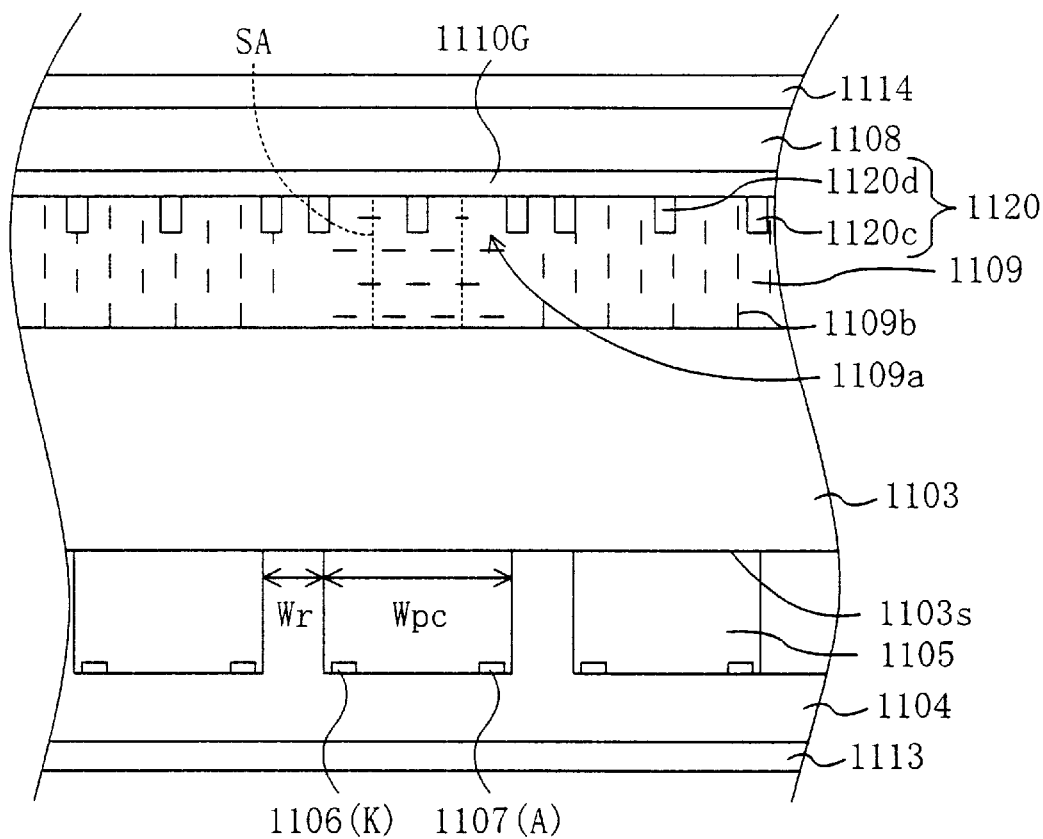
Figure 8C:
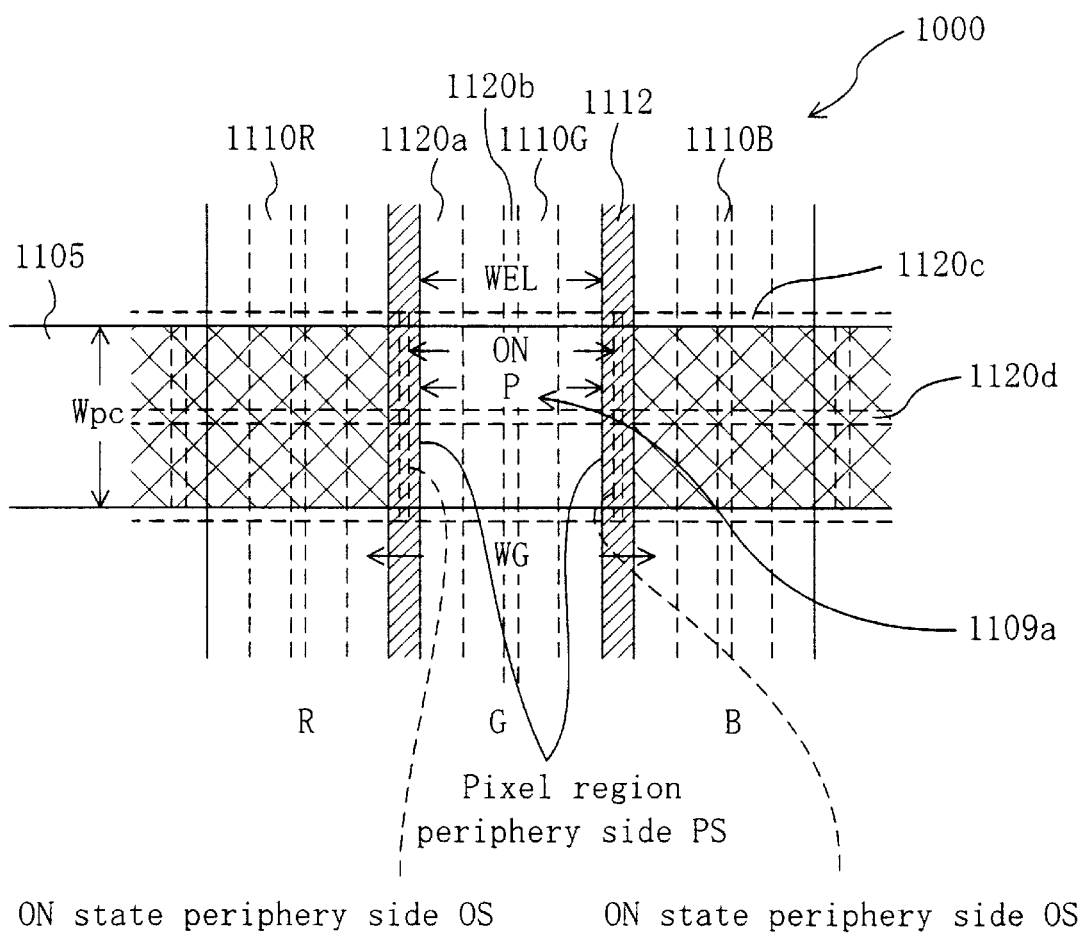
FIG. 8C is a schematic top view of the PALCD device.

A PALCD device 1100 of EMBODIMENT 2 of the present invention will be described with reference to FIGS. 8A, 8B, 8C, and 8D. The PALCD device 1100 is a normally black mode LCD device using a liquid crystal material having negative dielectric anisotropy where liquid crystal molecules are vertically oriented, like the conventional PALCD device 1700 described above. FIGS. 8A and 8B are schematic cross-sectional views of the PALCD device 1100 taken parallel to the length of plasma channels (corresponding to FIG. 23A) and orthogonally to the length of plasma channels, respectively. FIG. 8C is a schematic top view of the PALCD device 1100 (corresponding to FIG. 23B).

The PALCD device 1100 has a layered structure composed of a liquid crystal cell 1101 and a plasma cell 1102 with a dielectric sheet 1103 interposed therebetween. A pair of polarizing plates 1113 and 1114 sandwich the liquid crystal cell 1101 and the plasma cell 1102. As the polarizing plates, NPF-G1220G manufactured by Nitto Denko Corp., for example, may be used. Typically, a backlight (not shown) is disposed on the back of the plasma cell 1102.

The plasma cell 1102 includes: an insulating substrate 1104 having a plurality of parallel stripe grooves 1105 formed therein; and the dielectric sheet 1103. Each of the plurality of grooves 1105 formed in the substrate 1104 is sealed with the dielectric sheet 1103. The sealed space of the groove is filled with gas ionizable with discharge (for example, helium, neon, argon, xenon, a mixture of two or more of these gases, or any of these gases with oxygen added thereto), thereby forming a plasma channel 1105 (denoted by the same reference numeral as the groove). A pair of plasma electrodes 1106 (K) and 1107 (A) are placed on the bottom of each groove 1105.

The liquid crystal cell 1101 includes a substrate 1108, the dielectric sheet 1103, and a liquid crystal layer 1109 interposed between the substrate 1108 and the dielectric sheet 1103. The thickness of the liquid crystal layer is 6 μm, for example (the "thickness of the liquid crystal layer" indicates the thickness of the liquid crystal layer located in the portion of the pixel region where no dielectric structure or the like is formed, unless otherwise specified). The liquid crystal layer 1109 is divided into a plurality of liquid crystal regions 1109a by a plurality of dielectric structures 1120 (in this embodiment, transparent polymer walls made of an acrylic resin having a relative dielectric constant of 3.5, for example). In the illustrated example, one pixel region P is divided into four liquid crystal regions 1109a. In each of the liquid crystal regions 1109a, liquid crystal molecules 1109b are aligned axially symmetrically with respect to a symmetry axis SA. As a liquid crystal material, used is a material having Δε=−4.0 (ε//=3.5 and ε⊥=7.5), Δn=0.08 adjusted to twist by 90° in the thickness of 6 μm by adding a chiral agent. As alignment films (not shown) for vertically aligning the liquid crystal molecules, used is JALS-204 manufactured by JSR. The alignment films are formed in contact with top and bottom surfaces of the liquid crystal layer 1109.

Alternatively, horizontal alignment films may be used in combination with a liquid crystal material having positive dielectric anisotropy. In this case, liquid crystal molecules are aligned axially symmetrically at least when no voltage is applied. The axially symmetrical alignment as used herein includes tangential alignment, radial alignment, and spiral alignment. Details of the dielectric structures 1120 will be described later with reference to FIG. 8D.

A plurality of parallel stripe electrodes (column electrodes) 1110 are formed on the surface of the substrate 1108 facing the liquid crystal layer 1109. The electrodes 1110 are arranged to cross the plasma channels 1105. Pixel regions P are formed in the respective crossings of the electrodes 1110 and the plasma channels 1105. The electrodes 1110 are formed of indium tin oxide (ITO), for example, by a normal method. The width of the electrodes is 324 μm, for example, and the distance between the electrodes is 40 μm. A black matrix 1112 is formed to fill the spaces between the electrodes. The black matrix 1112 is made of a metal material having a light shading property such as chromium. The electrodes 1110 and the black matrix 1112 are electrically isolated from each other (via a silicon oxide film not shown, for example). The substrate 1108 further includes colored layers (not shown) at positions corresponding to the electrodes 1110. The colored layers, which are typically red, green, and blue layers, may be formed on the surface of the electrodes 1110 facing the substrate 1108 or the surface thereof facing the liquid crystal layer 1109.

Each of the pixel regions P in design of the PALCD device 1100 is defined as described in relation with the conventional PALCD device 1700. That is, the width of the pixel region P along the length of the plasma channel 1105 is defined by the opening of the black matrix 1112, which is equal to the width WEL of the electrode 1110 in the illustrated example. The width of the pixel region P along the length of the electrode 1110 is defined by the width WPC of the plasma channel 1105 (see FIG. 8C). In the illustrated example, periphery sides PS of the pixel region P running parallel to the length of the stripe electrode 1110 (orthogonal to the length of the plasma channel 1115) are defined by the sides of the black matrix 1112 (in the illustrated example, identical to the sides of the electrodes 1110). As will be described later, since the PALCD device 1100 is provided with first dielectric structures 1120a in periphery zones, substantially no crosstalk phenomenon occurs, and thus the pixel region in actual display is identical to the pixel region P in design. In other words, adjacent pixel regions do not overlap each other in actual display.

Figure 8D:
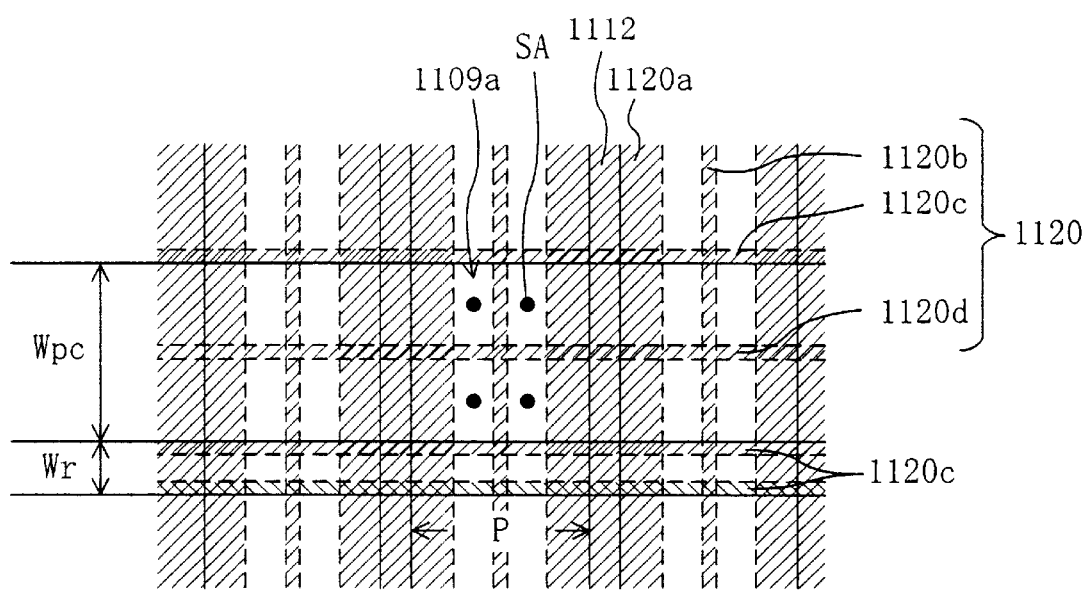
FIG. 8D is a schematic top view illustrating two-dimensional arrangement of dielectric structures of the PALCD device of EMBODIMENT 2.

The construction and function of the dielectric structures 1120 will be described with reference to FIG. 8D. FIG. 8D is a top view schematically illustrating two-dimensional arrangement of the dielectric structures 1120 of the PALCD device 1100.

The dielectric structures 1120 (hatched portions in FIG. 8D) include first dielectric structures 1120a and 1120b running parallel to the length of the electrodes 1110 and second dielectric structures 1120c and 1120d running parallel to the length of the plasma channels 1105. These dielectric structures can be formed integrally by a known photolithography process using a transparent polymer material (for example, an acrylic resin), in the shape of a lattice. One pixel region P includes a plurality of liquid crystal regions 1109a separated (substantially surrounded two-dimensionally) by the dielectric structures 1120a, 1120b, 1120c, and 1120d. Among the first dielectric structures 1120a and 1120b, the dielectric structure 1120b serves to separate the adjacent liquid crystal regions 1109a in one pixel region P. Among the second dielectric structures 1120c and 1120d, the dielectric structure 1120d serves to separate the adjacent liquid crystal regions 1109a in one pixel region P. In other words, the first dielectric structure 1120b and the second dielectric structure 1120d run across the pixel region P, whereby, in the illustrated example, the portion of the liquid crystal layer 1109 in one pixel region P is divided into four liquid crystal regions 1109a. The number of the liquid crystal regions 1109a formed in one pixel region P may vary depending on the specifications of the PALCD device. One pixel region may include only one liquid crystal region 1109a. That is, the first dielectric structure 1120b and the second dielectric structure 1120d may be omitted, or two or more of them independently may be provided for one pixel region. In view of the viewing angle characteristics, however, it is preferable to form the first dielectric structure 1120b and/or the second dielectric structure 1120d so that a plurality of liquid crystal regions 1109a of substantially the same shape are arranged symmetrically in each pixel region P. The distance between the adjacent second dielectric structures 1120c may vary depending on the distance (wall thickness) Wr between the adjacent plasma channels 1105.

Among the first dielectric structures 1120a and 1120b, the first dielectric structures 1120a (at least part of the first dielectric structures) are selectively formed in the periphery zones including the periphery sides PS of the pixel regions P, between the electrodes 1110 and the liquid crystal layer 1109. Each of the first dielectric structures 1120a is formed to cover the sides of the electrodes 1110 and the black matrix 1112 that define the periphery sides PS of the pixel regions P. The first dielectric structure 1120a is also formed to cover the space between the adjacent two electrodes 1110 (for example, between electrodes 1110R and 1110G), that is, the black matrix 1112, as well as the sides of the two electrodes facing each other. For example, the first dielectric structure 1120a is a stripe structure having a width of 150 μm and a height (thickness) of 1 μm, of which the section along the width is roughly rectangular. Both side portions (55 μm wide each) of the first dielectric structure 1120a along the width thereof are located on the electrodes 1110. The other dielectric structures 1120b, 1120c, and 1120d are stripe structures having a width of 14 μm and a height of 1 μm, of which the section along the width is roughly rectangular, for example. All of the dielectric structures 1120 are formed integrally.

In the periphery zone having the first dielectric structure 1120a, the voltage applied between the electrode 1110 and a dielectric bottom surface 1103S is divided according to capacitances formed by the dielectric bottom surface (virtual electrode) 1103S/dielectric sheet 1103/liquid crystal layer 1109/first dielectric structure 1120a/electrode 1110. Assuming that the relative dielectric constant of the first dielectric structure 1120a is equal to those of the liquid crystal layer 1109 and the dielectric sheet 1103, the voltage applied to the liquid crystal layer 1109 in the periphery zone is divided in proportion to the thicknesses of the dielectric sheet 1103, the liquid crystal layer 1109, and the dielectric structure 1120. Accordingly, by adjusting the thickness of the dielectric structure 1120, the thickness of the liquid crystal layer 1109 in the periphery zone is controlled and thus the magnitude of the voltage applied to the liquid crystal layer 1109 in the periphery zone is adjusted. By this adjustment, the crosstalk phenomenon can be suppressed/prevented. Strictly, the voltage is divided according to the capacitances formed between the electrode 1110 and the dielectric bottom surface 1103S as described above. Therefore, the thickness of the dielectric structure 1120 should be determined in consideration of the relative dielectric constants of the respective components.

Hereinafter, the operation of the PALCD device 1100 of EMBODIMENT 2 will be described with reference to FIG. 8C in comparison with FIG. 23B.

As described above with reference to FIG. 23B, in the conventional PALCD device 1700, when the center pixel region P is selectively turned ON, a crosstalk phenomenon occurs. That is, portions of the adjacent pixel regions P beyond the width of the center pixel region in design are also turned ON. In other words, the pixel region in display overlaps at least part of the adjacent pixel regions. On the contrary, in the PALCD device 1100 of EMBODIMENT 2, when the center pixel region P is turned ON, the width of the region actually turned ON does not expand to the adjacent pixel regions P as shown in FIG. 8C. This is due to the fact that the voltage applied to the periphery zones of the pixel region P is smaller than the voltage applied to the other area due to the existence of the first dielectric structure 1120a.

The black matrix 1112 exists between the electrodes 1110 as shown in FIG. 8C. Therefore, by arranging the first dielectric structures 1120a so that periphery sides OS of the region actually turned ON are located below the black matrix 1112, it is possible to match the pixel region in display with the pixel region P in design. This makes it possible to not only prevent occurrence of a crosstalk phenomenon, but also utilize the entire region between the adjacent stripes of the black matrix 1112 for display.

The function and effect of the first dielectric structures 1120a will be described in more detail.

The PALCD device 1100 has substantially the same construction as the PALCD device 1700 except that the former has the first dielectric structures 1120a formed in the periphery zones. That is, the first dielectric structures 1120a of the PALCD device 1100 correspond to widened versions of the dielectric structures 1720a of the PALCD device 1700. Accordingly, if the PALCD device 1100 does not include the first dielectric structures 1120a, the maximum drive voltage (voltage giving the maximum transmittance; specifically, 80 V) provides an electric field intensity distribution as shown in FIG. 24. That is, the leak electric field (voltage) influences over the distance of about 110 μm from the periphery sides toward the centers of the adjacent electrodes 1110.

In the plasma address LCD device 1100, each dielectric structure 1120a, which has a thickness of 1 μm, overlaps, by a width of 55 μm each, the adjacent electrodes 1110 that have a width of 324 μm each and are apart from each other with a gap of 40 μm. Accordingly, the applied voltage is smaller for the liquid crystal layer 1109 in the periphery zone having the 1 μm-thick first dielectric structure 1120a than for the liquid crystal layer 1109 in the other area. Specifically, the thickness of the liquid crystal layer 1109 in the periphery zone is 5 μm, while that in the other area is 6 μm. If it is assumed that the thickness of the dielectric sheet 1105 is 50 μm and that all the components have the same relative dielectric constant, the drive voltage applied to the liquid crystal layer 1109 in the periphery zone is about 85% ([{5/(50+5)}/{6/(50+6)}]×100) of the drive voltage $V_D$ applied to the other area. This reduction in the drive voltage applied to the liquid crystal layer 1109 in the periphery zone allows for suppression/prevention of a crosstalk phenomenon due to a leak electric field (voltage). The largest distance that the electric field can reach from the adjacent electrode 1110 is 110 μm according to the aforementioned simulation. In contrast, the first dielectric structure 1120a covers a slightly shorter range of 95 μm (i.e., interelectrode of 40 μm+overlap of 55 μm) from the edge of the electrode 1110 according to this embodiment. However, we confirmed by actual observation that the crosstalk phenomenon was suppressed (or prevented) to the extent that the difference could not be recognized.

Simulation was made based on the relationship between the thickness of the liquid crystal layer and the voltage-transmittance characteristics, and the following were found. In the case of the illustrated construction, the crosstalk phenomenon due to a leak electric field (voltage) can be substantially prevented when the voltage applied to the periphery zone is 90% or less of the voltage applied to the other area. In the case of a general construction, the crosstalk phenomenon can be substantially prevented when the voltage applied to the periphery zone is 85% or less of the voltage applied to the other area. It should be noted that the transmittance is influenced by the decrease in applied voltage (that is, increase in apparent threshold voltage (that can be represented by a voltage causing a change of 10% in relative transmittance)) due to the existence of the dielectric structure, depending on the voltage-transmittance characteristics (V-T curve) of the liquid crystal layer. Therefore, the crosstalk suppression effect may be obtained even when the applied voltage is outside the above range.

Among the dielectric structures other than the first dielectric structures 1120a, that is, the dielectric structures 1120b, 1120c, and 1120d, ones located between the electrodes 1110 and the liquid crystal layer 1109 in the pixel regions (for example, the dielectric structures 1120b and 1120d running across the pixel regions) also reduce the voltage applied to the liquid crystal layer 1109. Therefore, the thickness and width of the dielectric structures 1120b and 1120d may only be large enough to allow for formation of liquid crystal regions having axially symmetrical alignment. From the standpoint of display quality, the thickness and the width are preferably as small as possible. As for the thickness, however, practically good display quality can be obtained as long as the requirements for the first dielectric structure 1120a described above are satisfied. The dielectric structures other than the first dielectric structures 1120a may be made thinner than the first dielectric structures 1120a. However, this will lose the merit of forming all the dielectric structures 1120 having the uniform thickness integrally as described above. By the integral formation, the dielectric structures 1120a can be formed in the same process using the same material as the other dielectric structures, and thus no additional fabrication step is required.

The dielectric structures 1120 made of a transparent polymer material in the illustrated example have a transmittance of 95% or more for visible light. Therefore, no decrease in brightness is recognized due to light absorption of the dielectric structures 1120, ensuring high-quality display. If the thickness of the dielectric structures is about 2 μm or less, it is possible to obtain the dielectric structure having its transmittance of 95% or more for visible light using any of a variety of transparent polymer materials.

As described above, the PALCD device 1100 of EMBODIMENT 2 of the present invention realizes high-quality display without occurrence of a crosstalk phenomenon nor decrease in display brightness. In this relation, the effect of the first dielectric structures 1120a of confining a lateral leak electric field therein may possibly contribute to some extent to the prevention of occurrence of a crosstalk phenomenon in the PALCD device 1100. This effect will be described later.

The dielectric structures 1120 in this embodiment have the function of axially symmetrically aligning the liquid crystal molecules 1109b. Therefore, the cross section of the dielectric structures 1120 can be changed appropriately for stable alignment of the liquid crystal molecules 1109b. Typically, the cross section of the dielectric structures 1120 taken along the width thereof is preferably a trapezoid, tapered from the substrate 1108. The angle (taper angle) of the sides of the dielectric structures 1120 with respect to the surface of the substrate 1108 is preferably in the range of 3° to 45°. The taper angle of the dielectric structures 1120 can be adjusted, for example, by controlling the exposure and/or development conditions when the dielectric structures 1120 are formed by photolithography using a transparent photosensitive resin.

Figure 9A:
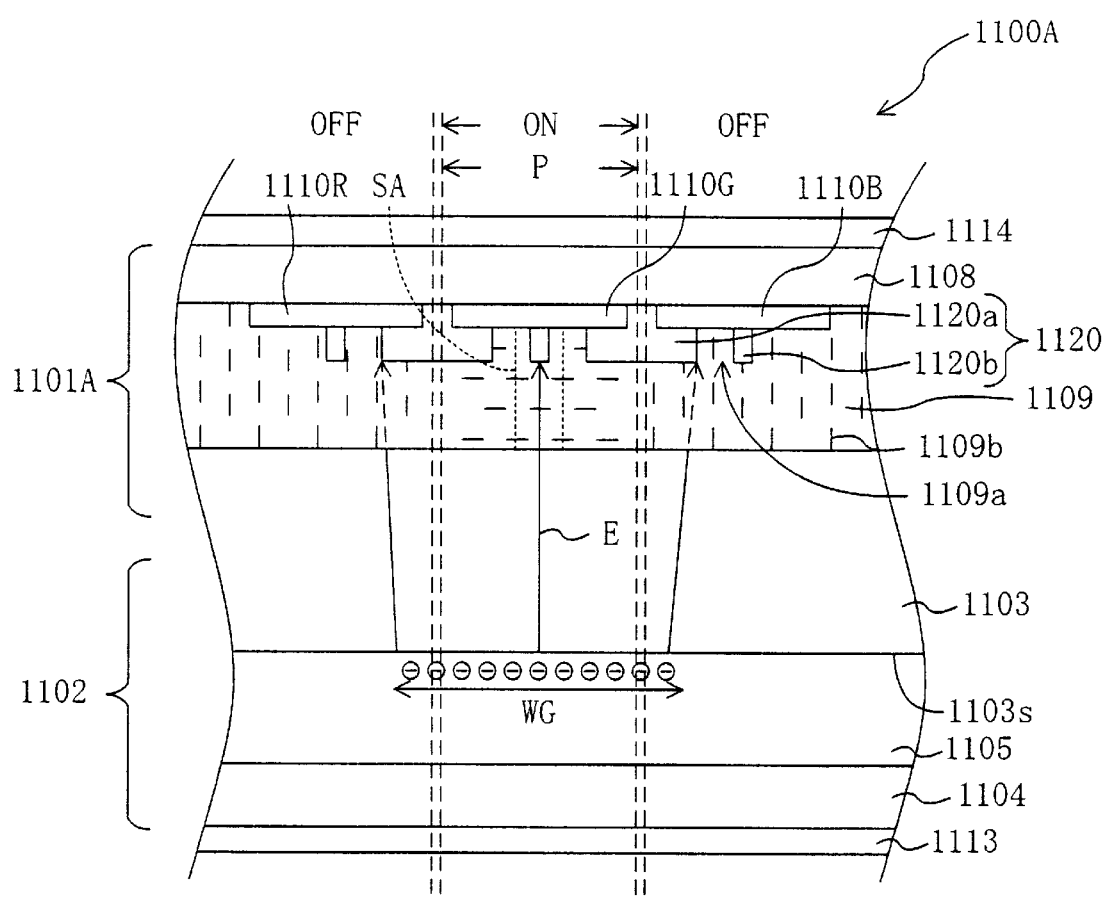
FIGS. 9A and 9B are a schematic cross-sectional view and a schematic top view, respectively, of a modified PALCD device of EMBODIMENT 2 of the present invention.
Figure 9B:
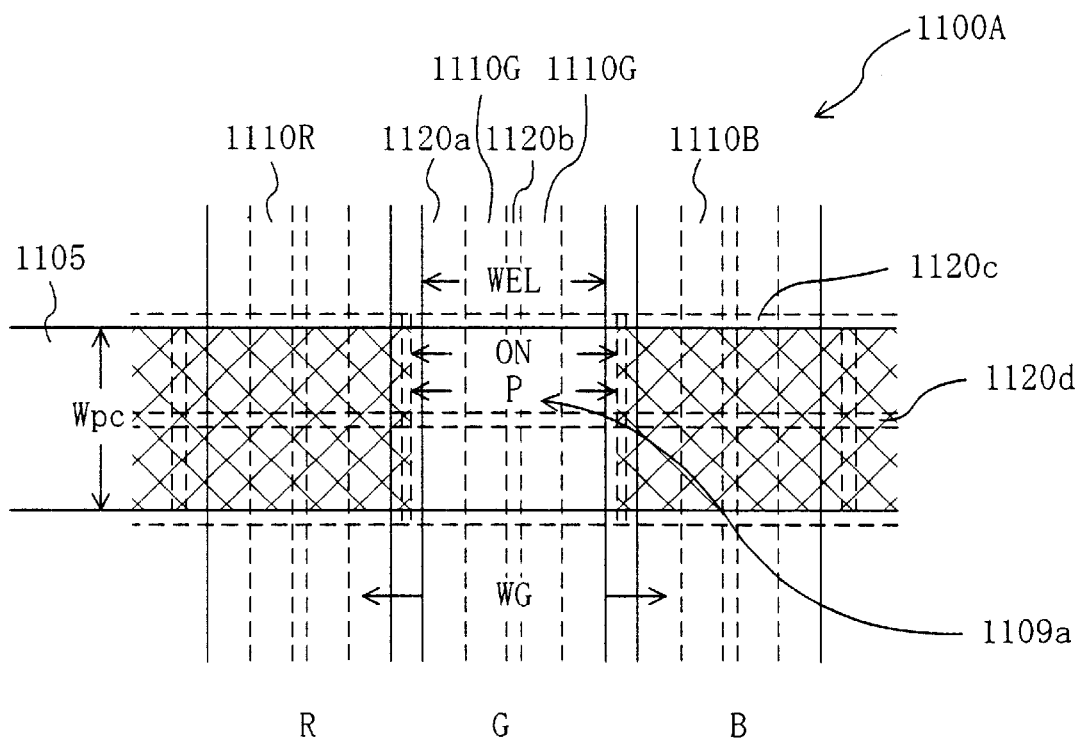

The black matrix may be omitted as a PALCD device 1100A shown in FIGS. 9A and 9B, which are views corresponding to FIGS. 8A and 8C, respectively. In FIGS. 9A and 9B and other relevant drawings to follow, components having substantially the same functions as those of PALCD device 1100 shown in FIGS. 8A and 8B are denoted by the same reference numerals, and the description thereof is omitted.

The PALCD device 1100A has the same construction as the PALCD device 1100 except that no black matrix is formed. In a normally black mode LCD device, black is displayed in the regions with no voltage applied (in the OFF state). Therefore, the black matrix can be omitted by forming the first dielectric structures 1120a constructed (in the thickness and the like) so that the portions of the liquid crystal layer 1109 located between the adjacent pixel regions P are always in the OFF state (that is, a voltage equal to or more than the threshold voltage is never applied). As shown in FIG. 9B, the pixel region P of the PALCD device 1100A having no black matrix can be somewhat larger than the pixel region P of the PALCD device 1100 (see FIG. 8A).

The construction having no black matrix lacks a structure uniquely defining the pixel regions in design (like the black matrix). Therefore, the width of the pixel regions in display may vary depending on the voltage actually applied. The pixel region P shown in FIG. 9B is a pixel region in display. In this construction, design may be made so that the periphery side of the pixel region P in display is located within the width over which the black matrix would otherwise be formed, and that the pixel region P in display has a width equal to or larger than the electrode 1110 and does not overlap the adjacent pixel region. In this construction, also, the first dielectric structures 1120a are formed in the periphery zones including the periphery sides of the pixel region P.

Figure 10:
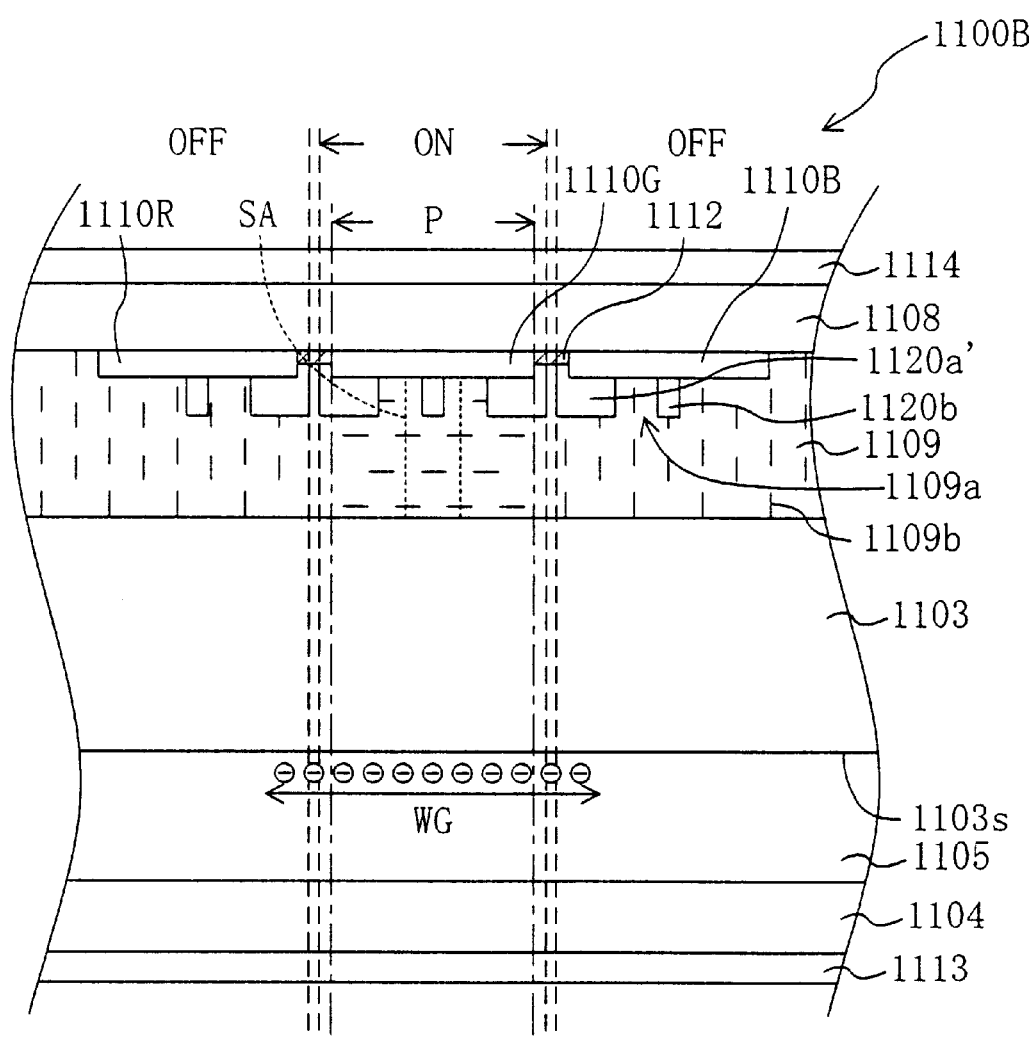
FIG. 10 is a schematic cross-sectional view of another modified PALCD device of EMBODIMENT 2 of the present invention.

Alternatively, as a PALCD device 1100B shown in FIG. 10, each first dielectric structure 1120a in the PALCD device 1100 shown in FIG. 8A may be divided into two. FIG. 10 is a view corresponding to FIG. 8A, and the top view of the PALCD device 1100B is the same as FIG. 8C, which is therefore omitted here.

First dielectric structures 1120a' of the PALCD device 1100B are individually provided for the adjacent electrodes (for example, the electrodes 1110G and 1110B) so as to cover the sides of the electrodes facing each other. The gap between the adjacent first dielectric structures 1120a' is located to correspond to the gap between the adjacent pixel regions P (typically to be positioned in the center of the gap). The PALCD device 1100B includes the black matrix 1112 between the electrodes 1110 and thus the resultant display is the same as that of the PALCD device 1100. If the black matrix 1112 is omitted, the resultant display is the same as that of the PALCD device 1100A.

Figure 11A:
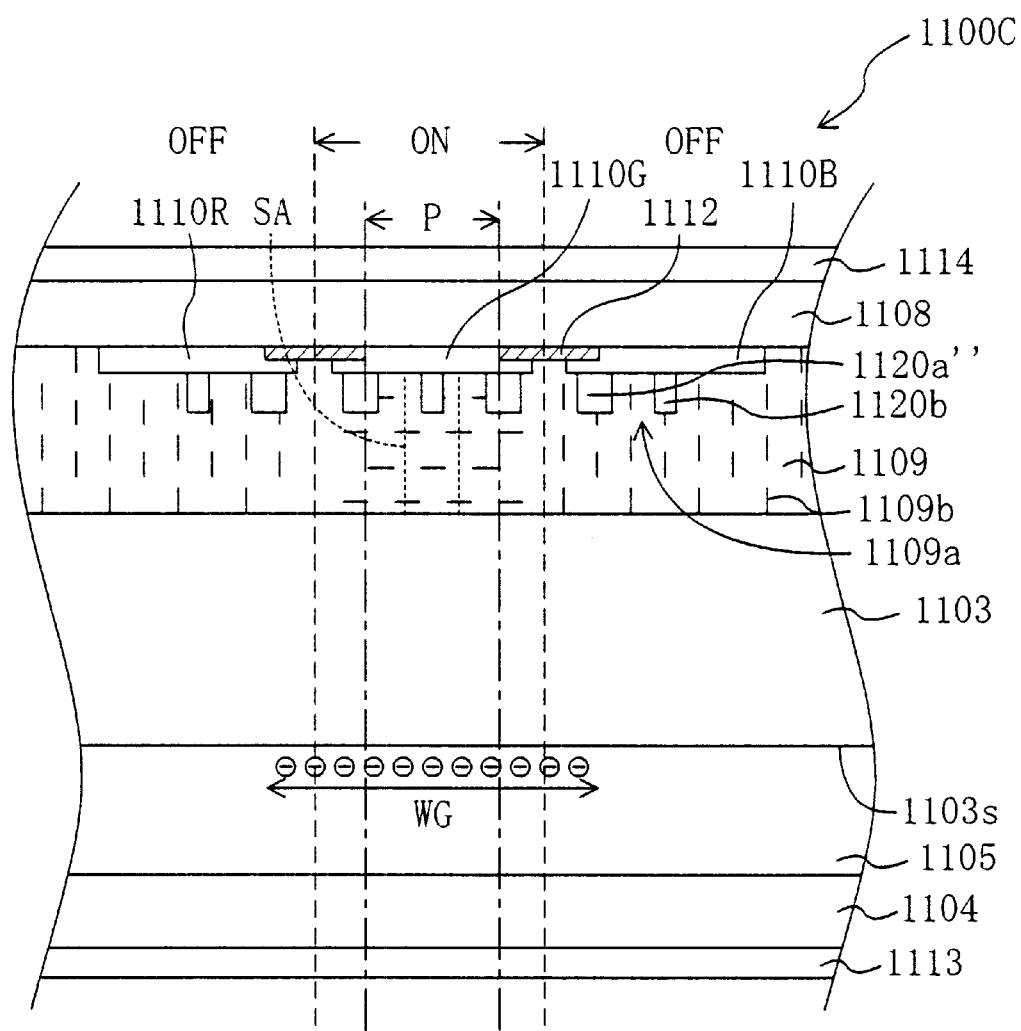
FIGS. 11A and 11B are a schematic cross-sectional view and a schematic top view, respectively, of yet another modified PALCD device of EMBODIMENT 2 of the present invention.
Figure 11B:
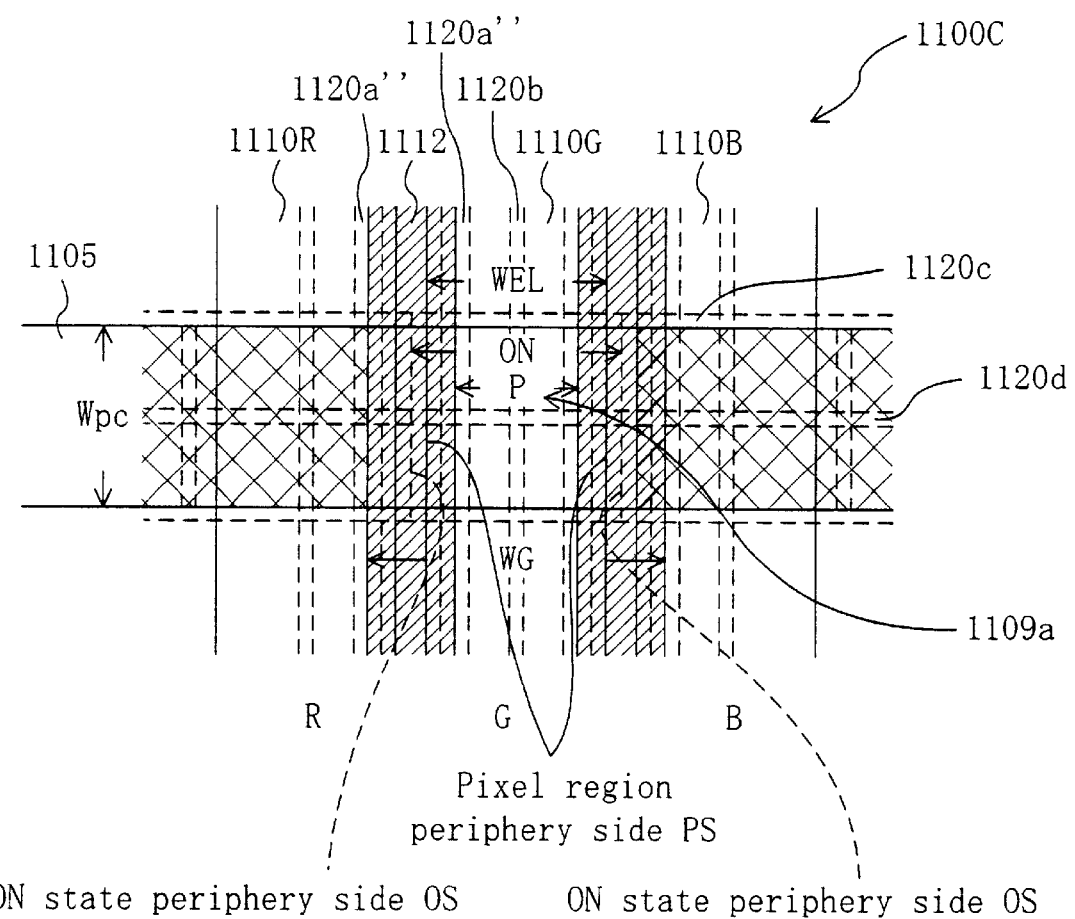

Further, as a PALCD device 1100C shown in FIGS. 11A and 11B, the width of the first dielectric structures 1120a' of the PALCD device 1100B shown in FIG. 10 may be made smaller. FIGS. 11A and 11B are views corresponding to FIGS. 8A and 8C, respectively.

First dielectric structures 1120a" of the PALCD device 1100C are formed near the sides of the adjacent electrodes (for example, the electrodes 1110G and 1110B) facing each other, but do not cover the sides. The black matrix 1112 has a width larger than the distance between the adjacent electrodes 1110, and the first dielectric structures 1120a" are located below the sides of the black matrix 1112. In other words, the first dielectric structures 1112a" are formed in the periphery zones including the periphery sides of the pixel region P in design that is defined by the opening of the black matrix 1112.

The thus-formed first dielectric structures 1120a" do not necessarily sufficiently reduce a leak electric field (voltage) occurring in the space between the pixel regions P. The region actually turned ON when one pixel region is turned ON is wider in this case compared with the cases of the PALCD devices 1100, 1100A, and 1100B described above. However, since the black matrix 1112 is formed in the region turned ON due to the leak electric field (voltage), this does not influence actual display (see FIG. 11B). The existence of the first dielectric structures 1120a" can at least reduce the leak electric field (voltage) compared with the conventional construction. Therefore, by providing the black matrix 1112 with an appropriate width, the crosstalk phenomenon can be suppressed/prevented. In the illustrated example, the adjacent regions actually turned ON do not overlap (they are in contact with each other at the center of the space between the electrodes). In the case where such adjacent ON-state regions overlap each other, the first dielectric structures 1120a" may be formed so that the overlap portion is located in an area shaded by the black matrix 1112. By doing this, the same effect as that obtained by the PALCD device 1100C is obtained.

Figure 12A:
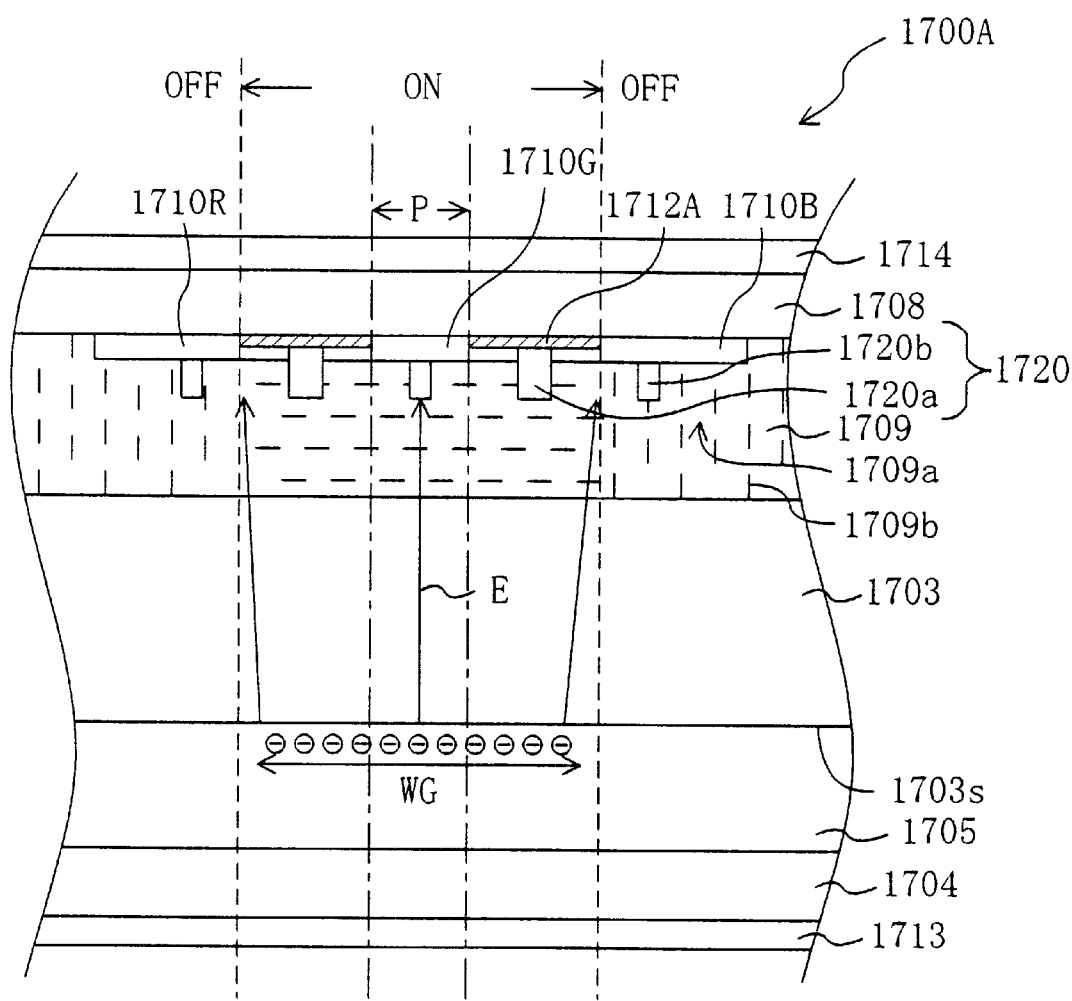
FIGS. 12A and 12B are a schematic cross-sectional view and a schematic top view, respectively, of a PALCD device as a comparative example.
Figure 12B:
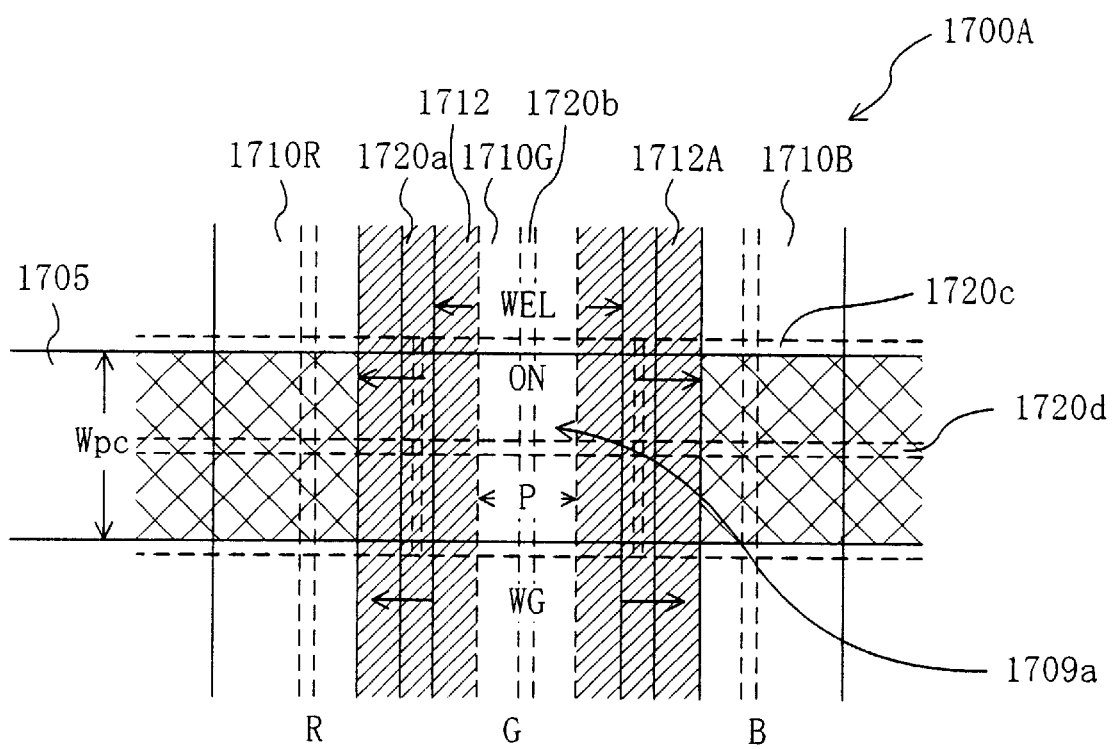

For comparison, FIGS. 12A and 12B illustrate a PALCD device 1700A attempting to suppress/prevent a crosstalk phenomenon by enlarging the width of the black matrix in the conventional PALCD device. FIGS. 12A and 12B are views corresponding to FIGS. 23A and 23B, respectively.

Figure 23A:
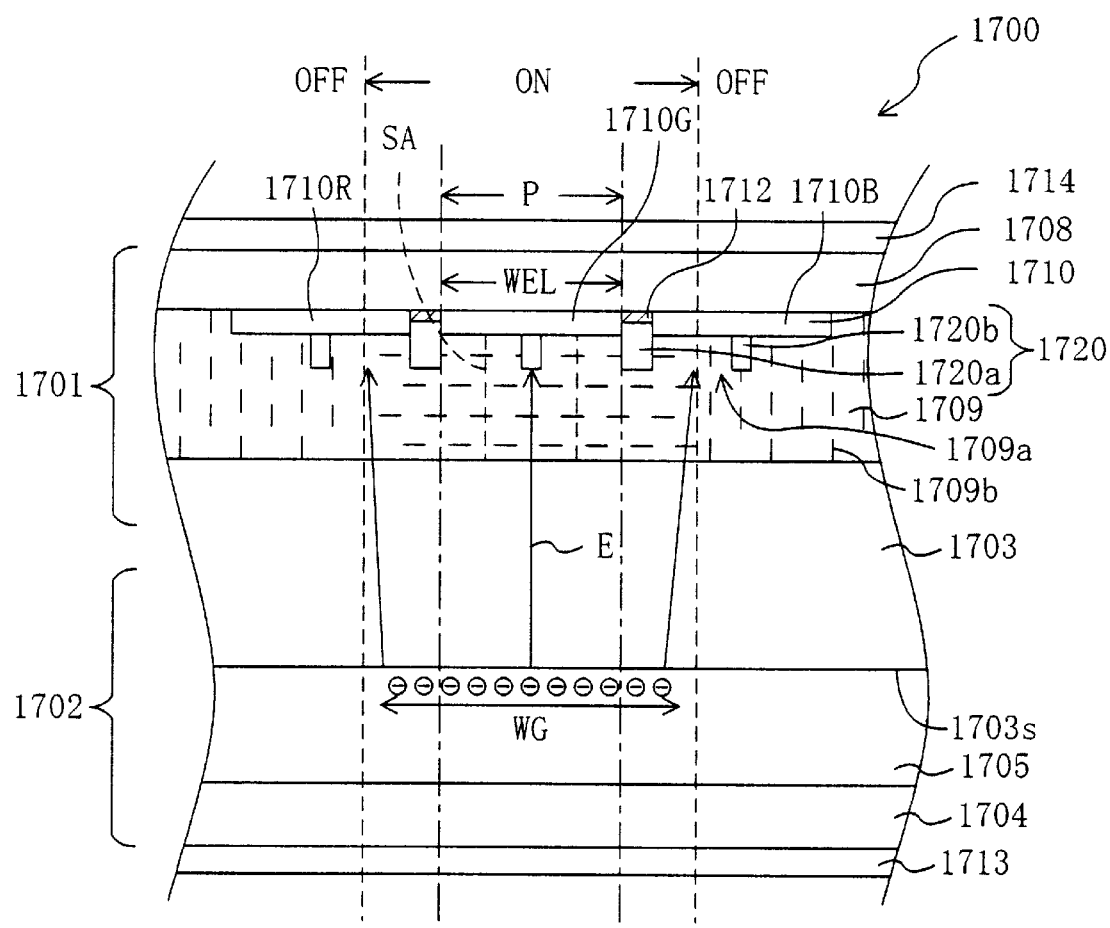
FIGS. 23A and 23B are a schematic cross-sectional view and a schematic top view, respectively, of another conventional PALCD device.
Figure 23B:
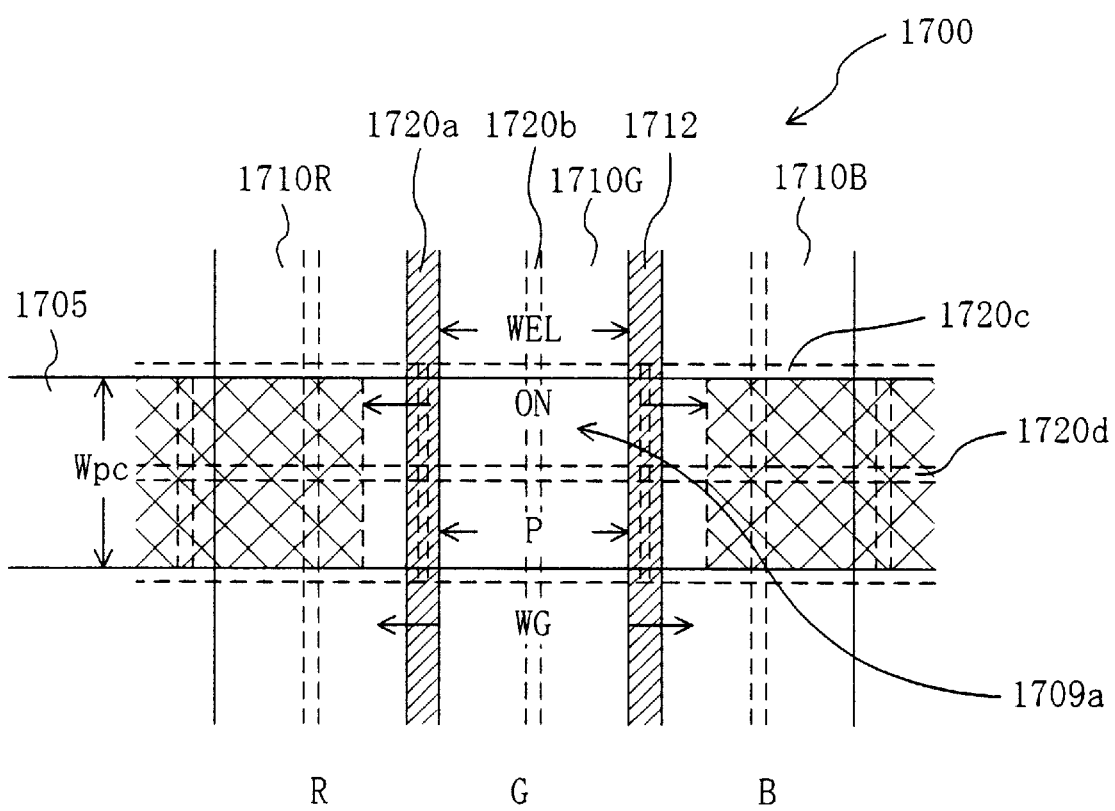

The width of a black matrix 1712A of the PALCD device 1700A is larger than the width of the black matrix 1712 of the conventional PALCD 1700 shown in FIGS. 23A and 23B. The components other than the black matrix 1712A are the same as those of the PALCD device 1700 and therefore denoted by the same reference numerals. The description thereof is omitted here.

The black matrix 1712A is formed so as to cover the entire region (width: 180 μm) turned ON due to a leak electric field (voltage). The PALCD device 1700A is therefore free from occurrence of a crosstalk phenomenon. However, the pixel region P is extremely narrow and thus only dark display is available.

On the contrary, the PALCD device 1100C (see FIGS. 11A and 11B) has the first dielectric structures 1120a" selectively formed near the sides of the electrodes 1110. Therefore, the black matrix 1112 provided for suppression/prevention of occurrence of a crosstalk phenomenon can be made narrower than the black matrix 1712A of the PALCD device 1700A. This allows for a higher aperture ratio and brighter display than those obtained by the PALCD device 1700A.

As described above, by providing the dielectric structures in the periphery zones, a crosstalk phenomenon mainly caused by a leak electric field (voltage) to adjacent pixel regions can be suppressed/prevented, and in addition, decrease in aperture ratio can be suppressed. The construction of the dielectric structures may be optimized depending on the construction of the PALCD device (such as the structure of the electrodes, the pitch of pixels, and the voltage-transmittance characteristics of the liquid crystal layer). By this optimization, the effect of suppressing/preventing a crosstalk phenomenon and the effect of suppressing decrease in aperture ratio can be maximized.

Described so far is that a crosstalk phenomenon due to a leak electric field (voltage) to adjacent pixel regions can be suppressed/prevented by providing the dielectric structures in the periphery zones, in relation to DDC. However, in consideration of the fact that the suppression/prevention effect of a crosstalk phenomenon has been experimentally confirmed for the PALC devices of the illustrated constructions, the dielectric structures formed in the periphery zones in this embodiment are presumably effective not only in suppression/prevention of DDC, but also in suppression/prevention of SSC. SSC can be suppressed/prevented further effectively in the following manner.

Figure 13:
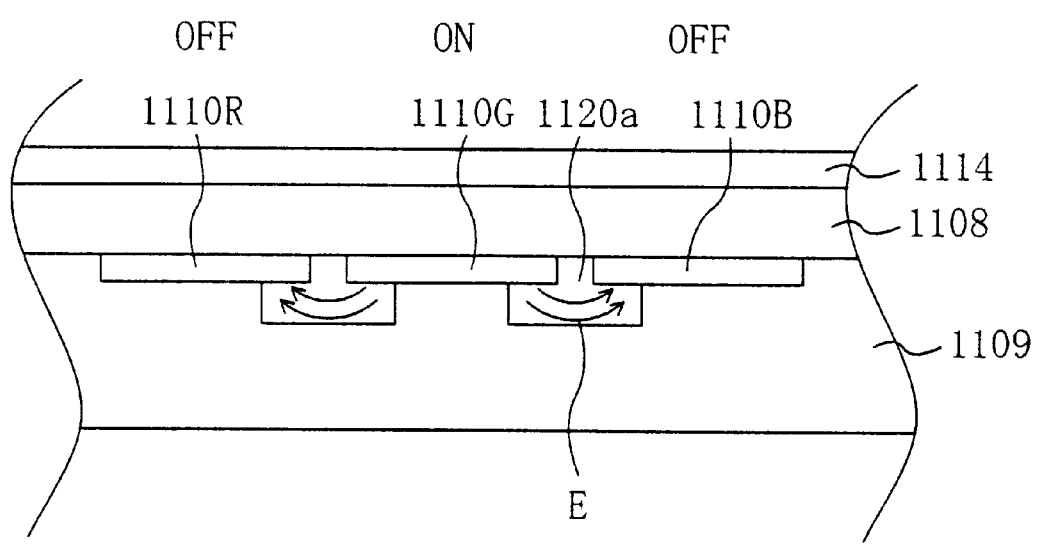
FIG. 13 is a schematic cross-sectional view of a liquid crystal cell of the PALCD device of EMBODIMENT 2 shown in FIGS. 9A and 9B.

FIG. 13 is a partial cross-sectional view of a liquid crystal cell of the PALCD device 1100A. In FIG. 13, the dielectric structures that are not involved in the SSC suppression effect are omitted. If the first dielectric structures 1120a in the PALCD device 1100A are made of a material having a relative dielectric constants greater than the absolute of relative dielectric constant anisotropy (Δε) of liquid crystal molecules 1109b, a larger number of electric lines of power generated due to the potential difference between the electrode 1110G (ON state) and the electrodes 1110R and 110B (OFF state) can be induced into the first dielectric structures 1120a than into the liquid crystal layer 1109. In other words, lateral electric lines of power generated between the adjacent electrodes 1110 can be selectively induced into the first dielectric structures 1220a, to reduce the number of electric lines of power (intensity of the electric field) generated in the liquid crystal layer 1109. As a result, disorder in orientation of the liquid crystal molecules 1109b due to a lateral electric field can be prevented. In particular, in a normally black mode PALCD device using a liquid crystal material having negative dielectric anisotropy, SSC will be recognized as white display in adjacent pixel regions and thus greatly degrade display quality. Therefore, the SSC suppressing/preventing effect is significant in this type of devices.

Figure 14A:
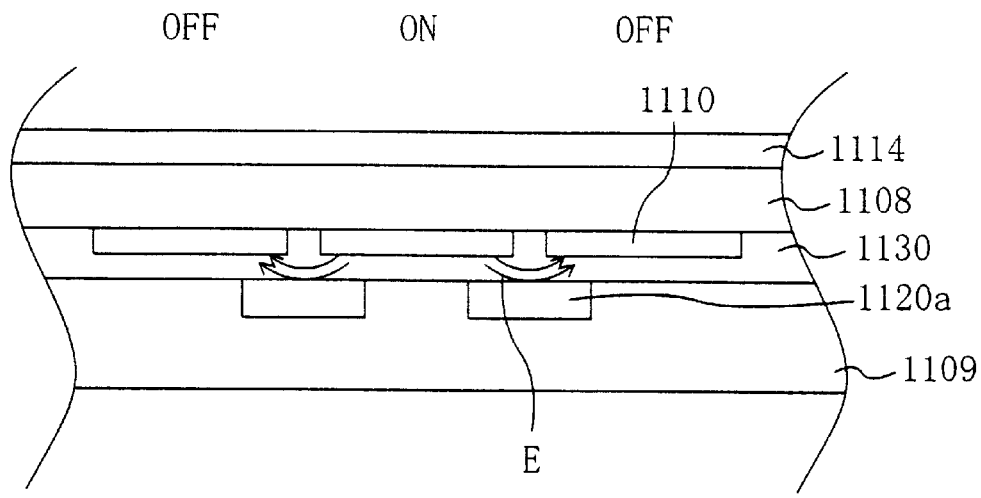
FIGS. 14A and 14B are schematic cross-sectional views of other liquid crystal cells usable for the PALCD device of EMBODIMENT 2 of the present invention.
Figure 14B:
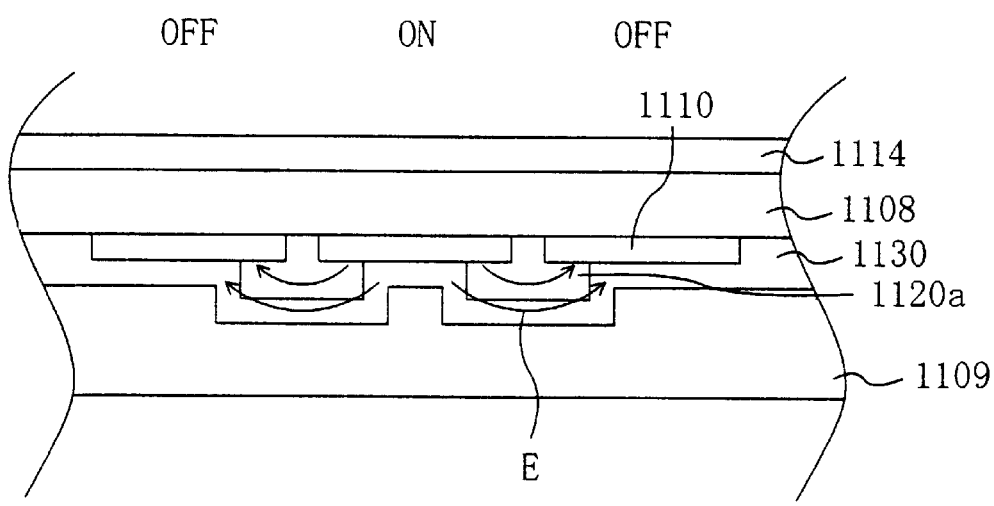

FIGS. 14A and 14B illustrate alterations of the construction shown in FIG. 13. Instead of increasing the relative dielectric constant of the first dielectric structures 1120a, there may additionally be formed a high dielectric layer 1130 having a relative dielectric constant greater than the absolute of the relative dielectric constant anisotropy (Δε) of the liquid crystal material. The thickness of the high dielectric layer 1230 is preferably in the range of 0.5 to 5 μm. The high dielectric layer 1130 may be formed between the first dielectric structures 1120a and the electrodes 1110 as shown in FIG. 14A, or between the first dielectric structures 1120a and the liquid crystal layer 1109 as shown in FIG. 14B. It is also possible to form the first dielectric structures 1120a using a material having a relative dielectric constant ε greater than the relative dielectric constant (absolute of the relative dielectric constant anisotropy (Δε)) of the liquid crystal molecules 1109b and additionally form the high dielectric constant layer 1130.

The first dielectric structures 1120a having a high relative dielectric constant and the high dielectric constant layer 1130 can be formed of an inorganic thin film such as RTZ-1 (ε≈10) manufactured by CATALYSTS & CHEMICALS IND. CO., LTD. Such a thin film can be patterned into a desired shape by a known photolithography process using a resist, for example. If the liquid crystal layer is made of a liquid crystal material having dielectric anisotropy $\Delta\epsilon=2.7$, $\epsilon//=6.7$, $\epsilon\perp=4.0$ (for example, ZLI-4792 and ZLI-3089 manufactured by Merck & Co., Inc.), it is possible to form the first dielectric structures 1120a and the high dielectric layer 1130 using an acrylic resin having a relative dielectric constant $\epsilon=3.5$, for example.

SSC (possibly including DDC) can also be effectively suppressed with the first dielectric structures 1120a made of a material having a relative dielectric constant smaller than that of the liquid crystal material. The electric lines of power generated from the portion of the electrode 1110 located in the periphery zone where the first dielectric structure 1120a is formed are weakened during the passing through the first dielectric structure 1120a made of a material having a low relative dielectric constant. As a result, the intensity of the electric lines of power generated between the adjacent electrodes 1110 is lowered, thereby weakening the electric field (voltage) applied to the portion of the liquid crystal layer 1109 located below the first dielectric structure 1120a. In this case, the first dielectric structure 1120a preferably has a relative dielectric constant smaller than the larger one of the relative dielectric constants ($\epsilon//$ and $\epsilon\perp$) of the liquid crystal material. More preferably, the first dielectric structure 1120a has a relative dielectric constant smaller than the absolute of the relative dielectric constant anisotropy ($\Delta\epsilon$) of the liquid crystal material. Such a first dielectric structure 1120a having a low dielectric constant can be formed of an acrylic resin and an epoxy resin, for example. Instead of forming the first dielectric structure 1120a using a low relative dielectric constant material, a low dielectric layer having a thickness of 0.5 to 5 $\mu$m may additionally be formed selectively on the portion of the electrode 1110 in the periphery zone. The low dielectric layer reduces the intensity of the electric field passing therethrough. Therefore, it is not preferable to cover the entire electrode 1110 with the low dielectric layer since the voltage applied to the liquid crystal layer 1109 is disadvantageously lowered (the apparent threshold voltage increases).

EMBODIMENT 3

By adopting the constructions in EMBODIMENT 2, the crosstalk phenomenon can be suppressed. However, the axially symmetrical alignment of liquid crystal molecules may be disordered in the portions of the liquid crystal layer located below the first dielectric structures formed in the periphery zones of the pixel regions where a crosstalk phenomenon occurs if the width of the first dielectric structures is large. As a result, display may be roughened. This trouble tends to occur when the first dielectric structure forms a flat face having a width of about 100 $\mu$m or more. Liquid crystal molecules located below the flat face of the first dielectric structure fail to be influenced by the alignment regulation force from the other areas. As a result, the alignment direction is easily disordered.

In order to solve the above problem, a PALCD device of EMBODIMENT 3 includes third dielectric structures formed on the respective first dielectric structures, so that liquid crystal molecules in the portions of the liquid crystal layer located below the first dielectric structures can be aligned axially symmetrically by the existence of the third dielectric structures.

Figure 15A:
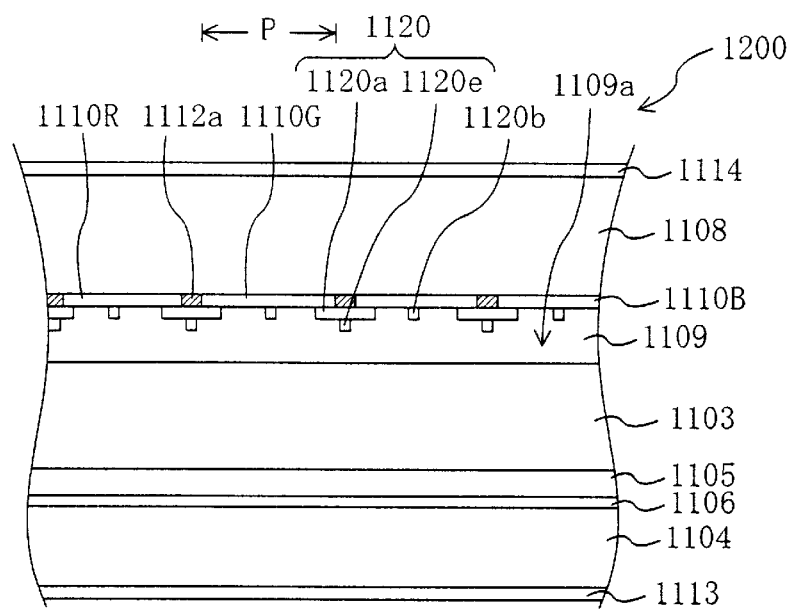
FIGS. 15A and 15B are schematic cross-sectional views of a PALCD device of EMBODIMENT 3 of the present invention, taken parallel to the length of a plasma channel and parallel to the length of an electrode, respectively.
Figure 15B:
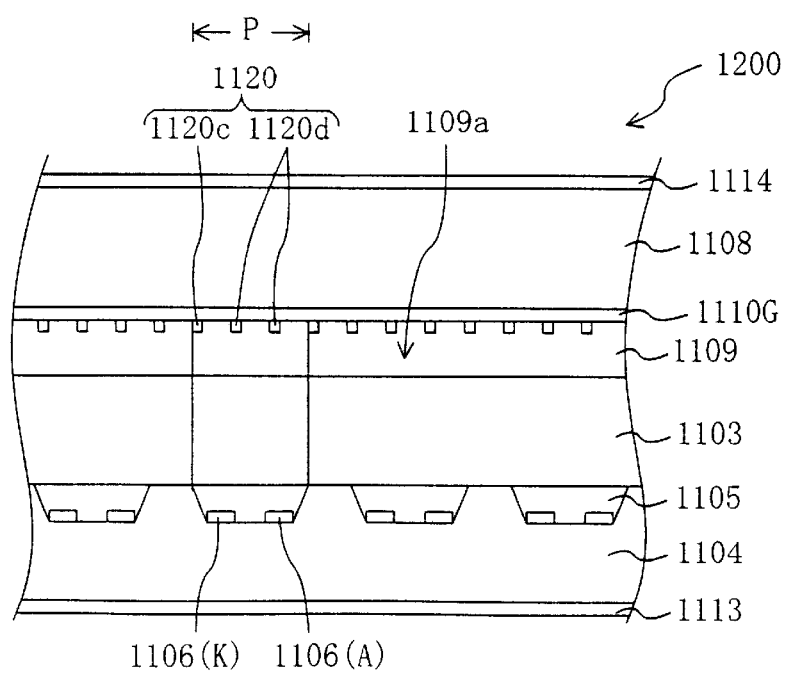
Figure 15C:
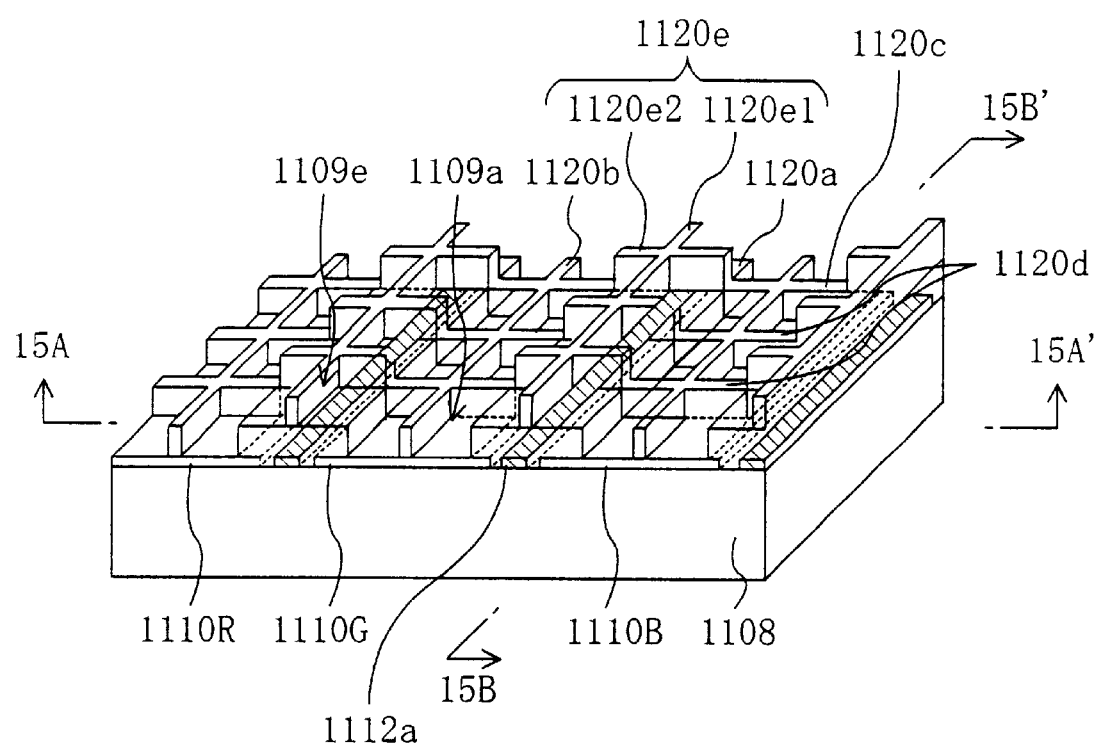
FIG. 15C is a schematic perspective view of a substrate constituting a liquid crystal cell of the PALCD device of EMBODIMENT 3.

Referring to FIGS. 15A, 15B, and 15C, a PALCD device 1200 of EMBODIMENT 3 will be described. The components other than the third dielectric structures of the PALCD device 1200 of this embodiment are the same as those of the PALCD device 1100 of EMBODIMENT 2. Therefore, common components are denoted by the same reference numerals, and the description thereof is omitted here.

FIGS. 15A and 15B are schematic cross-sectional views of the PALCD device 1200, taken parallel to the length of the plasma channel 1105 and parallel to the length of the electrode 1110, respectively. FIG. 15C is a schematic perspective view of a substrate constituting the liquid crystal cell of the PALCD device 1200. The cross sections of FIGS. 15A and 15B correspond to those taken along lines 15A–15A' and 15B–15B' in FIG. 15C, respectively.

The PALCD device 1200, as the PALCD device 1100, includes first dielectric structures 1120a and 1120b running parallel to the length of the electrodes 1110 and second dielectric structures 1120c and 1120d running parallel to the length of the plasma channels 1105. One pixel region P includes six liquid crystal regions 1109a separated (substantially surrounded two-dimensionally) by the dielectric structures 1120a, 1120b, 1120c, and 1120d (two dielectric structures 1120d run across the pixel region P in this case). In the PALCD device 1200, a third dielectric structure 1120e is further formed on each first dielectric structure 1120a.

The first dielectric structure 1120a is formed covering the space between the two adjacent electrodes 1110 (for example, the electrodes 1110R and 1110G) and the sides of the electrodes 1110 facing each other. Although the illustrated example includes a black matrix 1112a having a width smaller than the gap between the electrodes 1110, the black matrix 1112a may be omitted.

The width of the electrodes 1110 is 324 $\mu$m, and the gap between the electrodes 1110 is 40 $\mu$m. The black matrix 1112a having a width of 30 $\mu$m is formed in the center of the gap. The first dielectric structure 1120a is a stripe structure having a width of 150 $\mu$m and a height (thickness) of 1 $\mu$m, of which the section along the width is roughly rectangular. Both side portions (55 $\mu$m wide each) of the first dielectric structure 1120a along the width thereof are located on the adjacent electrodes 1110. The dielectric structures 1120b, 1120c, and 1120d are, for example, stripe structures having a width of 14 $\mu$m and a height of 1 $\mu$m, of which the section along the width is roughly rectangular. The third dielectric structure 1120e formed on the first dielectric structure 1120a has a height (height from the top face of the first dielectric structure 1120a) of 1 $\mu$m and a width of 14 $\mu$m. The third dielectric structure 1120e has a portion 1120e1 extending in parallel with the first dielectric structures 1120a and 1120b and portions 1120e2 extending in parallel with the second dielectric structures 1120c and 1120d, forming a lattice as a whole. The third dielectric structure portion 1120e1 extends along the center of the width of the first dielectric structure 1120a. The third dielectric structure portions 1120e2 extend in succession from the second dielectric structures 1120c and 1120d.

Each region surrounded by the first dielectric structures 1120a and 1120b and the second dielectric structures 1120c and 1120d (this region may occasionally be called an "aperture") has a size of 100 $\mu$m×100 $\mu$m. Each region separated by the third dielectric structure portions 1120e1 and 1120e2 on the first dielectric structure 1120a has a size of 60 $\mu$m×100 $\mu$m. The width of the first dielectric structure 1120a (150 $\mu$m) is sufficiently larger than the width of the black matrix 1112a (30 $\mu$m), and the width of the portion of the first dielectric structure 1120a located on the electrode 1110 (55 μm) is larger than the width of the second dielectric structures 1120c and 1120d (14 μm).

The PALCD device 1200 of this embodiment having the above construction is fabricated in substantially the same manner as that for the PALCD device 1100 in EMBODIMENT 2. The thickness of the liquid crystal layer 1109 is 6 μm. As a liquid crystal material, used is a material having Δε=−4.0 ($\varepsilon_{//}$=3.5 and $\varepsilon_{\perp}$=7.5), Δn=0.08 adjusted to twist by 90° in the thickness of 6 μm by adding a chiral agent. The dielectric structures 1120 (the first, second, and third dielectric structures) are formed of a transparent acrylic photosensitive resin having a relative dielectric constant of 3.5. Spacers (not shown) for defining the thickness of the liquid crystal layer 1109 may be formed using the same photosensitive resin by a photolithography process. As alignment films (not shown) for vertically aligning liquid crystal molecules, used is JALS-204 manufactured by JSR. The alignment films are formed in contact with top and bottom surfaces of the liquid crystal layer 1109.

A voltage of 40 V, for example, is applied to the liquid crystal layer 1109 of the resultant PALCD device 1200 for stabilizing axially symmetrical alignment of the liquid crystal layer 1109. Immediately after the application of the voltage, a plurality of center axes exist in each of the liquid crystal regions 1109a and 1109e. As the application of the voltage continues, only one center axis (axis for axially symmetrical alignment) is remained in roughly the center of each of the liquid crystal regions 1109a and 1109e.

Figure 16:
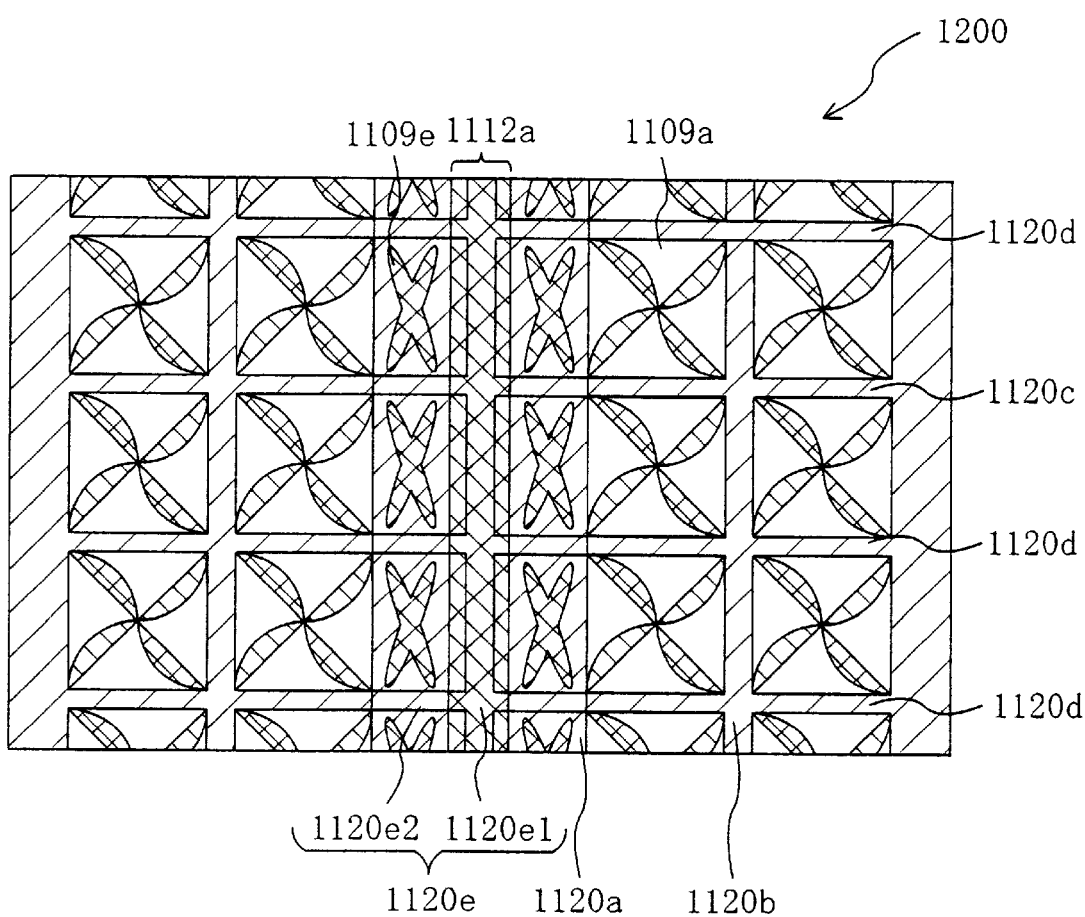
FIG. 16 is a schematic diagram of a display state of the PALCD device of EMBODIMENT 3 during voltage application.

FIG. 16 schematically illustrates a display state of the thus-obtained PALCD device 1200 during the voltage application. For comparison, FIG. 17 schematically illustrates a display state of a PALCD device having no third dielectric structure 1120e during the voltage application.

As shown in FIG. 16, the liquid crystal region 1109a where liquid crystal molecules are aligned axially symmetrically is formed in each of regions surrounded by the first dielectric structures 1120a and 1120b and the second dielectric constructions 1120c and 1120d. In addition, the liquid crystal region 1109e where liquid crystal molecules are aligned axially symmetrically is formed in each of regions separated by the third dielectric structure portions 1120e1 and 1120e2 on the first dielectric structure 1120a. In this way, it is possible to provide the liquid crystal regions 1109e on the first dielectric structures 1120a by forming the lattice-shaped third dielectric structures 1120e on the flat surfaces of the respective first dielectric structures 1120a. Although one side of the rectangular liquid crystal region 1109e (60 μm×100 μm) is not surrounded by the third dielectric structure 1120e, sufficiently stable axially symmetrical alignment is possible.

Figure 17:
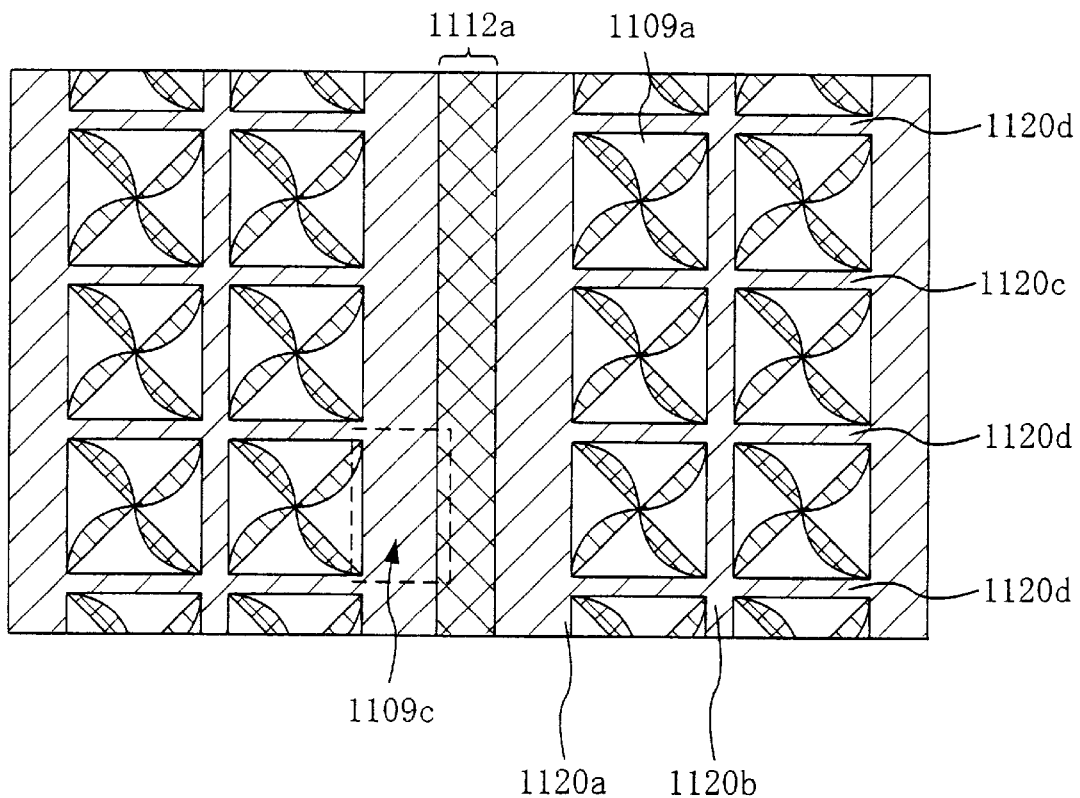
FIG. 17 is a schematic diagram of a display state of a PALCD device for comparison where third dielectric structures are omitted from the PALCD device of EMBODIMENT 3, during voltage application.

On the contrary, as shown in FIG. 17, without the existence of the third dielectric structures 1120e, the portions of the liquid crystal layer 1109 located below the first dielectric structures 1120a are not influenced by the surrounding alignment regulating force, and thus fail to be aligned in a fixed state and are aligned in different states depending on the position. This is recognized as display roughness (non-uniformity), and thus display quality is degraded.

Since both the PALCD devices 1200 and 1700 include the first dielectric structures 1120a in the periphery zones of the pixel regions, occurrence of a crosstalk phenomenon can be suppressed/prevented as in the case of the PALCD device 1100 of EMBODIMENT 2. Further, since it is unnecessary to make wider the black matrix 1112a than its original width (for concealing a crosstalk position), display brightness will not be sacrificed. To state in more detail, since the first dielectric structures 1120a are made of a transparent resin, the liquid crystal regions 1109e formed thereon contribute to display. Accordingly, display brightness is kept from largely decreasing even if sufficiently wide first dielectric structures 1120a are formed for suppressing crosstalk. Display brightness rather improves since the black matrix 1112a can be narrowed.

Moreover, the PALCD device 1200 of EMBODIMENT 3 has the liquid crystal regions 1109e where liquid crystal molecules are aligned axially symmetrically on the first dielectric structures 1120a. This provides wide viewing angle characteristics and achieves high-quality display without display roughness. If horizontal alignment films are used in combination with a liquid crystal material having positive dielectric anisotropy, axially symmetrical alignment is obtained even in the non-voltage applied state. The wide viewing angle characteristics are obtained if the device is constructed to provide the axially symmetrical alignment at least in the voltage applied state.

The third dielectric structures 1120e may be combined with, not only the PALCD device 1100 of EMBODIMENT 2, but also other PALCD devices.

EMBODIMENT 4

In EMBODIMENT 4, liquid crystal molecules in the portions of the liquid crystal layer 1109 located below the first dielectric structures 1120a are aligned axially symmetrically, without forming the third dielectric structures 1120e as in EMBODIMENT 3.

A PALCD device 1300 of EMBODIMENT 4 will be described with reference to FIGS. 18A and 18B. Most of the components of the PALCD device 1300 of this embodiment are the same as those of the PALCD device 1100B of EMBODIMENT 2 (see FIG. 10), which are denoted by the same reference numerals, and the description thereof is omitted here.

Figure 18A:
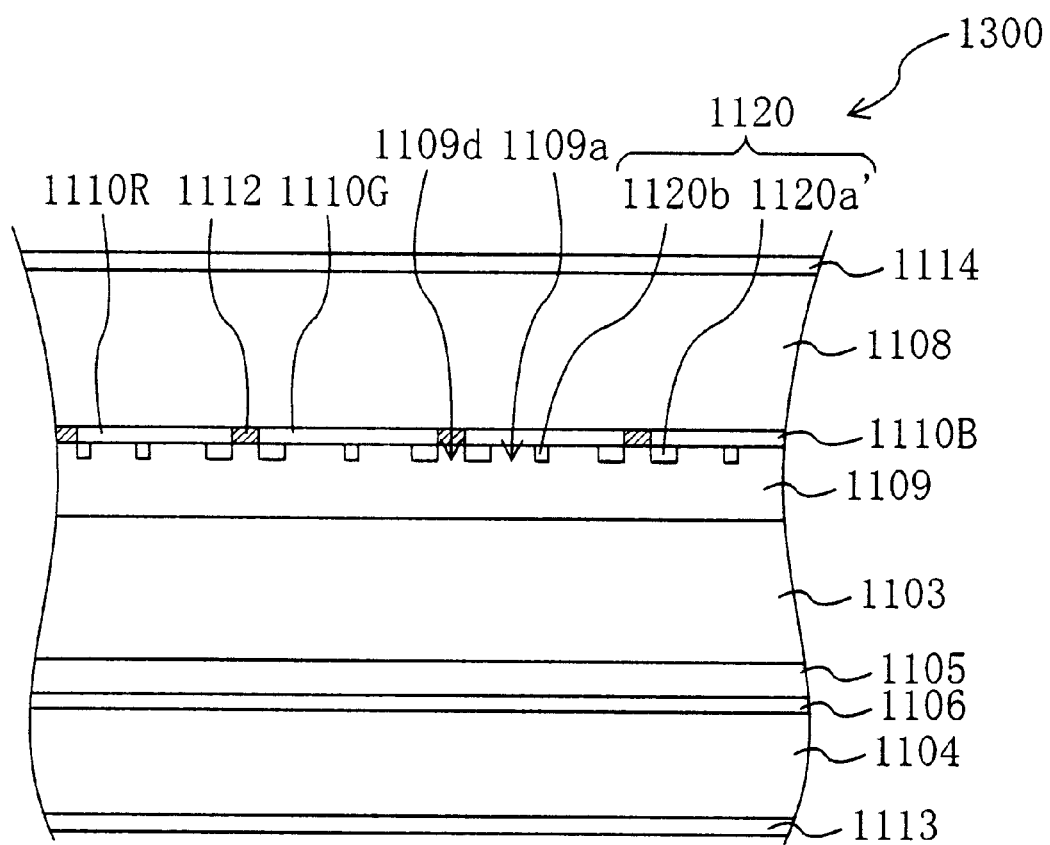
FIG. 18A is a schematic cross-sectional view of a PALCD device of EMBODIMENT 4 of the present invention, taken parallel to the length of a plasma channel.
Figure 18B:
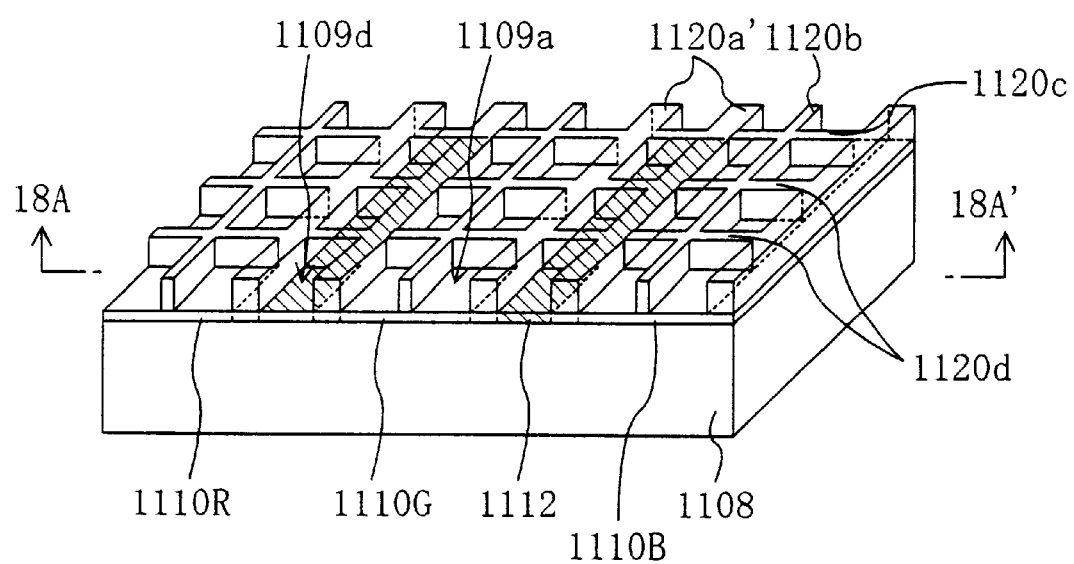
FIG. 18B is a schematic perspective view of a substrate constituting a liquid crystal cell of the PALCD device of EMBODIMENT 4.

FIG. 18A is a schematic cross-sectional view of the PALCD device 1300 taken parallel to the length of the plasma channel 1105. FIG. 18B is a schematic perspective view of a substrate constituting the liquid crystal cell of the PALCD device 1300. The cross section of FIG. 18A corresponds to that taken along line 18A–18A' in FIG. 18B.

In the PALCD device 1300, the first dielectric structures 1120a' are formed on the sides of the electrodes 1110 sandwiching the black matrix 1112. The first dielectric structures 1120a', together with the second dielectric structures 1120c and 1120d, define a plurality of apertures below the black matrix 1112, so that liquid crystal regions 1109d are formed at positions corresponding to the respective apertures below the black matrix 1112.

The width of the electrodes 1110 is 324 μm, the width of the first dielectric structures 1120a' formed on the sides of the electrodes 1110 is 55 μm, and the width of the black matrix is 40 μm. The width of the first dielectric structures 1120b and the second dielectric structures 1120c and 1120d is 14 μm. Therefore, the size of each of the liquid crystal regions 1109a formed below the electrodes 1110 is 100 μm×100 μm, while the size of each of the liquid crystal regions 1109d formed below the black matrix is 40 μm×100 μm.

Figure 19:
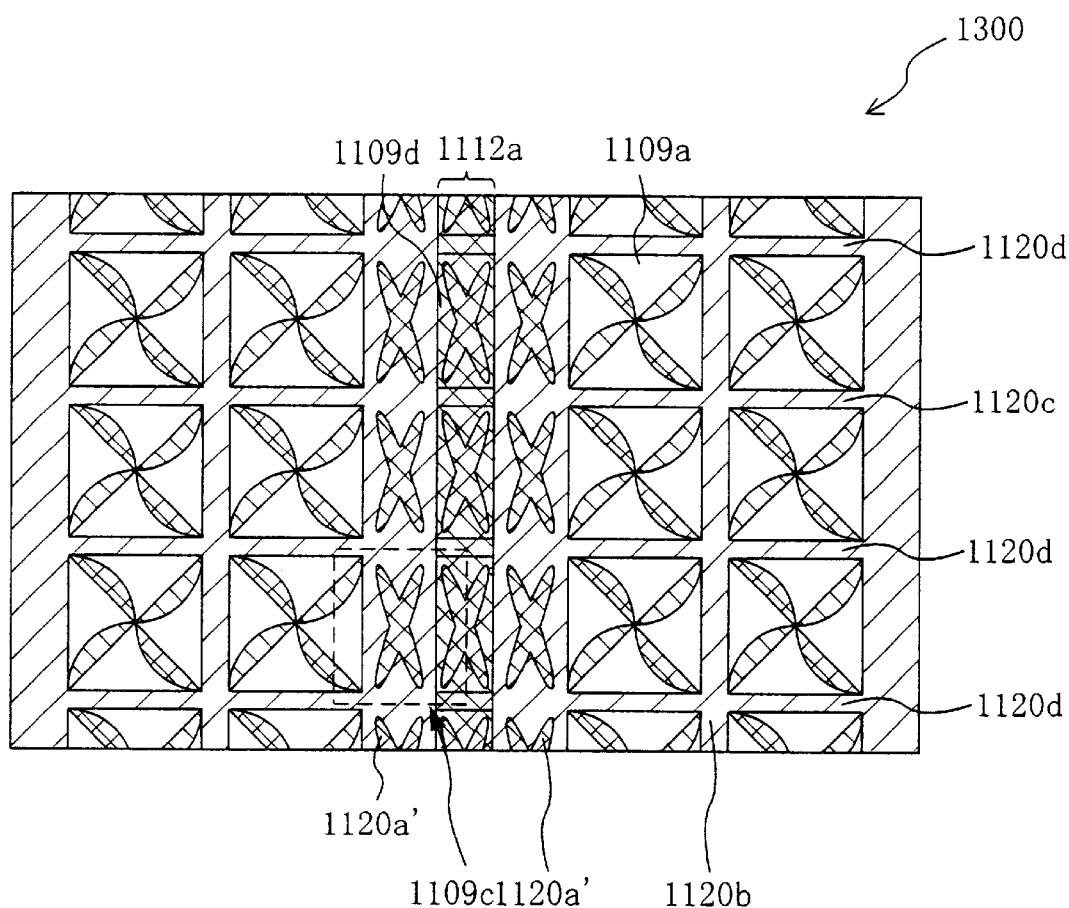
FIG. 19 is a schematic diagram of a display state of the PALCD device of EMBODIMENT 4 during voltage application.
Figure 20:
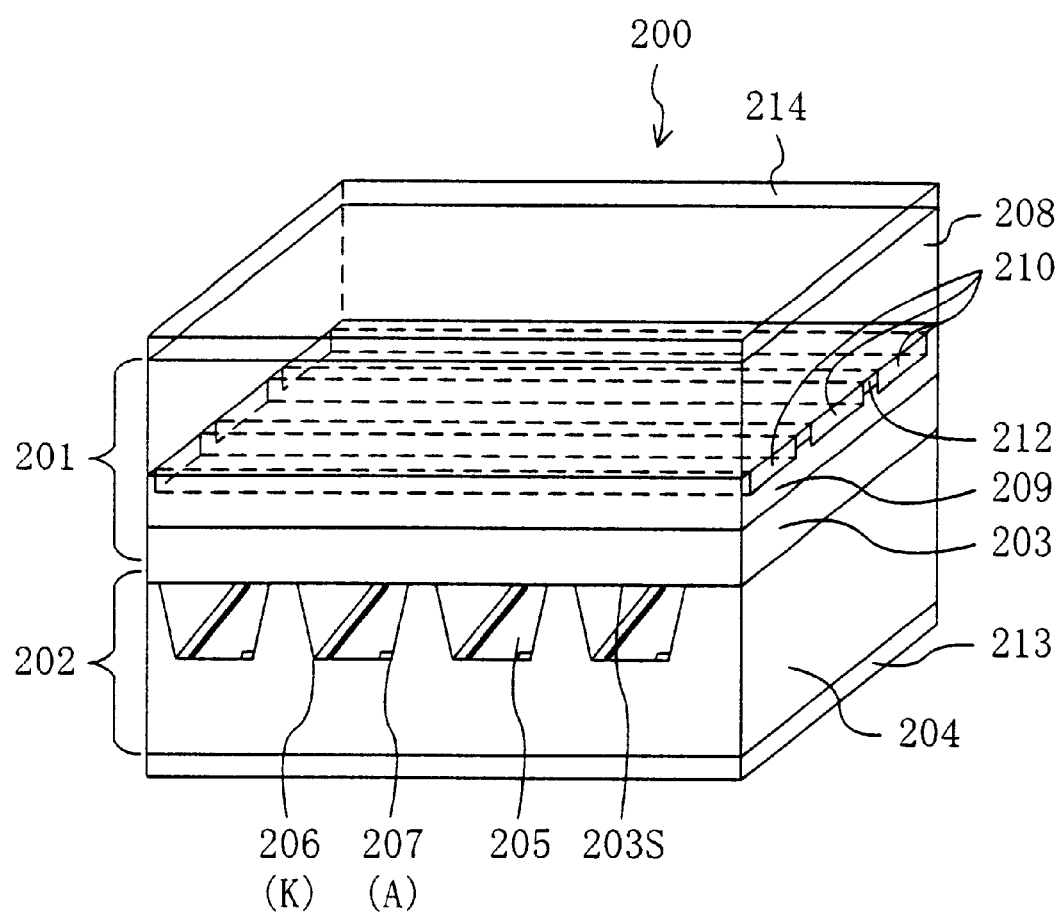
FIG. 20 is a schematic view of a conventional PALCD device.
Figure 21:
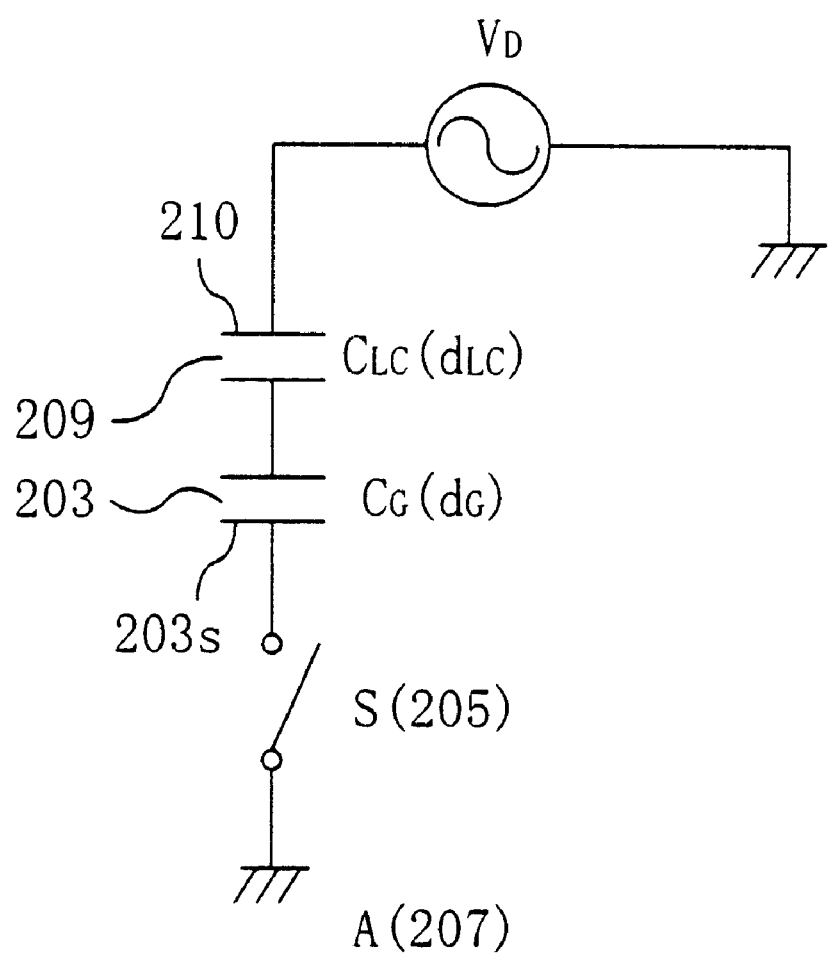
FIG. 21 is an equivalent circuit diagram of the conventional PALCD device.

FIG. 19 schematically illustrates a display state of the PALCD device 1300 fabricated in a manner similar to that in the PALCD device 1200 during the voltage application.

As is observed from FIG. 19, the liquid crystal regions 1109d where liquid crystal molecules are aligned axially symmetrically are formed in the respective apertures defined by the first dielectric structures 1120a' and the second dielectric structures 1120c and 1120d below the black matrix 1112a. A sufficient voltage is not applied to the liquid crystal regions 1109d due to the existence of the first dielectric structures 1120' for suppression/prevention of crosstalk, but liquid crystal molecules in the liquid crystal regions 1109d are aligned axially symmetrically by the alignment regulating force from the first dielectric structures 1120a' and the second dielectric structures 1120c and 1120d.

The liquid crystal regions 1109d that are located below the black matrix 1112 do not contribute to display. However, liquid crystal regions 1109c located between the liquid crystal regions 1109a and 1109d below the first dielectric structures 1120a' are aligned axially symmetrically as shown in FIG. 19 under the influence of the axially symmetrically aligned liquid crystal molecules in the liquid crystal regions 1109a and 1109d.

As described above, in the PALCD device 1300, also, it is possible to align axially symmetrically liquid crystal molecules in the portions of the liquid crystal layer 1109 located below the first dielectric structures 1120a'. Therefore, as in the PALCD device 1200, the PALCD device 1300 exhibits wide viewing angle characteristics and can achieve high-quality display free from display roughness.

While the present invention has been described in a preferred embodiment, it will be apparent to those skilled in the art that the disclosed invention may be modified in numerous ways and may assume many embodiments other than that specifically set out and described above. Accordingly, it is intended by the appended claims to cover all modifications of the invention that fall within the true spirit and scope of the invention.

What is claimed is:

1. A liquid crystal display device comprising:

a substrate;

a dielectric layer;

a liquid crystal layer interposed between the substrate and the dielectric layer;

a plurality of stripe electrodes formed on a surface of the substrate facing the liquid crystal layer, the electrodes running in a first direction; and a plurality of stripe plasma channels formed to face the plurality of electrodes via the liquid crystal layer and the dielectric layer, the plasma channels running in a second direction different from the first direction, a plurality of pixel regions being formed in respective crossings of the plurality of electrodes and the plurality of plasma channels, portions of the liquid crystal layer included in the plurality of pixel regions changing their orientation states depending on a voltage applied between the electrodes and the plasma channels, to realize display with light having passed the plurality of pixel regions, wherein the liquid crystal display device further comprises dielectric structures formed between the electrodes and the liquid crystal layer in periphery zones, the periphery zones including sides of the plurality of pixel regions orthogonal to the second direction, and a voltage applied to each of the portions of the liquid crystal layer included in the plurality of pixel regions is smaller in the periphery zone than in the other portion of the pixel region.

2. The device of claim 1, wherein the dielectric structures are formed of a transparent polymer material.

3. The device of claim 1, wherein each of the dielectric structures is formed to cover a gap between two adjacent electrodes among the plurality of stripe electrodes and sides of the two electrodes facing each other.

4. The device of claim 1, wherein the dielectric structures are formed so that in the periphery zone, the thickness of each of the portions of the liquid crystal layer included in the plurality of pixel regions is nine-tenths or less of the thickness in the other portion of the pixel region.

5. The device of claim 1, wherein the dielectric structures are formed so that in the periphery zone, the thickness of each of the portions of the liquid crystal layer included in the plurality of pixel regions is two-thirds or more of the thickness in the other portion of the pixel region.

6. The device of claim 1, further comprising a black matrix formed on the substrate between the plurality of electrodes.

7. The device of claim 1, wherein the dielectric structures are formed of a material having a relative dielectric constant greater than the absolute of relative dielectric constant anisotropy ($\Delta\epsilon$) of a liquid crystal material included in the liquid crystal layer.

8. The device of claim 1, further comprising a high dielectric layer formed between the plurality of electrodes including spaces between the plurality of electrodes and the liquid crystal layer, and the high dielectric layer is formed of a material having a relative dielectric constant greater than the absolute of relative dielectric constant anisotropy ($\Delta\epsilon$) of a liquid crystal material included in the liquid crystal layer.

9. The device of claim 1, wherein the dielectric structures are formed of a material having a relative dielectric constant smaller than the absolute of relative dielectric constant anisotropy ($\Delta\epsilon$) of a liquid crystal material included in the liquid crystal layer.

10. The device of claim 1, wherein the liquid crystal layer includes a liquid crystal material having negative dielectric anisotropy.

11. A liquid crystal display device comprising:

a substrate;

a dielectric layer;

a liquid crystal layer interposed between the substrate and the dielectric layer;

a plurality of stripe electrodes formed on a surface of the substrate facing the liquid crystal layer, the electrodes running in a first direction; and a plurality of stripe plasma channels formed to face the plurality of electrodes via the liquid crystal layer and the dielectric layer, the plasma channels running in a second direction different from the first direction, a plurality of pixel regions being formed in respective crossings of the plurality of electrodes and the plurality of plasma channels, the device further comprising a plurality of first dielectric structures running in the first direction and a plurality of second dielectric structures running in the second direction, formed on the surface of the substrate facing the liquid crystal layer, the liquid crystal layer being divided into a plurality of liquid crystal regions by the plurality of first and second dielectric structures, liquid crystal molecules in the plurality of liquid crystal regions being aligned axially symmetrically with respect to an axis vertical to the surface of the substrate, each of the plurality of pixel regions including at least one of the plurality of liquid crystal regions, portions of the liquid crystal layer included in the plurality of pixel regions changing their orientation states depending on a voltage applied between the electrodes and the plasma channels, to realize display with light having passed the plurality of pixel regions, wherein part of the plurality of first dielectric structures are formed in periphery zones, the periphery zones including sides of the plurality of pixel regions orthogonal to the second direction, and a voltage applied to each of the portions of the liquid crystal layer included in the plurality of pixel regions is smaller in the periphery zone than in the other portion of the pixel region.

12. The device of claim 11, wherein the first and second dielectric structures are formed of a transparent polymer material.

13. The device of claim 11, wherein each of the first dielectric structures formed in the periphery zones is formed to cover a gap between two adjacent electrodes among the plurality of stripe electrodes and sides of the two electrodes facing each other.

14. The device of claim 13, wherein each of the plurality of pixel regions includes at least two liquid crystal regions adjacent in the second direction, and the width of the first dielectric structure formed between the at least two liquid crystal regions among the plurality of first dielectric structures is smaller than the width of the first dielectric structure formed in the periphery zone.

15. The device of claim 11, wherein the first dielectric structures formed in the periphery zones are formed so that in the periphery zones, the thickness of each of the portions of the liquid crystal layer included in the plurality of pixel regions is nine-tenths or less of the thickness in the other portion of the pixel region.

16. The device of claim 11, wherein the first dielectric structures formed in the periphery zones are formed so that in the periphery zone, the thickness of each of the portions of the liquid crystal layer included in the plurality of pixel regions is two-thirds or more of the thickness in the other portion of the pixel region.

17. The device of claim 11, further comprising a black matrix formed on the substrate between the plurality of electrodes.

18. The device of claim 13, the width of the first dielectric structure located between the two electrodes is larger than the width of the first dielectric structures located on the two electrodes, and liquid crystal regions where liquid crystal molecules in the liquid crystal layer are aligned axially symmetrically with respect to an axis vertical to the surface of the substrate are formed below the first dielectric structures.

19. The device of claim 18, wherein third dielectric structures are further formed on the first dielectric structures, and the liquid crystal molecules in the liquid crystal layer located below the first dielectric structures are aligned axially symmetrically by the existence of the third dielectric structures.

20. The device of claim 18, further comprising a black matrix formed on the substrate between the plurality of electrodes, and the width of the black matrix is smaller than the width of the first dielectric structure located between the two electrodes.

21. The device of claim 11, further comprising a black matrix formed on the substrate between the plurality of electrodes, and the plurality of first dielectric structures and the plurality of second dielectric structures define a plurality of apertures on the black matrix.

22. The device of claim 11, wherein the first dielectric structures are formed of a material having a relative dielectric constant greater than the absolute of relative dielectric constant anisotropy ($\Delta\epsilon$) of a liquid crystal material included in the liquid crystal layer.

23. The device of claim 11, further comprising a high dielectric layer formed between the plurality of electrodes including spaces between the plurality of electrodes and the liquid crystal layer, and the high dielectric layer is formed of a material having a relative dielectric constant greater than the absolute of relative dielectric constant anisotropy ($\Delta\epsilon$) of a liquid crystal material included in the liquid crystal layer.

24. The device of claim 11, wherein the first dielectric structures are formed of a material having a relative dielectric constant smaller than the absolute of relative dielectric constant anisotropy ($\Delta\epsilon$) of a liquid crystal material included in the liquid crystal layer.

25. The device of claim 11, wherein the liquid crystal layer includes a liquid crystal material having negative dielectric anisotropy.

* * * * *